(12) United States Patent
Takahashi et al.

(10) Patent No.: US 10,564,391 B2
(45) Date of Patent: Feb. 18, 2020

(54) IMAGING DEVICE AND CONTROL METHOD THEREFOR

(71) Applicant: FUJIFILM Corporation, Tokyo (JP)

(72) Inventors: Kosuke Takahashi, Saitama (JP); Nanae Sakuma, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/940,237

(22) Filed: Mar. 29, 2018

(65) Prior Publication Data

US 2018/0217357 A1 Aug. 2, 2018

Related U.S. Application Data

(63) Continuation of application No. PCT/JP2016/078713, filed on Sep. 28, 2016.

(30) Foreign Application Priority Data

Sep. 30, 2015 (JP) .................................. 2015-193515

(51) Int. Cl.
*G02B 7/34* (2006.01)
*G02B 13/16* (2006.01)
(Continued)

(52) U.S. Cl.
CPC .............. *G02B 7/34* (2013.01); *G03B 13/16* (2013.01); *G03B 13/36* (2013.01);
(Continued)

(58) Field of Classification Search
CPC .......... G02B 7/34; G03B 13/06; G03B 13/16; G03B 13/32; G03B 13/36; H04N 5/225;
(Continued)

(56) References Cited

U.S. PATENT DOCUMENTS 9,843,728 B2 * 12/2017 Hongu ............... H04N 5/23212
2009/0153693 A1   6/2009 Onuki et al.
(Continued)

FOREIGN PATENT DOCUMENTS

CN         103119494 A      5/2013
JP         2009-147665 A    7/2009
(Continued)

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/078713, dated Apr. 12, 2018, with an English translation of the Written Opinion.
(Continued)

*Primary Examiner* — Twyler L Haskins
*Assistant Examiner* — Fayez Bhuiyan
(74) *Attorney, Agent, or Firm* — Birch, Steart, Kolasch & Birch, LLP

(57) ABSTRACT

The digital camera includes a finder section, an imaging optical system, a focus ring, an imaging element, a main control section, a digital signal processing section, and a finder display control section. The imaging element outputs first and second imaging signals obtained by receiving the first and second rays formed by performing pupil division on the subject image. The main control section generates a defocus image, which indicates an amount of defocus of the imaging optical system, for each main subject area, on the basis of the first and second imaging signals obtained in the plurality of main subject areas. The finder display control section displays a defocus image of the single main subject area at a position where the main subject does not overlap with another main subject area.

10 Claims, 44 Drawing Sheets

(51) Int. Cl.
*H04N 5/232* (2006.01)
*G03B 13/36* (2006.01)
*G03B 13/16* (2006.01)

(52) U.S. Cl.
CPC ..... *H04N 5/23212* (2013.01); *H04N 5/23219* (2013.01); *H04N 5/23293* (2013.01)

(58) Field of Classification Search
CPC ............... H04N 5/232; H04N 5/23212; H04N 5/23219; H04N 5/23293
See application file for complete search history.

(56) References Cited

U.S. PATENT DOCUMENTS

| | | |
|---|---|---|
| 2010/0208122 A1 | 8/2010 | Yumiki |
| 2012/0057062 A1* | 3/2012 | Hamada ................ G02B 7/102 |
| | | 348/333.02 |
| 2013/0188086 A1 | 7/2013 | Fujiki |

FOREIGN PATENT DOCUMENTS

| | | |
|---|---|---|
| JP | 2012-65294 A | 3/2012 |
| JP | 2012-145840 A | 8/2012 |
| JP | 2012-177929 A | 9/2012 |
| JP | 2013-178324 A | 9/2013 |
| JP | 2015-145970 A | 8/2015 |

OTHER PUBLICATIONS

International Search Report and English translation (Form PCT/ISA/210) for Application No. PCT/JP2016/078713, dated Dec. 27, 2016.

Chinese Office Action dated Oct. 8, 2019, for corresponding Chinese Application No. 201680057838.1, with English translation.

\* cited by examiner

FIG. 15
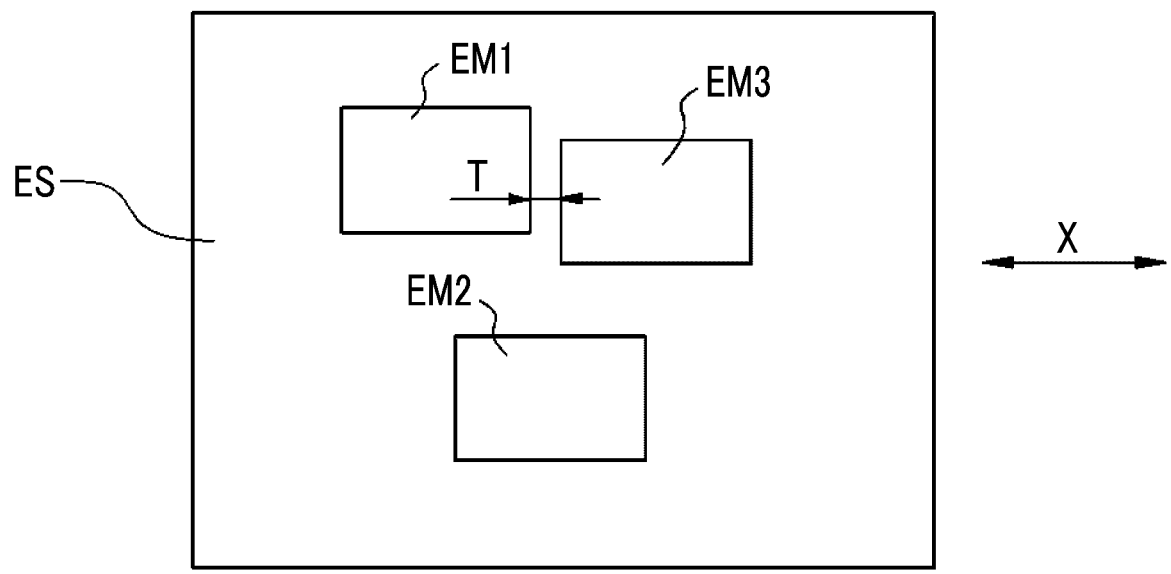
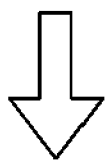
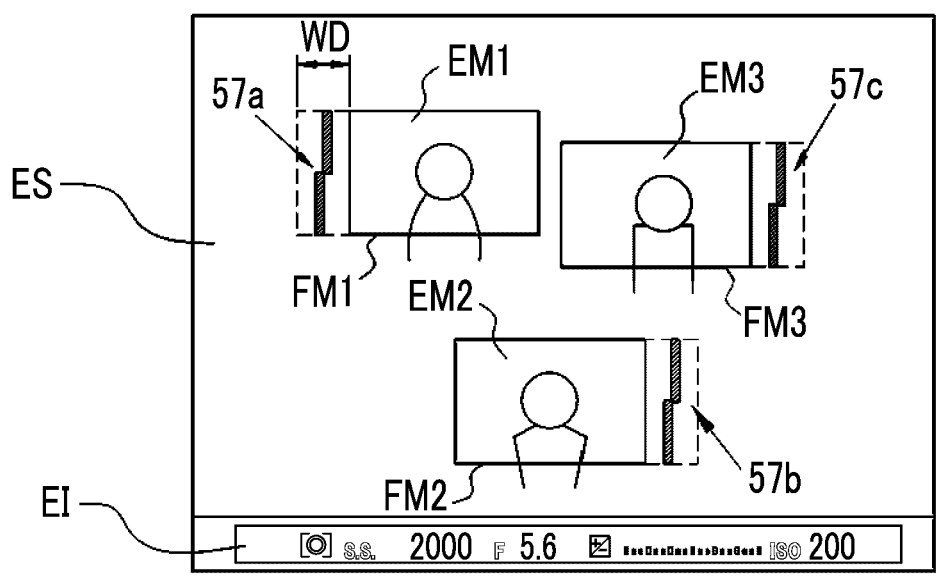

FIG. 59
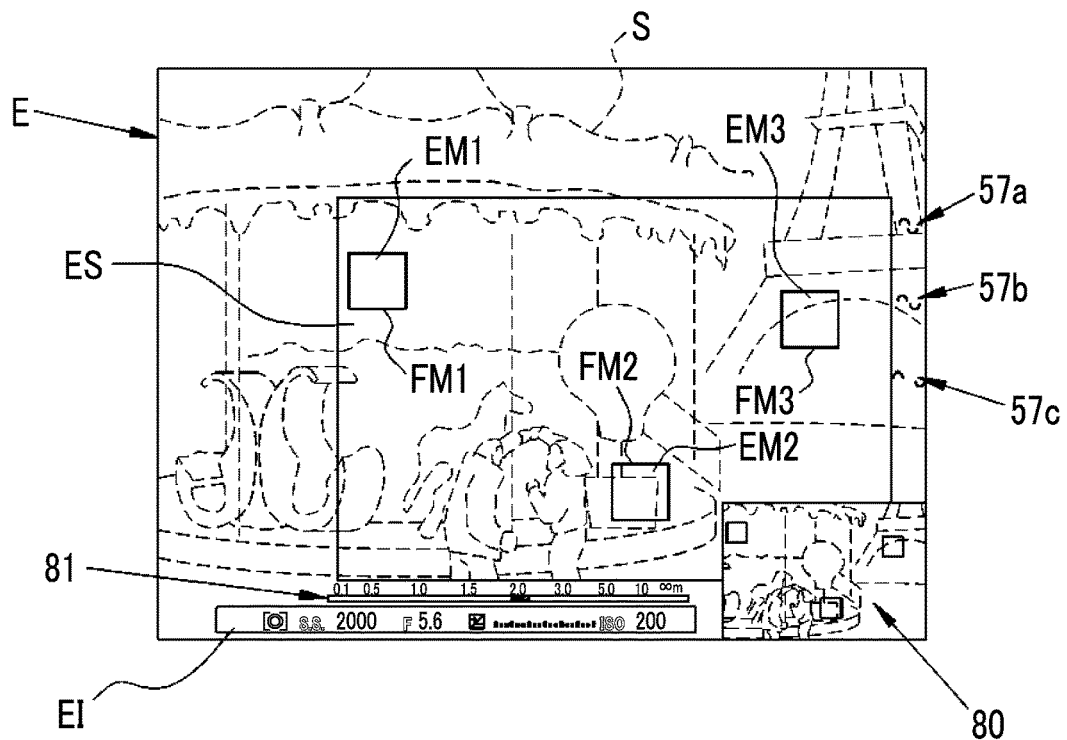
FIG. 60
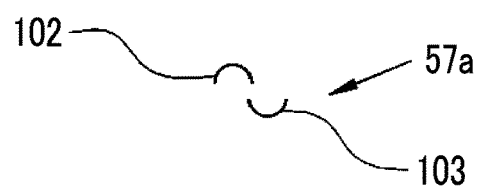
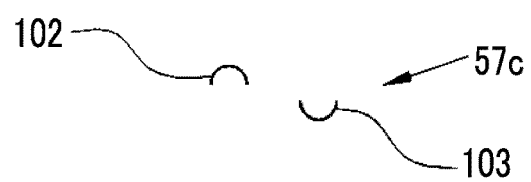

IMAGING DEVICE AND CONTROL METHOD THEREFOR

CROSS-REFERENCE TO RELATED APPLICATIONS

This application is a Continuation of PCT International Application No. PCT/JP2016/078713 filed on 28 Sep. 2016, which claims priority under 35 U.S.C § 119(a) to Japanese Patent Application No. 2015-193515 filed on 30 Sep. 2015. The above application is hereby expressly incorporated by reference, in its entirety, into the present application.

BACKGROUND OF THE INVENTION

1. Field of the Invention

The present invention relates to an imaging device having an electronic viewfinder or a hybrid viewfinder and a control method therefor.

2. Description of the Related Art

Recently, imaging devices such as a digital camera having an optical viewfinder (hereinafter referred to as an OVF), an electronic viewfinder (hereinafter referred to as an EVF), and a hybrid viewfinder (refer to JP2012-065294A) are known. The hybrid viewfinder has an OVF mode and an EVF mode, and is capable of switching mode between both modes.

The hybrid viewfinder comprises a display section, a finder window, and a half mirror as an optical path combining section. The display section displays a subject image which is obtained by capturing an optical image of a subject through an imaging element. The optical image of the subject is incident onto the finder window. The half mirror transmits and guides a part of the optical image incident onto the finder window to a finder eyepiece section, and reflects and guides a part of a display image, which is displayed by the display section, to the finder eyepiece section. Further, the hybrid viewfinder has a shutter (hereinafter referred to as an OVF shutter) that blocks the optical image which is incident onto the finder window. In the OVF mode, the OVF shutter is open, the display section is set to a non-display state, and thereby the optical image is guided into the finder eyepiece section. In the EVF mode, the OVF shutter is closed, the display section is set to a display state, and thereby the display image is guided into the finder eyepiece section.

On the other hand, cameras such as a single-lens reflex type camera for experts have a manual focus function that enables a photographer to manually adjust the focus. In addition, in order to facilitate focus adjustment during manual focusing, a digital camera is known in which a part of a subject image is displayed as a split image on a display section in a live view manner (refer to, for example, JP2009-147665A (corresponding to US2009/153693A1) and JP2013-178324A).

The split image is composed of two subject images (two phase difference images) obtained by capturing an image of a subject by a pupil division method. The shift (phase difference) between the two phase difference images displayed adjacent to each other indicates the amount of shift in focal length for the subject. The two adjacent phase difference images are displayed as images shifted to the left and right in a state where the subject is not in focus (out-of-focus state), and the left and right shifts disappear in a focused state (in-focus state). The photographer is able to bring the subject into focus by operating the focus ring such that the left and right shifts of the two phase difference images disappear.

Digital cameras are configured to display the split image on the rear side display section of the digital camera. Otherwise, in recent years, digital cameras, which are configured to display the image on the display section of the EVF or the hybrid viewfinder, are on sale.

There is also a digital camera having a touch panel mounted on the rear side display section. In this digital camera, it is possible to designate the main subject area by touching the main subject image, which is displayed in a live view manner on the rear side display section, with the user's fingertip. The digital camera detects the main subject area designated by the user, and performs focus adjustment (for example, refer to JP2013-178324A). Further, there is known a digital camera that has a main subject detection section for detecting an image showing a main subject (for example, a human face) from the captured image, and that focuses on the main subject area detected by the main subject detection section.

SUMMARY OF THE INVENTION

However, in the digital camera that displays the split image on the display section in the finder, as compared with a digital camera that displays the split image on the rear side display section, the area in which the split image is displayed is small, and thus there is a problem in that it is difficult for a photographer to recognize how much the focus is shifted from the subject.

Therefore, the inventors are studying about a method of displaying a defocus image indicating the amount of defocus of the imaging optical system in the finder instead of the split image. The defocus image is a pair of indicators (for example, a pair of bars) arranged to be spaced in accordance with the amount of defocus.

Further, the applicants are considering a method of generating a defocus image on the basis of the amount of defocus corresponding to the main subject area detected as described above and displaying the generated defocus image at a position close to the main subject area.

However, a plurality of main subject areas may be detected during live view display. In this case, since a defocus image is generated and displayed for each main subject area, the position, at which the defocus image is displayed, becomes a problem. Specifically, in a case where the two main subject areas are close to each other and are detected at a close-range position, if the defocus image is displayed at a position close to the main subject area, the defocus image overlaps with another main subject area. Thus, there is a problem that it is difficult to visually perceive the image.

The present invention has an object to provide an imaging device in which defocus images corresponding to a plurality of main subject areas can be arranged at optimum positions in a finder and a control method therefor.

In order to achieve the object, an imaging device of the present invention comprises an imaging optical system, a focus adjustment operation section, an imaging element, a main subject area detection section, a defocus image generation section, a finder section, a finder display control section, and a display position control section. The focus adjustment operation section is capable of performing a focus adjustment operation of the imaging optical system. The imaging element generates a normal image by performing photoelectric conversion on a subject image from the imaging optical system, and generates first and second imaging signals by performing photoelectric conversion on each of first and second rays which are formed by performing pupil division on the subject image. A main subject area detection section detects a main subject area in an image. A defocus image generation section generates a defocus image, which indicates an amount of defocus of the imaging optical system, for each main subject area, on the basis of the first and second imaging signals obtained in the main subject area. A finder section is configured to be capable of observing the subject image in an observation area. A finder display control section displays the defocus image outside the main subject area and at a position close to the main subject area in the observation area. In a case where the main subject area detection section detects a plurality of the main subject areas, a display position control section displays the defocus image of the single main subject area at a position where the defocus image does not overlap with another main subject area, by controlling the finder display control section.

It is preferable that the finder display control section displays the defocus image, which corresponds to the single main subject area, on a right side or a left side of the main subject area, and the display position control section determines whether to display the defocus image on the right side or the left side of the corresponding main subject area, in accordance with whether the defocus image of the single the main subject area overlaps with another main subject area.

It is preferable that the defocus image is indicated by first and second indicators which are spaced from each other in a first direction.

It is preferable that the finder display control section decreases a first distance, which is a distance between the first and second indicators in the first direction, as the amount of defocus decreases.

It is preferable that the first and second indicators are spaced from each other in a second direction orthogonal to the first direction.

It is preferable that the finder display control section decreases a second distance, which is a distance between the first and second indicators in the second direction, as the amount of defocus decreases.

It is preferable that the finder display control section sets the first and second distances to 0 in a case where the amount of defocus is 0. It is preferable that the finder display control section integrally displays the first and second indicators in a case where the amount of defocus is 0.

It is preferable that a part of the first indicator, which faces the second indicator in the second direction, has a convex portion, a part of the second indicator, which faces the first indicator in the second direction, has a concave portion, and in a case where the amount of defocus is 0, the convex portion and the concave portion are fitted.

It is preferable that the imaging device further comprises a determination section determines whether the amount of defocus is within a focal depth of the imaging optical system, in which the finder display control section changes the second distance depending on the amount of defocus in a case where the determination section determines that the amount of defocus is within the focal depth, and keeps the second distance constant regardless of the amount of defocus in a case where the determination section determines that the amount of defocus is outside the focal depth.

It is preferable that the imaging device further comprises a face recognition section recognizes a face of a person in the subject image, in which the main subject area detection section detects an area, which includes the face of the person recognized by the face recognition section, as the main subject area.

In the control method of the imaging device of the present invention, in a case where the main subject area detection section detects a plurality of the main subject areas, a display position control section displays the defocus image of the single main subject area at a position where the defocus image does not overlap with another main subject area, by controlling the finder display control section.

According to the present invention, defocus images corresponding to a plurality of main subject areas can be arranged at optimum positions in a finder.

BRIEF DESCRIPTION OF THE DRAWINGS

FIG. 15 is an explanatory diagram illustrating an example in which defocus images are displayed at positions where each defocus image does not overlap with another main subject area in a case where it is determined that one of the main subject areas and another one are close.

FIG. 59 is a diagram illustrating the inside of an observation area of a finder section of a twenty-fourth embodiment.

FIG. 60 is a partially enlarged view illustrating defocus images arranged on the right side of the subject display area of the twenty-fourth embodiment.

DESCRIPTION OF THE PREFERRED EMBODIMENTS

[First Embodiment]

Figure 1:
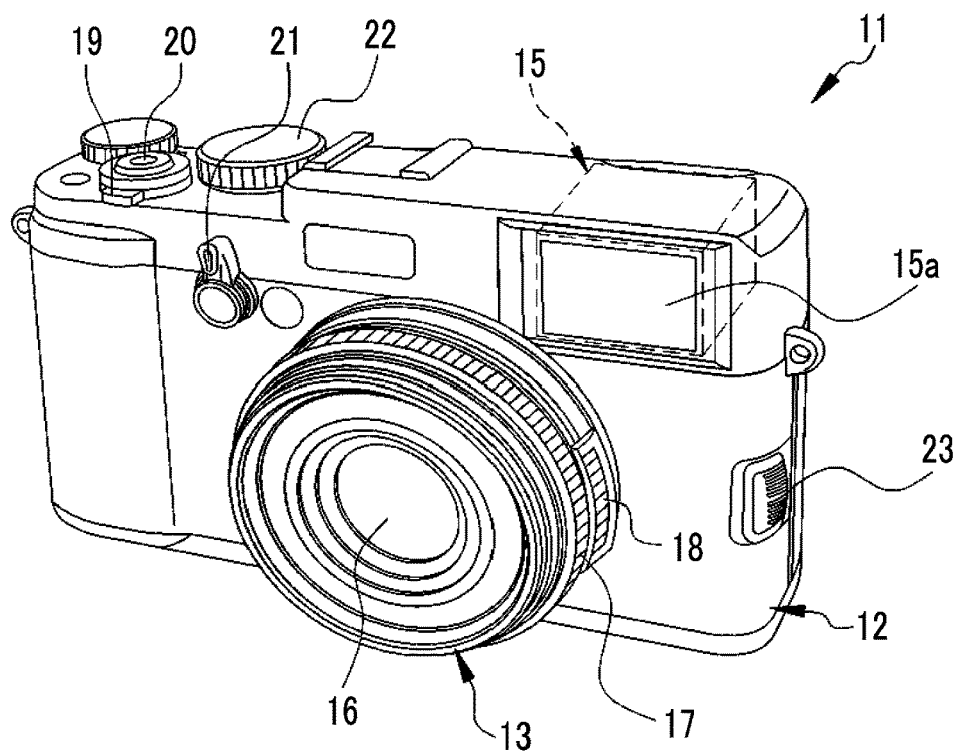
FIG. 1 is a perspective view illustrating an exterior appearance of a digital camera as viewed from the front side.
Figure 2:
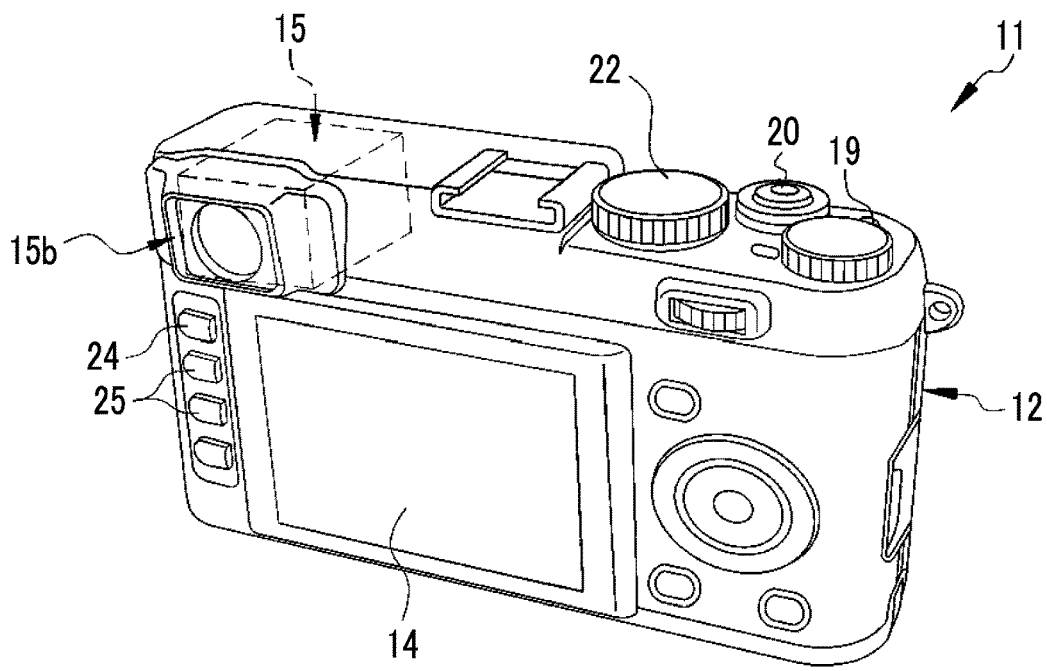
FIG. 2 is a perspective view illustrating an exterior appearance of the digital camera as viewed from the rear side.
Figure 3:
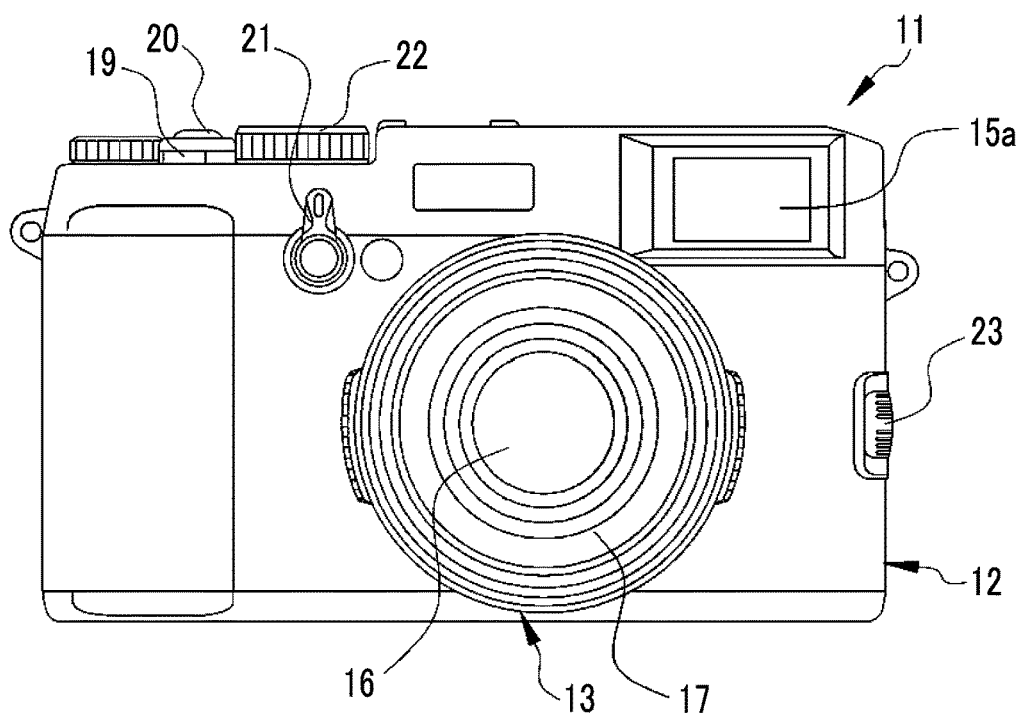
FIG. 3 is a front view of the digital camera.
Figure 4:
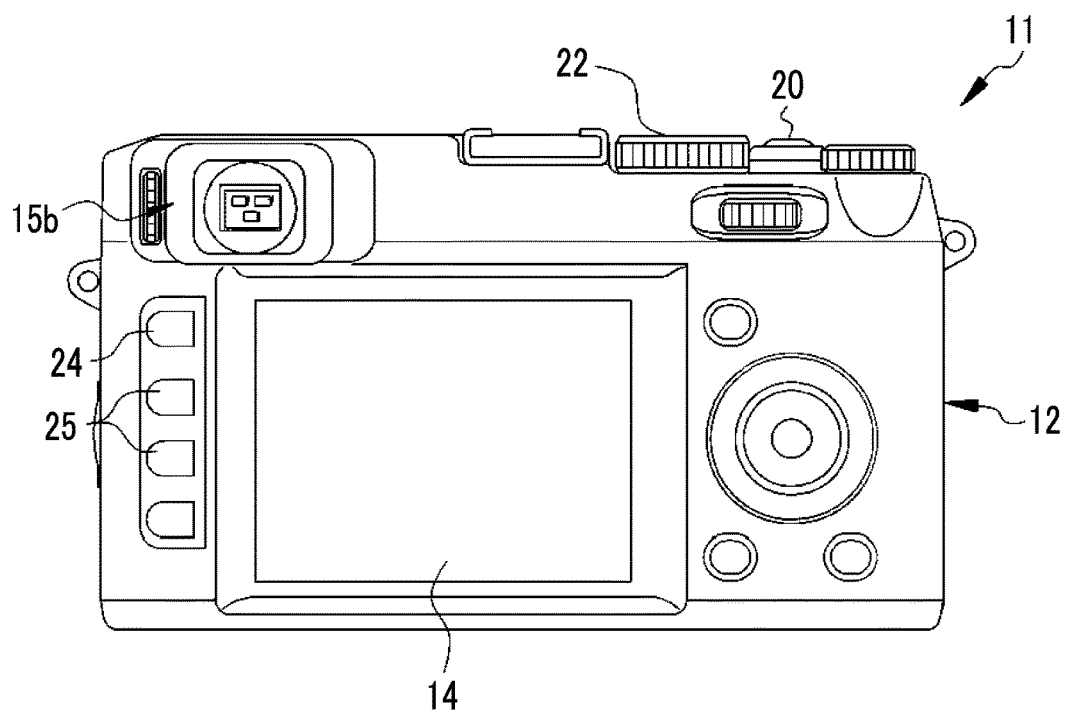
FIG. 4 is a rear view of the digital camera.
Figure 5:
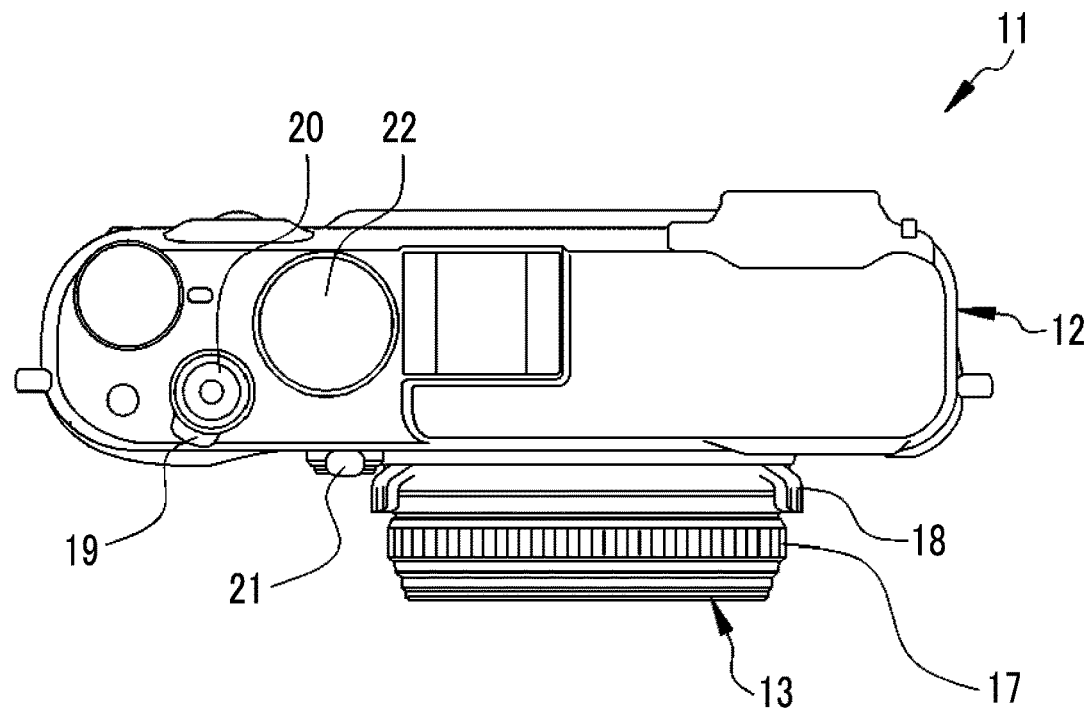
FIG. 5 is a plan view of the digital camera.
Figure 6:
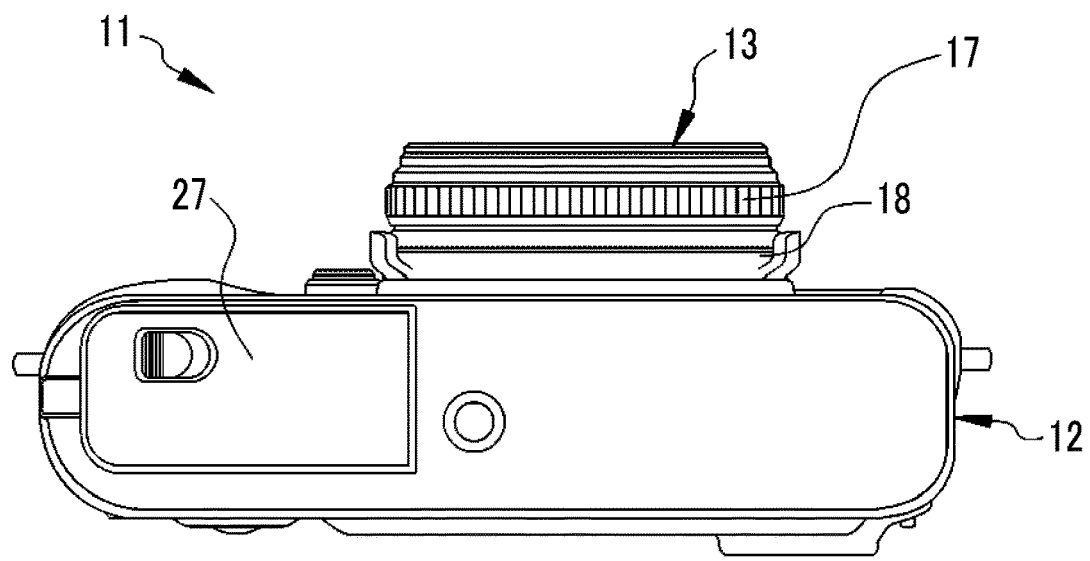
FIG. 6 is a bottom plan view of the digital camera.
Figure 7:
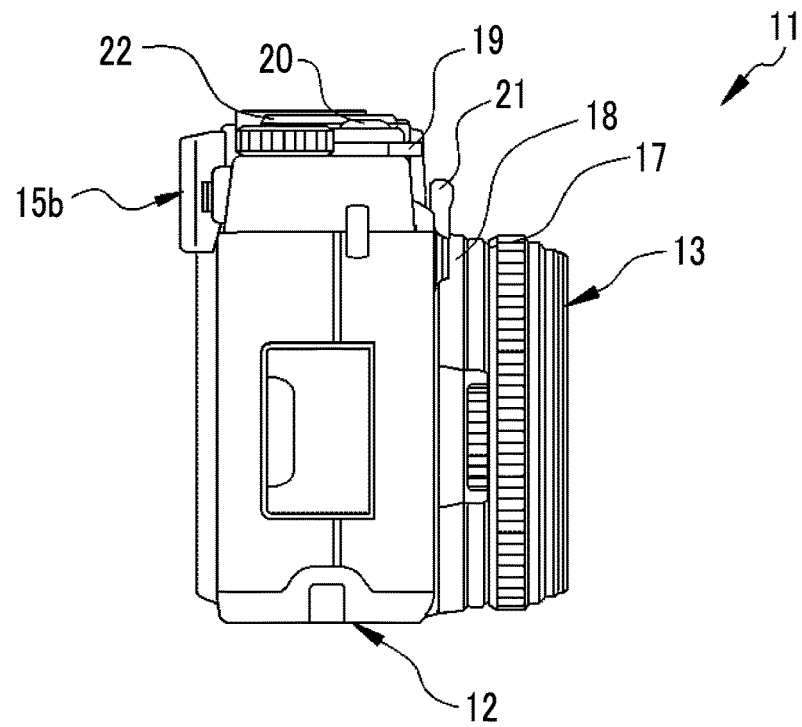
FIG. 7 is a left side view of the digital camera.
Figure 8:
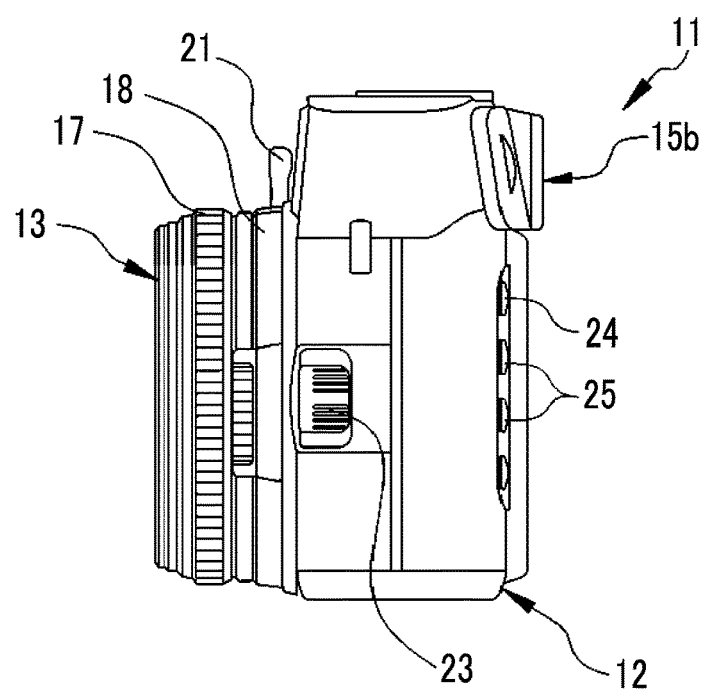
FIG. 8 is a right side view of the digital camera.

In FIG. 1 to FIG. 8, a digital camera 11 generates and displays a defocus image at the time of manual focusing. The digital camera 11 comprises a camera body 12, a lens barrel 13, a rear side display section 14, and a finder section 15. The lens barrel 13 is provided on the front side of the camera body 12 so as to hold an imaging optical system 16. On the outer periphery of the lens barrel 13, a focus ring 17 (focus adjustment operation section) and a stop ring 18 are rotatably provided. The focus ring 17 and the stop ring 18 are operation members capable of performing focus adjustment and stop adjustment of the imaging optical system 16 respectively by manually rotating the rings by a photographer.

The finder section 15 is a hybrid type capable of switching between an optical viewfinder (OVF) mode and an electronic viewfinder (EVF) mode.

On the upper side of the camera body 12, a power button 19, a release button 20, a shutter dial 22, and the like are provided. On the front side of the camera body 12, a finder switch lever 21, an auto focus/manual focus (AF/MF) changeover switch 23, and the like are provided. On the rear side of the camera body 12, a mode button 24, a zoom button 25, and the like are provided.

The AF/MF changeover switch 23 is a switch for switching the mode for performing the focus adjustment of the imaging optical system 16 between the auto focus mode and the manual focus mode. In the auto focus mode, focus adjustment of the imaging optical system 16 is automatically performed. In the manual focus mode, it is possible for a photographer to manually perform the focus adjustment by rotating the focus ring 17. Switching between the auto focus mode and the manual focus mode can be performed not only by operation of the AF/MF changeover switch 23 but also by operation of the mode button 24 or the like as described later.

The power button 19 is operated when a power source (not shown in the drawing) of the digital camera 11 is turned on/off. The release button 20 is operated when imaging is performed. The finder switch lever 21 is operated when the finder section 15 is switched between the OVF mode and the EVF mode. The shutter dial 22 is operated when the shutter speed of the digital camera 11 is switched. The zoom button 25 is operated when zooming is performed.

The release button 20 has a two-stage-stroke-type switch (not shown in the drawing) including a S1 switch and a S2 switch. The digital camera 11 performs an imaging preparation operation such as an automatic exposure adjustment if the release button 20 is pressed down (pressed halfway) and the S1 switch is turned on. From this state, if the release button 20 is further pressed down (pressed fully) and the S2 switch is turned on, the imaging operation is performed.

The rear side display section 14 is provided on the rear side of the camera body 12, and displays images acquired in various imaging modes and a menu screen for performing various settings. A touch panel 27 (refer to FIG. 10) is mounted on the front surface of the rear side display section 14, and an input instruction from the touch panel 27 is transmitted to the main control section 32.

A slot (not shown) for mounting a recording medium 50 (refer to FIG. 10) to be described later and a loading lid for opening and closing the aperture of the slot are provided at the bottom of the camera body 12.

The finder section 15 has a finder objective window 15a, which includes an optical image of a subject, and a finder eyepiece section 15b with which an eye of a photographer comes into contact. The finder objective window 15a is provided on the front side of the camera body 12. The finder eyepiece section 15b is provided on the rear side of the camera body 12.

Figure 9:
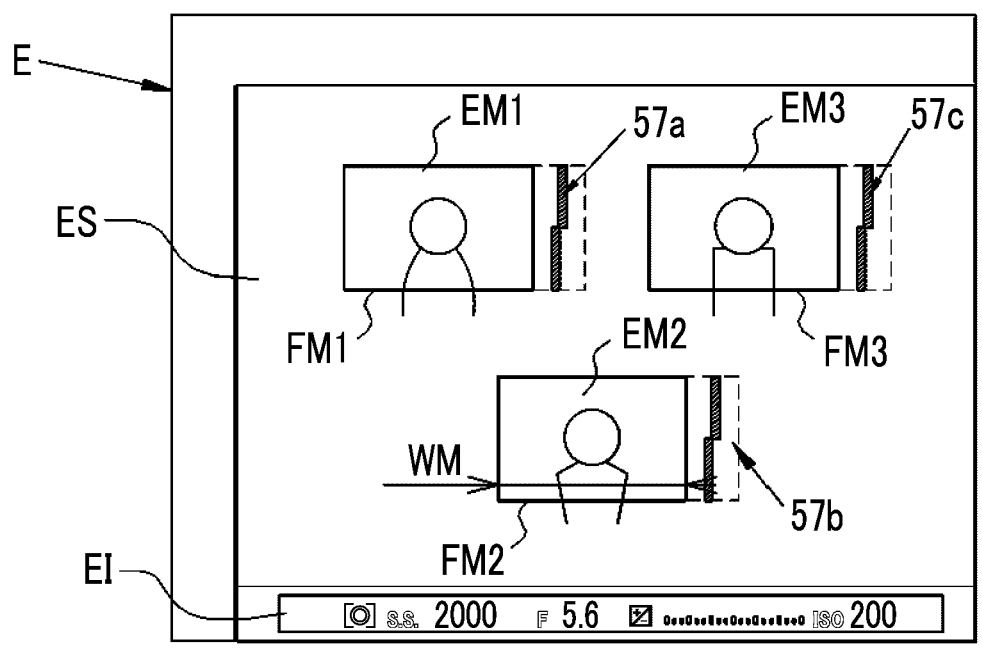
FIG. 9 is a partially enlarged view illustrating an inside of an observation area of a finder section.

As shown in FIG. 9, a subject display area ES and an information display area EI are set in an observation area E in the finder section 15. In the subject display area ES, for example, first to third main subject areas EM1 to EM3 (the areas indicated by the rectangular frames FM1 to FM3) are displayed. First to third defocus images 57a to 57c to be described later are displayed close to the main subject areas EM1 to EM3.

The first to third main subject areas EM1 to EM3 are detected by a main subject area detection section 51 to be described later. The first to third defocus images 57a to 57c respectively correspond to the amounts of defocus in the first to third main subject areas EM1 to EM3.

In the manual focus mode, in a case where a photographer adjusts the focus of the imaging optical system 16 by the rotation operation of the focus ring 17, the first to third defocus images 57a to 57c change in accordance with the amounts of defocus in the first to third main subject areas EM1 to EM3. The photographer is able to recognize the focus states in the first to third main subject areas EM1 to EM3 from the first to third defocus images 57a to 57c.

The first to third main subject areas EM1 to EM3 are positioned at positions designated in the subject display area ES, and are rectangular areas smaller than the subject display area ES. The subject display area ES is an area in which an optical image of the subject or a normal image 56 can be observed as described later. In a case of observing the optical image of the subject (in the OVF mode), the position of the subject display area ES changes in accordance with the parallax between the finder objective window 15a and the imaging optical system 16.

In the information display area EI, an information image is displayed. The information image is generated on the basis of imaging information such as imaging conditions, the imaging mode, and the like. The imaging conditions include a shutter speed, an aperture value, an ISO sensitivity, and the like. The imaging mode includes an auto imaging mode, a manual imaging mode, and the like. In the auto imaging mode, focus adjustment and automatic exposure adjustment are performed on the basis of image data obtained by capturing an optical image, and the focus, the shutter speed, and the aperture value are automatically set. In the manual imaging mode, a photographer rotates the focus ring 17 so as to adjust the focus, and the photographer operates the shutter dial 22, the stop ring 18, and the like so as to manually set the shutter speed and the aperture value. The imaging mode can be set by operating the mode button 24 or the like.

In the information display area EI shown in FIG. 9, the following are displayed: "1/2000" that indicates the shutter speed as an example of the imaging information, "F5.6" that indicates the aperture value, "ISO200" that indicates the ISO sensitivity, and "M" that indicates the imaging modes.

Figure 10:
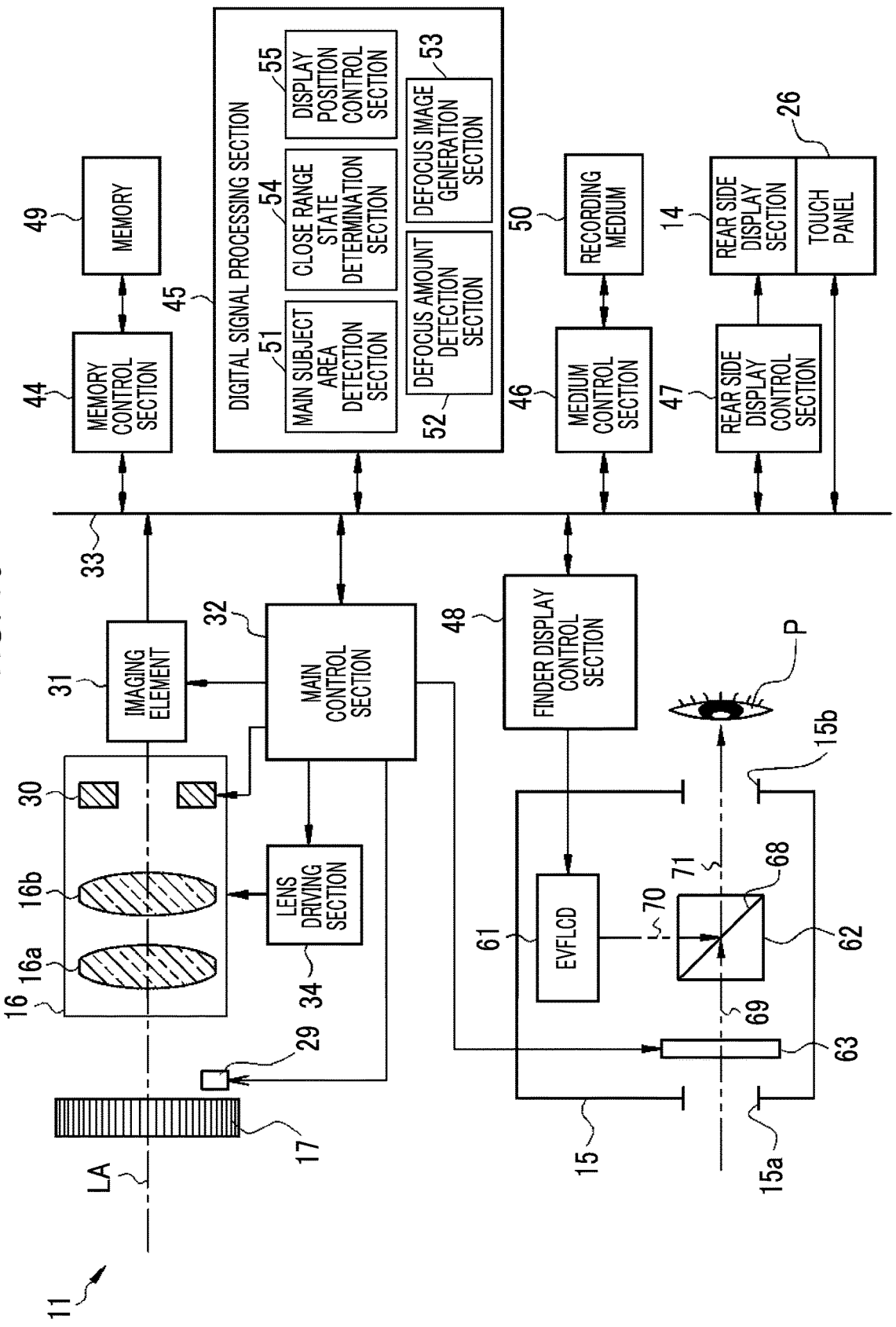
FIG. 10 is a block diagram illustrating an electrical configuration of the digital camera.

In FIG. 10, the lens barrel 13 comprises a sensor 29 in addition to the imaging optical system 16, the focus ring 17, and the like. In the manual focus mode, the sensor 29 detects the rotation direction and the amount of rotation of the focus ring 17. The sensor 29 is composed of, for example, a comb tooth ring (not shown) provided on the inner peripheral surface of the focus ring 17 and an optical sensor (not shown) outputting a detection signal. The detection signal from the sensor 29 is output to the main control section 32. The main control section 32 detects the rotation direction and the amount of rotation of the focus ring 17 on the basis of the detection signal which is input from the sensor 29.

The imaging optical system 16 comprises a plurality of lenses including a zoom lens 16a and a focus lens 16b, a stop 30, and the like. The imaging element 31 is disposed after the imaging optical system 16 along an optical axis LA of the imaging optical system 16. The imaging element 31 is provided inside the camera body 12.

The stop 30 adjusts an amount of light, which is incident into the imaging element 31, through driving control performed by the main control section 32. An optical image of a subject, which passes through the imaging optical system 16 and of which an amount of light is adjusted through the stop 30, is incident into the imaging element 31.

A lens driving section 34 is connected to the imaging optical system 16. The main control section 32 transmits a control signal for moving the focus lens 16b to the lens driving section 34 in accordance with the rotation direction and the amount of rotation of the focus ring 17 detected on the basis of the signal of the sensor 29. The lens driving section 34 moves the focus lens 16b on the basis of the control signal.

In addition, the main control section 32 controls the lens driving section 34 so as to move the zoom lens in the optical axis direction, thereby causing the imaging optical system 16 to perform zooming.

The imaging element 31 is, for example, a CMOS type image sensor having a single-plate color imaging type which has a RGB color filter. The imaging element 31 has a light receiving surface 31a formed of a plurality of pixels arranged in a two-dimensional matrix shape. Each pixel includes a photoelectric conversion element, and photoelectrically converts an optical image, which is formed on the light receiving surface, so as to generate an imaging signal. Further, the imaging element 31 has an electronic shutter function, and a shutter speed (electric charge accumulation time period) thereof can be adjusted.

Figure 11:
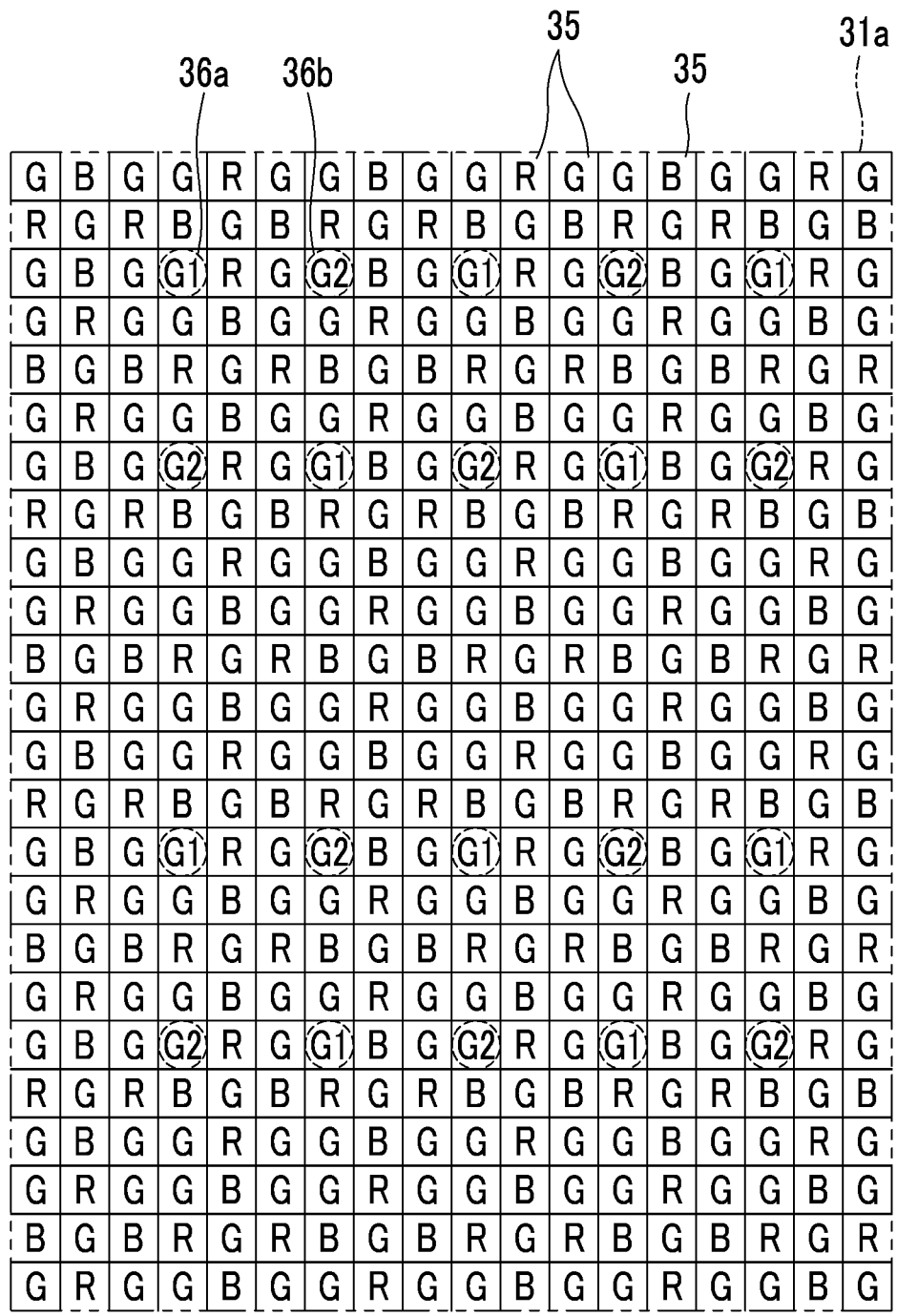
FIG. 11 is an explanatory diagram illustrating an example of a pixel array of an imaging element.

Subject light, which is transmitted through the imaging optical system 16, is incident onto the light receiving surface 31a of the imaging element 31 shown in FIG. 11. On the light receiving surface 31a, normal pixels 35, first phase difference pixels 36a, and second phase difference pixels 36b are provided. The normal pixels 35, the first phase difference pixels 36a, and the second phase difference pixels 36b are arranged in a matrix shape as a whole, photoelectrically convert each part of the image, and output an imaging signal. The imaging element 31 is operated by a drive signal from the main control section 32.

There are many normal pixels 35 on the light receiving surface 31a. The normal pixel 35 is a normal pixel that receives rays from a subject without pupil division. A color filter 41 (refer to FIG. 12) of any one of red (R), green (G), and blue (B) is provided in each normal pixel 35. "R" in FIG. 11 indicates an R pixel which is the normal pixel 35 provided with an R filter. "G" indicates a G pixel which is a normal pixel 35 provided with a G filter. "B" indicates a B pixel which is a normal pixel 35 provided with a B filter.

On the other hand, instead of some of the G pixels, the first phase difference pixels 36a (corresponding to "G1" in FIG. 11) and the second phase difference pixels 36b (corresponding to "G2" in FIG. 11), which pupil-divide and receive rays from the subject, are arranged on the light receiving surface 31a in a predetermined pattern. In the present embodiment, the first phase difference pixels 36a and the second phase difference pixels 36b are alternately provided at predetermined distances in each of the horizontal and vertical directions.

Figure 12:
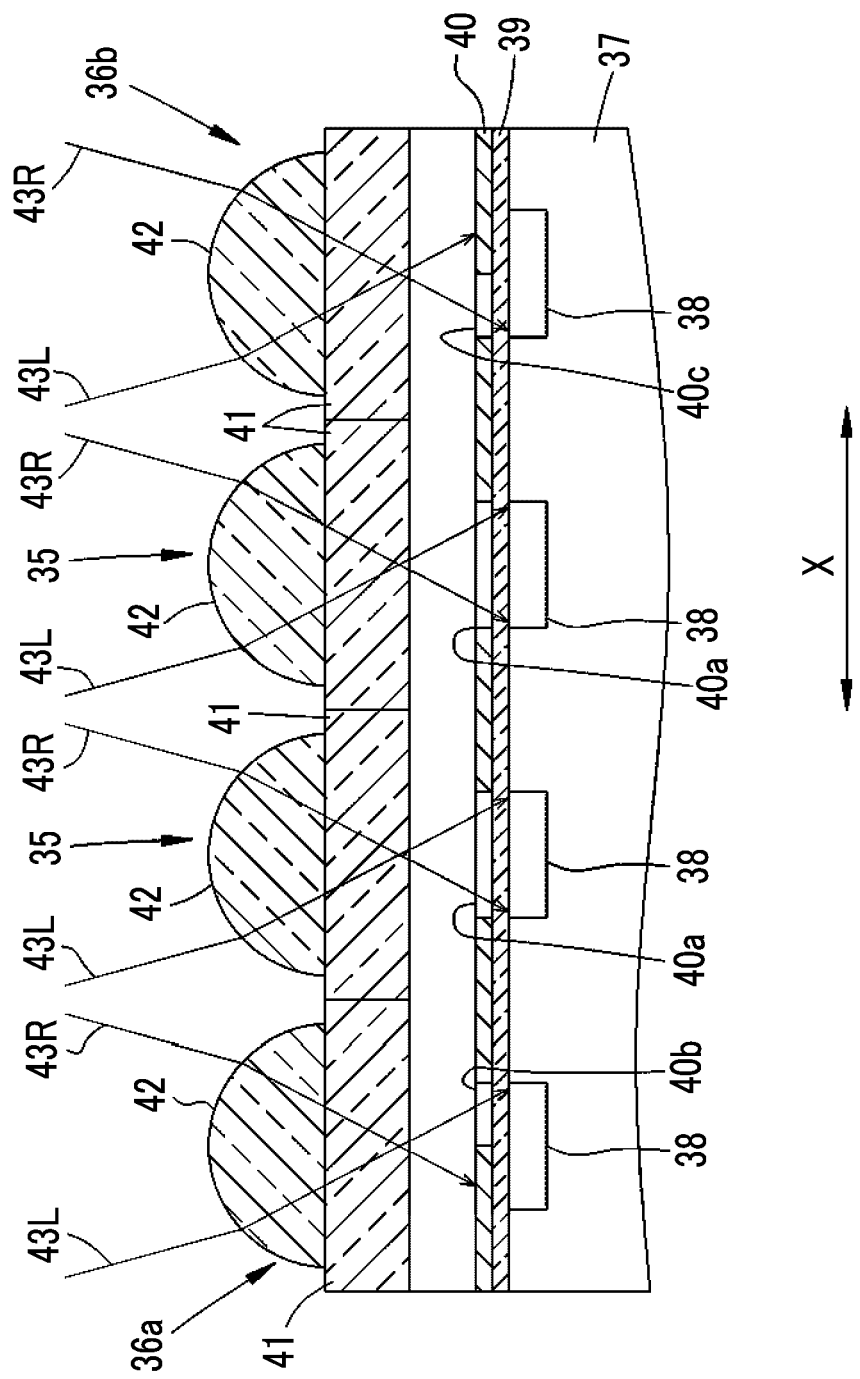
FIG. 12 is a cross-sectional view illustrating structures of a normal pixel and first and second phase difference pixels.

In FIG. 12, each of the pixels 35, 36a, and 36b has a photodiode 38 formed on a semiconductor substrate 37. The photodiode 38 is a photoelectric conversion section that converts incident light into signal charge corresponding to the amount of received light and accumulates the charge. A transparent insulation film 39 is formed on the surface of the semiconductor substrate 37, and a light blocking film 40 is formed thereon. In the light blocking film 40, a normal opening 40a is formed on the photodiode 38 of the normal pixel 35. The normal opening 40a has the same rectangular shape as that of the photodiode 38, but its size is smaller than that of the photodiode 38, and the center thereof is provided at a position coinciding with the center of the photodiode 38.

In the light blocking film 40, a first eccentric opening 40b is formed on the photodiode 38 of the first phase difference pixel 36a, and a second eccentric opening 40c is formed on the photodiode 38 of the second phase difference pixel 36b. The first eccentric opening 40b of the first phase difference pixel 36a is positioned to be shifted to the right with respect to the center of the photodiode 38, and the second eccentric opening 40c of the second phase difference pixel 36b is positioned to be shifted to the left with respect to the center of the photodiode 38.

The eccentric direction of each of the eccentric openings 40b and 40c is the horizontal direction X of the observation area E. This is for forming a phase difference in the horizontal direction X of the observation area E.

A color filter 41 of any of the three primary colors (R, G, B) is provided above the light blocking film 40, and microlenses 42 are further provided on each color filter 41. The color filter 41, which transmits green light, is provided on each of the first phase difference pixel 36a and the second phase difference pixel 36b.

With the above-mentioned configuration, the first phase difference pixel 36a receives only the rays 43L (first rays) from the left side portion obtained by dividing the exit pupil of the imaging optical system 16. The second phase difference pixel 36b receives only rays 43R (second rays) from the right side portion. The normal pixel 35 receives rays from the imaging optical system 16 without pupil division.

The imaging element 31 comprises a denoising circuit, an auto gain controller, and a signal processing circuit such as an A/D conversion circuit (any of those is not shown in the drawing). The denoising circuit performs denoising processing on the imaging signal. The auto gain controller amplifies a level of the imaging signal to an optimum value. The A/D conversion circuit converts the imaging signal into a digital signal, and outputs the signal from the imaging element 31. The output signal of the imaging element 31 is image data (so-called RAW data) having one pixel value for each of the pixels 35, 36a, and 36b.

The imaging element 31 and the main control section 32 are connected to a bus 33. Otherwise, a memory control section 44, a digital signal processing section 45, a medium control section 46, a rear side display control section 47, and a finder display control section 48 are connected to the bus 33.

A memory 49 for a temporary storage such as SDRAM is connected to the memory control section 44. The memory control section 44 inputs the image data, which is output from the imaging element 31, to the memory 49, and stores the image data. Further, the memory control section 44 outputs the image data, which is stored in the memory 49, to the digital signal processing section 45.

The digital signal processing section 45 performs known image processing such as matrix calculation, demosaic processing, γ correction, luminance conversion, color difference conversion, resizing processing, and the like on the image data which is input from the memory 49, thereby generating a subject image on the basis of the pixel values of the normal pixels 35. Hereinafter, the subject image generated on the basis of the normal pixels 35 is referred to as a normal image 56. The normal image 56 is a color image in which all the pixels have pixel values of three colors through the synchronization processing.

The digital signal processing section 45 is composed of a main subject area detection section 51, a defocus amount detection section 52, a defocus image generation section 53, a close range state determination section 54, and a display position control section 55.

Figure 13:
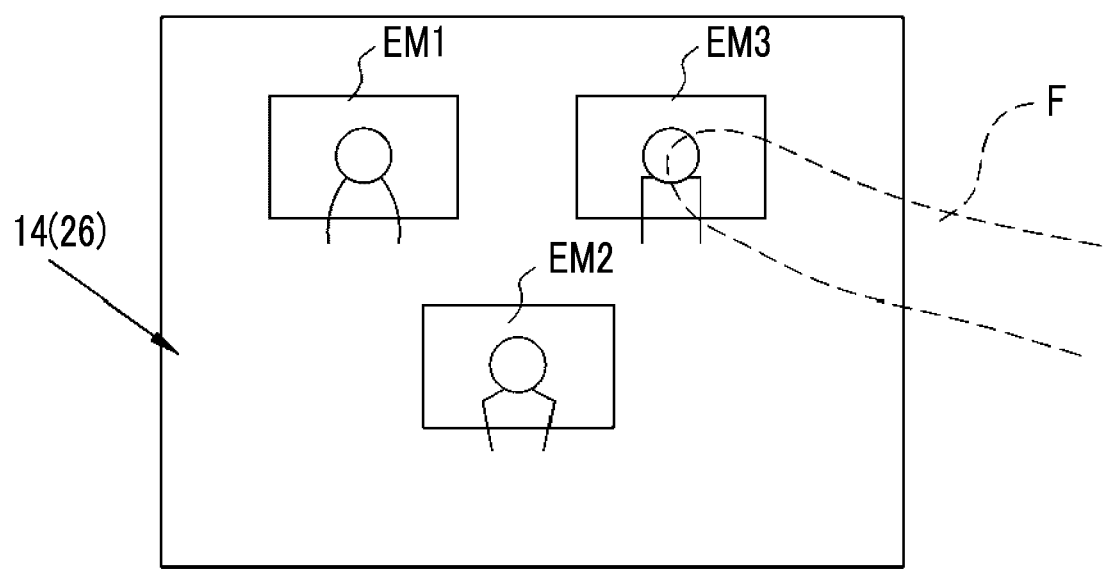
FIG. 13 is an explanatory diagram illustrating a state in which a main subject area is designated by inputting with a touch panel.

As shown in FIG. 13, in a case where the touch panel 27 is touched with the finger F or the like with respect to the main subject image displayed in a live view manner on the rear side display section 14 in the manual focus mode, the main subject area detection section 51 detects an area, which is centered on the position designated by the touch, as the main subject area EM. As described above, in the present embodiment, for example, the main subject areas EM1 to EM3 at three positions can be detected. For example, in the manual focus mode, the first to third main subject areas EM1 to EM3 are detected in the order of touch of the touch panel 27 after start of the operation of the touch panel 27. Hereinafter, in a case where it is not necessary to distinguish the first to third main subject areas EM1 to EM3, they are referred to as the main subject areas EM.

The defocus amount detection section 52 acquires a first imaging signal generated by the first phase difference pixel 36a and a second imaging signal generated by the second phase difference pixel 36b for each of the main subject areas EM, detects the amount of phase difference therebetween, and calculates the amount of defocus from this amount of phase difference.

The defocus image generation section 53 generates the defocus image 57, on the basis of each amount of defocus of the main subject areas EM calculated by the defocus amount detection section 52. The first to third defocus images 57a to 57c are defocus images corresponding to the first to third main subject areas EM1 to EM3, respectively. Hereinafter, in a case where it is not necessary to distinguish the defocus images 57a to 57c, they are referred to as the defocus images 57.

The defocus images 57a to 57c are displayed on a liquid crystal display device (EVFLCD) 61 of the finder section 15 to be described later.

Figure 14A:
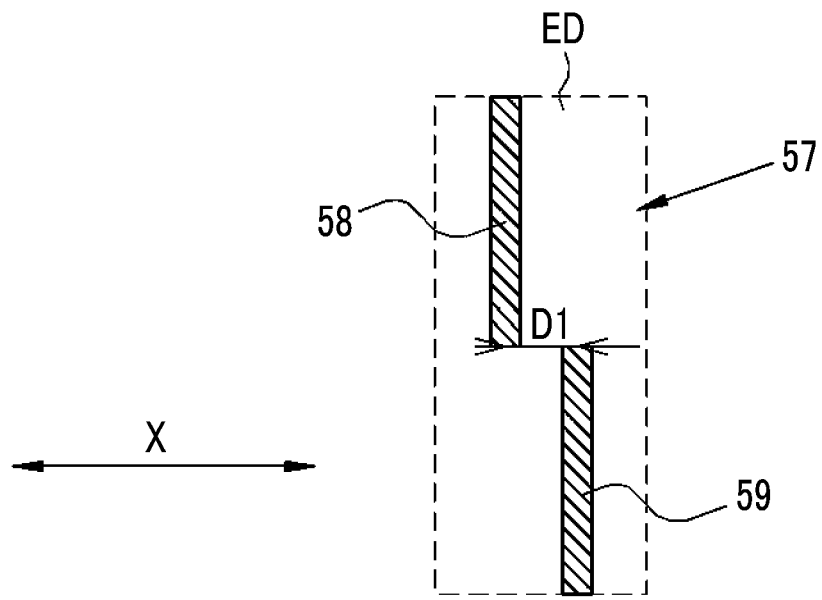
FIG. 14A is an explanatory diagram illustrating a defocus image in an out-of-focus state.
Figure 14B:
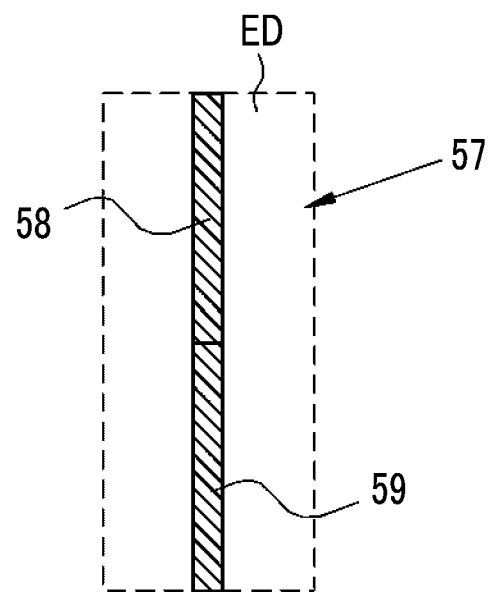
FIG. 14B is an explanatory diagram illustrating a defocus image in an in-focus state.

As shown in FIG. 14A, the defocus image 57 is indicated by first and second indicators 58 and 59 that are spaced from each other in the horizontal direction X (first direction). The first and second indicators 58 and 59 each have a bar shape longer in the vertical direction Y than in the horizontal direction X. A first distance D1, which is a distance between the first and second indicators 58 and 59 in the horizontal direction X, indicates an amount of defocus of the imaging optical system 16. The first distance D1 is smaller as the amount of defocus is smaller. In FIGS. 9, 14A, and 14B, the defocus image display area ED including the defocus image 57 is indicated by a rectangular frame (a rectangular frame indicated by a dashed line), but this rectangular frame is a virtual line. In the present embodiment, the rectangular frame is not actually shown, but may be indicated by a solid line or the like. This also applies to the following drawings.

The defocus image generation section 53 generates the defocus images 57a to 57c whenever the first and second imaging signals are obtained. In the manual focus mode, in a case where focus adjustment of the imaging optical system 16 is performed by rotating the focus ring 17, the defocus images 57a to 57c change in accordance with the change in the amount of defocus. The photographer is able to recognize the focus states in the first to third main subject areas EM1 to EM3 on the basis of the first distance D1 of the defocus images 57a to 57c.

In the present embodiment, since the defocus images 57a to 57c are formed on the basis of the amounts of defocus corresponding to the first to third main subject areas EM1 to EM3, in a case of rotating the focus ring 17 while checking the defocus images 57a to 57c, the focus adjustment in the first to third main subject areas EM1 to EM3 is performed.

In a case where the amount of defocus is "0", that is, in a case where any one of the first to third main subject areas EM1 to EM3 is brought into focus by the rotation operation of the focus ring 17, as shown in FIG. 14B, the first distance D1 in the defocus image 57 of the main subject area brought into focus is "0", and the first and second indicators 58 and 59 are aligned in a straight line.

On the basis of the area information of the first to third main subject areas EM1 to EM3 detected by the main subject area detection section 51, the close range state determination section 54 determines that the first to third main subject areas EM1 to EM3 are in a close range state, that is, determines that any one of the first to third main subject areas EM1 to EM3 and another one thereof are positioned to be close, that is, determines whether or not a distance between both of them in the horizontal direction X is smaller than a width WD of the defocus images 57a to 57c in the horizontal direction X, and then determines that those are close in a case where the distance is smaller. For example, as shown in FIG. 15, in a case where a distance T between the first main subject area EM1 and the third main subject area EM3 in the horizontal direction X is smaller than the width WD of the defocus images 57a to 57c in the horizontal direction X, it is determined that the first main subject area EM1 and the third main subject area EM3 are in the close range state.

The width WD of the defocus images 57a to 57c in the horizontal direction X is, for example, a width dimension in a state where the distance D1 between the first and second indicators 58 and 59 is largest. In a case of displaying a rectangular frame indicating the defocus image display area ED, it is preferable to set the width dimension of the rectangular frame to the width WD.

On the basis of the determination result of the close range state determination section 54 and the area information of the first to third main subject areas EM1 to EM3, the display position control section 55 transmits control signals, which are for controlling the display positions of the defocus images 57a to 57c, to the finder display control section 48. That is, in a case where the close range state determination section 54 determines that any one of the first to third main subject areas EM1 to EM3 and another one are in the close range state, a control signal for giving an instruction to display the defocus image 57 of one main subject area EM at a position where the image does not overlap with another main subject area EM is transmitted to the finder display control section 48.

In the present embodiment, in a case of displaying each of the defocus images 57a to 57c of the first to third main subject areas EM1 to EM3, the display position control section 55 determines whether to display the image on the right side or the left side of the corresponding main subject area EM, in accordance with whether or not the image overlaps with another main subject area EM. For example, the defocus images 57a to 57c are basically displayed on the right sides of the first to third main subject areas EM1 to EM3, but displayed on the left sides in a case where each image thereof overlaps with another main subject area EM.

The medium control section 46 controls recording and reading of image files into and from the recording medium 50. The recording medium 50 is, for example, a memory card into which a flash memory is built. The medium control section 46 records the image data compressed by the digital signal processing section 45 on the recording medium 50.

The rear side display control section 47 controls image display on the above-mentioned rear side display section 14. Specifically, the rear side display control section 47 generates a video signal complying with the NTSC standard on the basis of the image data, which is generated by the digital signal processing section 45, and outputs the signal to the rear side display section 14.

On the other hand, in the manual focus mode, the rear side display control section 47 causes the rear side display section 14 to perform the live view display in order to detect the first to third main subject areas EM1 to EM3 under the control of the main subject area detection section 51.

The finder display control section 48 generates a video signal on the basis of the image data in a manner similar to that of the rear side display control section 47, and outputs the signal to the EVFLCD 61.

In the finder section 15, an EVFLCD 61, a prism 62, and an OVF shutter (optical shutter) 63 are provided.

The EVFLCD 61 corresponds to the above-mentioned observation area E, and a subject display area ES, on which a subject image is displayed, and an information display area EI, on which an information image is displayed, are set thereon. Further, in the subject display area ES, the rectangular frames FM1 to FM3 indicating the first to third main subject areas EM1 to EM3 are set. The information display area EI is set in a rectangular shape along the lower end of the subject display area ES. The subject image is a normal image 56 generated by the digital signal processing section 45. Further, the information image is generated by the main control section 32.

A half mirror 68 as the optical path combining section is formed inside the prism 62. The half mirror 68 is disposed to form an angle of 45 degrees with respect to the first optical path 69, through which the optical image of the subject incident onto the finder objective window 15a propagates, and the second optical path 70 through which the display image displayed on the EVFLCD 61 propagates. The half mirror 68 obtains a third optical path 71 by combining the first optical path 69 and the second optical path 70. The finder eyepiece section 15b is disposed on the third optical path 71.

The half mirror 68 transmits a part of the optical image, which propagates on the first optical path 69, so as to guide the image into the third optical path 71, and reflects a part of the display image, which propagates on the second optical path 70, so as to guide the image into the third optical path 71. Thereby, the optical image and the display image are guided into the finder eyepiece section 15b.

The OVF shutter 63 is a liquid crystal shutter, and is disposed on the first optical path 69. The OVF shutter 63 is controlled by the main control section 32 such that it switches between "a closed state", in which the optical image incident from the finder objective window 15a is not incident into the prism 62 by blocking light of the optical image, and "an open state" in which the optical image is transmitted and incident into the prism 62. The OVF shutter 63 is set to the "open state" in the OVF mode, and is set to the "closed state" in the EVF mode.

The EVFLCD 61 has a backlight and a liquid crystal panel (both not shown), the backlight emits light to the liquid crystal panel, and images are displayed by light transmitted through the liquid crystal panel.

The finder display control section 48 generates video signals different in the EVF mode and the OVF mode. In the EVF mode, the finder display control section 48 generates a video signal, on the basis of the normal image 56, the defocus images 57a to 57c, the area information of the first to third main subject areas EM1 to EM3, the control signal of the display position control section 55, and the information image. Specifically, the finder display control section 48 grasps the area information of the subject display area ES and the information display area EI of the EVFLCD 61, displays the normal image 56, the rectangular frames FM1 to FM3 indicating the first to third main subject areas EM1 to EM3, and the defocus images 57a to 57c in the subject display area ES, and generates a video signal for displaying the information image in the information display area EI. Regarding signal values of parts corresponding to the information display area EI of the video signal, signal values of a part indicating imaging information such as texts are at the maximum gray (white) level, and signal values of the other part are at the minimum gray (black) level.

On the other hand, in the OVF mode, the finder display control section 48 generates a video signal, on the basis of the defocus images 57a to 57c, the area information of the first to third main subject areas EM1 to EM3, the control signal of the display position control section 55, and the information image. Specifically, the finder display control section 48 hides the subject display area ES excluding the rectangular frames FM1 to FM3 indicating the first to third main subject areas EM1 to EM3 and the defocus images 57a to 57c, and generates a video signal for displaying the rectangular frames FM1 to FM3, the defocus images 57a to 57c, and the information image in the information display area EI.

The EVFLCD 61 changes light transmittances of liquid crystal cells, on the basis of the input video signals. Specifically, the light transmittances of the liquid crystal cells are set as transmittances corresponding to respective signal values of the video signal. In particular, a signal value is set as the minimum transmittance, at the black level, and is set as the maximum transmittance, at the white level.

In a case of generating the video signal in the EVF mode and the OVF mode, the finder display control section 48 changes the position at which the defocus images 57a to 57c are displayed on the basis of the control signal transmitted from the display position control section 55. In addition, the finder display control section 48 displays the defocus image 57 outside the main subject area EM and at a position close to the main subject area EM. Here, the term "close" is not limited to a state in which the defocus image 57 is in contact with the main subject area EM, and the defocus image 57 may be spaced from the main subject area EM to some extent. For example, assuming that the width of the main subject area EM in the horizontal direction X is WM (refer to FIG. 9), a state, in which the defocus image 57 is displayed within the range of the width WM from the side of the main subject area EM, is defined as a close range state.

In the present embodiment, the finder display control section 48 displays the defocus images 57a to 57c of the first to third main subject areas EM1 to EM3 at a position close to the right side or the left side of the first to third main subject areas EM1 to EM3, on the basis of the control signal transmitted from the display position control section 55.

That is, in a case where it is determined that any one of the first to third main subject areas EM1 to EM3 is close to another one, the finder display control section 48 displays the defocus image 57 of the main subject area EM, which is in the close range state in the determination, at a position where the image does not overlap with another main subject area EM. In addition, the finder display control section 48 displays the defocus image 57 of the main subject area EM, which is not in the close range state in the determination, at a predetermined position close to the main subject area EM (for example, on the right side of the main subject area EM).

For example, as shown in FIG. 15, in a case where it is determined that the first main subject area EM1 and the third main subject area EM3 are in the close range state, the finder display control section 48 displays the defocus image 57a at the position where the image does not overlap with the third main subject area EM3, that is, on the left side of the corresponding first main subject area EM1. Further, the finder display control section 48 displays the defocus image 57c at a position where the image does not overlap with the first main subject area EM1, that is, on the right side of the corresponding third main subject area EM3. In addition, in a case where it is determined that an area is not close to another one in a manner similar to that of the second main subject area EM2 shown in FIG. 15, the finder display control section 48 displays the defocus image 57b on the right side of the second main subject area EM2 as the predetermined position.

As described above, in the EVF mode, the normal image 56, the rectangular frames FM1 to FM3, and the defocus images 57a to 57c are displayed in the subject display area ES of the EVFLCD 61, and the information image is displayed in the information display area EI. As a result, the subject image, the rectangular frames FM1 to FM3, the defocus images 57a to 57c, the information image, and the like shown in FIG. 15 are guided into the observation area E of the finder eyepiece section 15b.

Figure 16:
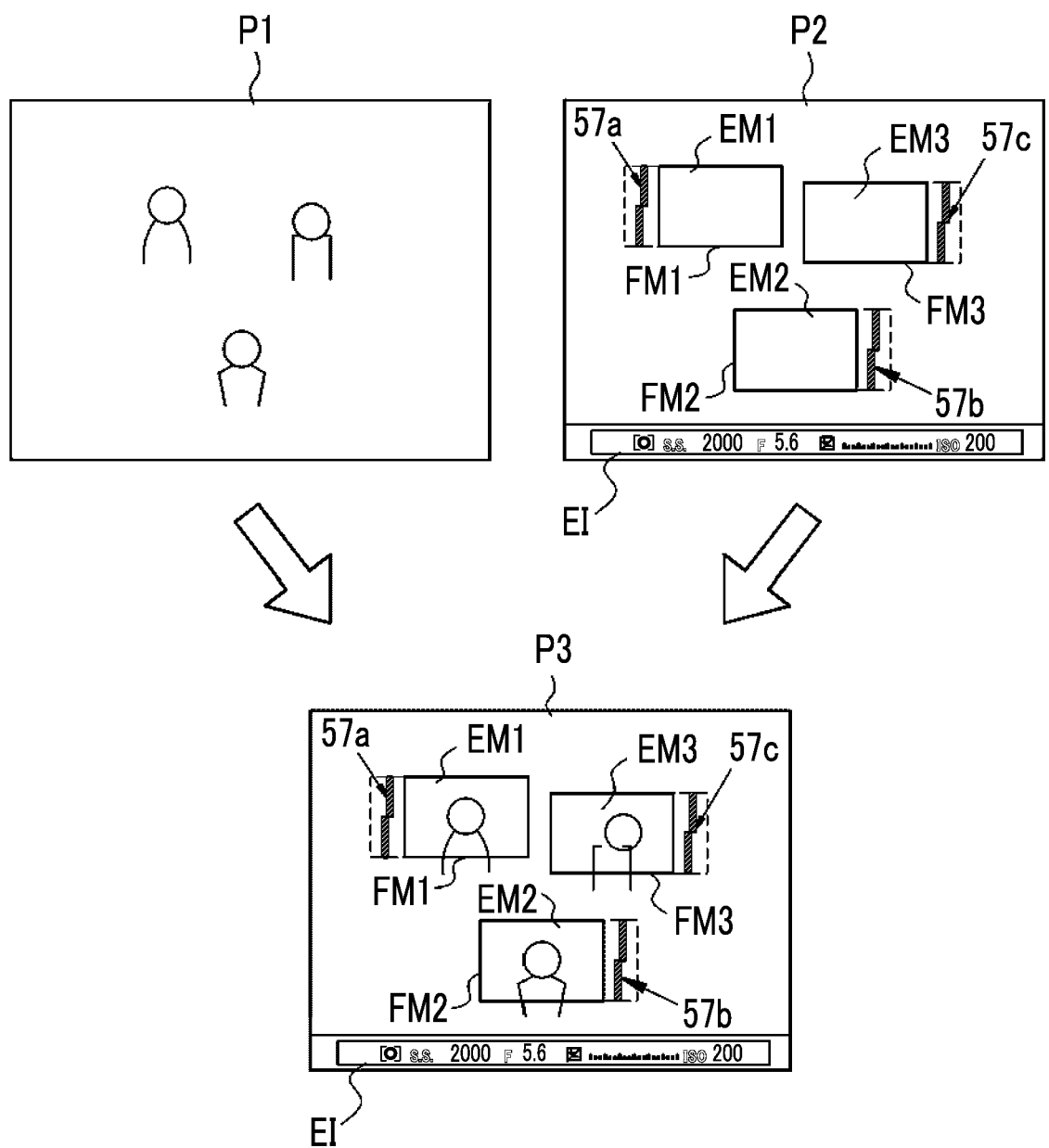
FIG. 16 is a diagram illustrating an OVF image in which an optical image and an information image overlap.

On the other hand, in the OVF mode, the normal image 56 is not displayed in the subject display area ES except for the rectangular frames FM1 to FM3 and the defocus images 57a to 57c, and the subject display area ES is displayed in black. In the OVF mode, the defocus image 57 is displayed in the defocus image display area ED, and an information image is displayed in the information display area EI. In the OVF mode, since the OVF shutter 63 is set to the "opened state", the optical image is transmitted through the OVF shutter 63, propagates on the first optical path 69, is transmitted through the half mirror 68, and is guided into the third optical path 71. As a result, as shown in FIG. 16, in the OVF image P3, the optical image P1 overlaps with the image P2 consisting of the information image, the rectangular frames FM1 to FM3, and the defocus images 57a to 57c. The OVF image P3 is guided into observation area E of a finder eyepiece window 26a.

Figure 17:
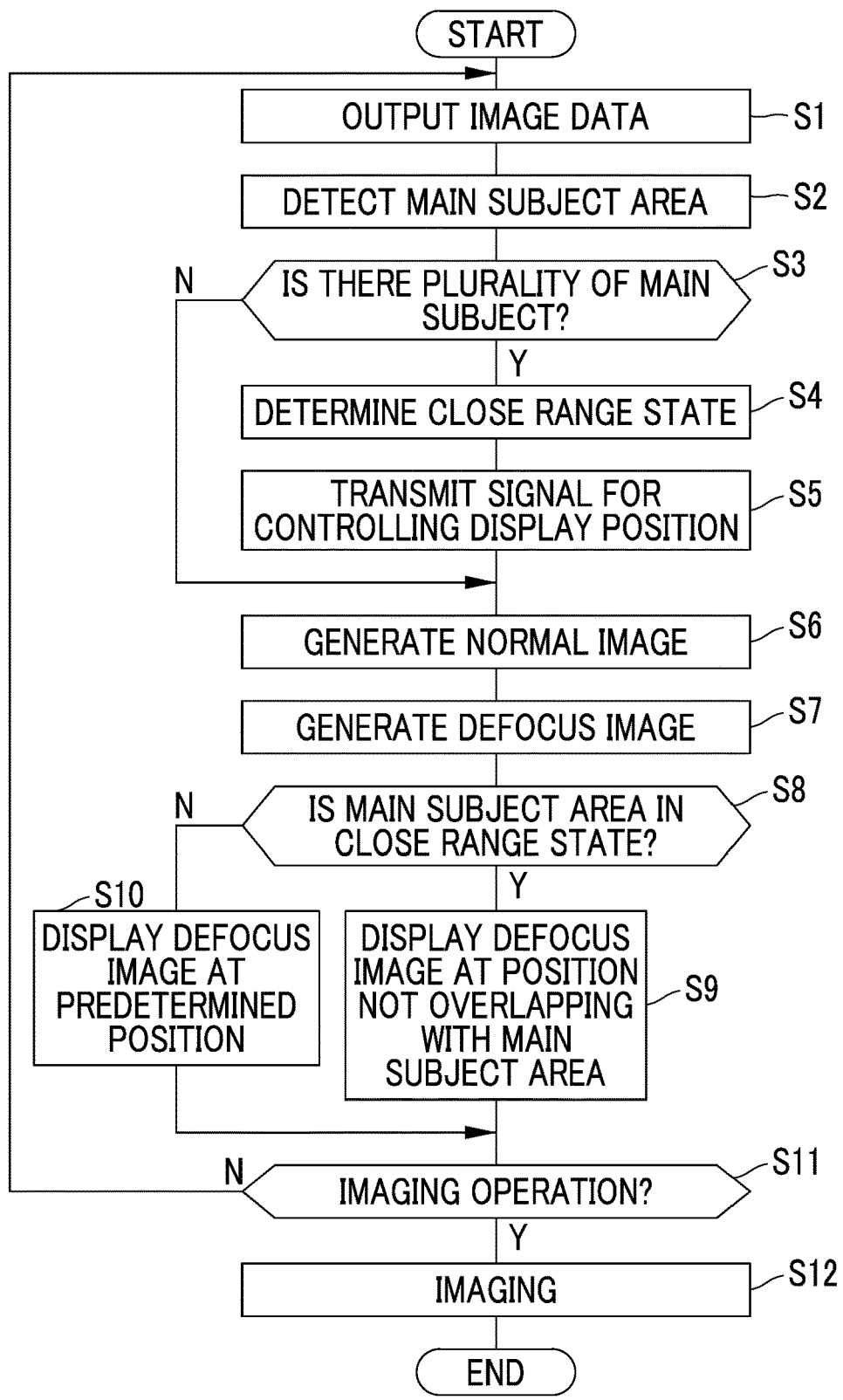
FIG. 17 is a flowchart explaining processing of displaying a defocus image at the time of imaging.

Next, operations of the digital camera 11 will be described with reference to the flowchart shown in FIG. 17. First, in a case where a photographer operates the power button 19 so as to turn on the power, a power supply voltage is supplied to each section of the digital camera 11. Furthermore, in a case where the mode button 24 is operated and the imaging mode is selected, the imaging element 31, the main control section 32, and the finder section 15 start operating. In the flowchart shown in FIG. 17, a case where the setting of the finder switch lever 21 is the EVF mode and the setting of the AF/MF changeover switch 23 is the manual focus mode will be described.

In a case where the imaging element 31 starts to operate, a subject image is incident onto the light receiving surface 31a through the imaging optical system 16, and photoelectrically converted by the normal pixel 35, the first phase difference pixel 36a, and the second phase difference pixel 36b, and the image data is output (S1). In a case where the image data is output, the main subject area detection section 51 causes the rear side display section 14 to perform the live view display on the rear side display control section 47, and detects the main subject area by operating the touch panel 27 (S2).

In a case where the main subject area detection section 51 detects a plurality of main subject areas, for example, the first to third main subject areas EM1 to EM3 (Y in S3), the close range state determination section 54 determines the close range state on the basis of the area information of the first to third main subject areas EM1 to EM3 (S4). On the basis of the determination result of the close range state determination section 54 and the area information of the first to third main subject areas EM1 to EM3, the display position control section 55 transmits control signals, which are for controlling the display positions of the defocus images 57a to 57c, to the finder display control section 48 (S5).

In a case where the main subject area detection section 51 detects only one main subject area (N in S3), the determination of the close range state and the transmission of the control signal for controlling the display position of the defocus image are not performed. In addition, in a case where the main subject area detection section 51 detects only two main subject areas, in a manner similar to that of a case where the three main subject areas EM1 to EM3 are detected, the determination of the close range state and the transmission of the control signal for controlling the display position of the defocus image are performed. In a case where the main subject area detection section 51 does not detect the main subject area EM, the determination of the close range state and the transmission of the control signal for controlling the display position of the defocus image may be performed using the area information of the main subject area EM which is set in the previous imaging mode.

The image data temporarily stored in the memory 49 is output to the digital signal processing section 45. The digital signal processing section 45 generates a normal image 56 on the basis of the imaging signal which is output from the normal pixels 35 (S6). On the other hand, in the digital signal processing section 45, the amount of defocus is detected, on the basis of the first and second imaging signals which are output from the first and second phase difference pixels 36a and 36b included in the first to third main subject areas EM1 to EM3, and the defocus images 57a to 57c are generated, on the basis of this amount of defocus (S7). Then, the area information of the first to third main subject areas EM1 to EM3, the normal image 56, and the defocus images 57a to 57c are sent to the finder display control section 48. In addition, the imaging information about the imaging mode, the shutter speed, the stop, and the like is also sent to the finder display control section 48.

The finder display control section 48 generates a video signal on the basis of the area information of the first to third main subject areas EM1 to EM3, the normal image 56, the defocus images 57a to 57c, the information image, and the control signals of the display position control section 55, thereby displaying the signal on the EVFLCD 61. For example, in a case where it is determined that any one of the first to third main subject areas EM1 to EM3 and another one are in the close range state (Y in S8), a video signal, which is for displaying the defocus image 57 of the one main subject area EM at a position where the image does not overlap with another main subject area EM, is generated, and displayed on the EVFLCD 61 (S9). On the other hand, in a case where it is determined that any one of the first to third main subject areas EM1 to EM3 and another one are not in the close range state, or in a case where only one main subject area EM is detected, a video signal for displaying the defocus image 57 at a predetermined position (for example, the right side) close to the main subject area EM is generated, and displayed on the EVFLCD 61 (S10).

The normal image 56 and the defocus image 57 are generated on the basis of the image data, which is output from the imaging element 31, and the area information of the main subject area EM whenever imaging per one frame is performed, and displayed on the EVFLCD 61. In a case where the first and second indicators 58 and 59 of the defocus image 57 are positioned to be spaced by the first distance D1, if the focus adjustment of the imaging optical system 16 is adjusted by the rotation operation of the focus ring 17, the defocus image 57 changes in accordance with the change in the amount of defocus. In a case where the imaging optical system 16 is brought into focus by the rotation operation of the focus ring 17, the first distance D1 becomes "0", and the first and second indicators 58 and 59 are aligned in a straight line shape. A photographer is able to recognize the focus state of the imaging optical system 16 through the defocus image 57.

The photographer performs focus adjustment while checking the defocus image 57, and then presses the release button 20, thereby performing the imaging operation (Y in S11). In a case where the release button 20 is pressed, imaging is performed by the imaging element 31, and the normal image 56 is generated. This normal image 56 is compressed, and subsequently recorded on the recording medium 50 through the medium control section 46 (S12). In a case where the imaging operation is not performed (N in S11), the process returns to step S1.

As described above, even in a case where the plurality of main subject areas EM1 to EM3 are detected, the defocus image 57 of one main subject area EM is displayed at a position where the image does not overlap with another main subject area EM. Therefore, the defocus image 57 is displayed at an optimum position where it is easy for the photographer to visually perceive the image.

[Second Embodiment]

Figure 18A:
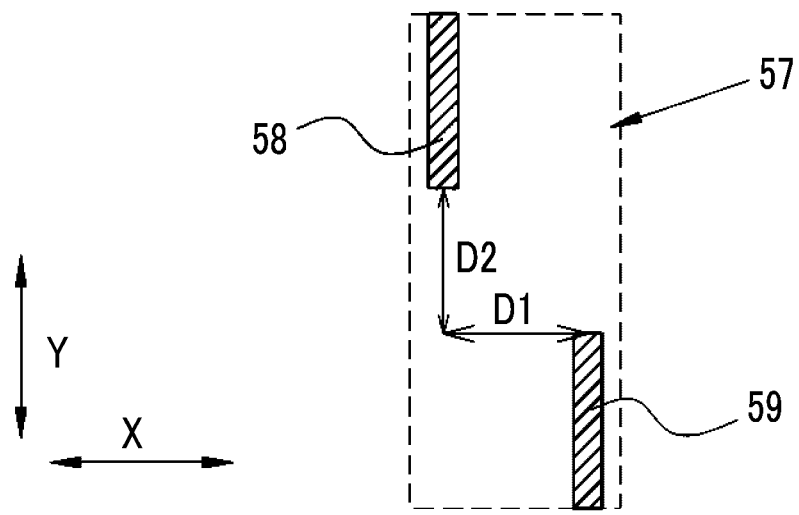
FIG. 18A is an explanatory diagram illustrating a defocus image of a second embodiment in an out-of-focus state.

In the first embodiment, the first and second indicators 58 and 59 constituting the defocus image 57 are spaced in the horizontal direction X (first direction), but in the second embodiment, as shown in FIG. 18A, the first and second indicators 58 and 59 are spaced not only in the horizontal direction X but also in the vertical direction Y (second direction) orthogonal to the horizontal direction X. In this case, as the amount of defocus of the imaging optical system 16 is smaller, the first distance D2, which is a distance between the first and second indicators 58 and 59 in the vertical direction Y, is made smaller. In the second embodiment and the embodiments thereafter, the shape of the digital camera is the same as that of the first embodiment in terms of the front face, the rear face, each side face, the planar face, and the bottom face.

Figure 18B:
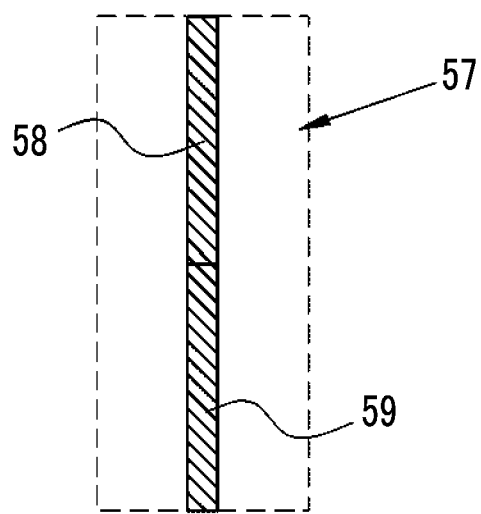
FIG. 18B is an explanatory diagram illustrating the defocus image of the second embodiment in an in-focus state.

As shown in FIG. 18B, in a case where the amount of defocus is "0", that is, in a case where the imaging optical system 16 is brought into focus by the rotation operation of the focus ring 17, both the first distance D1 and the second distance D2 become are "0", and the first and second indicators 58 and 59 are aligned in a straight line.

[Third Embodiment]

Figure 19A:
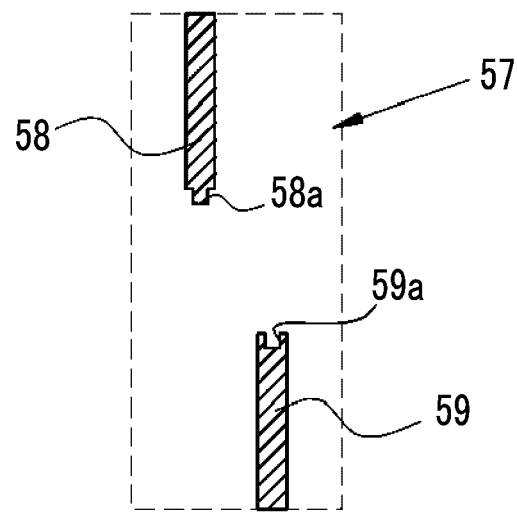
FIG. 19A is an explanatory diagram illustrating a defocus image of a third embodiment in an out-of-focus state.
Figure 19B:
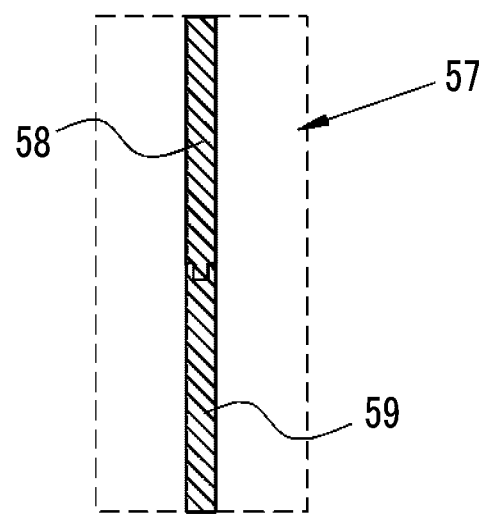
FIG. 19B is an explanatory diagram illustrating the defocus image of the third embodiment in an in-focus state.

In the third embodiment, as shown in FIG. 19A, a convex portion 58a is provided on a first indicator 58, and a concave portion 59a is provided on a second indicator 59. The convex portion 58a is provided in a portion of the first indicator 58 facing the second indicator 59 in the vertical direction Y. The concave portion 59a is provided in a portion of the second indicator 59 facing the first indicator 58 in the vertical direction Y. The first and second indicators 58 and 59 are spaced in the horizontal direction X and the vertical direction Y, in a manner similar to that of the second embodiment. As shown in FIG. 19B, in a case where the amount of defocus is "0", that is, in a case where the imaging optical system 16 is brought into focus, the distance between the first and second indicators 58 and 59 becomes "0", the convex portion 58a and the concave portion 59a are fitted.

[Fourth Embodiment]

Figure 20A:
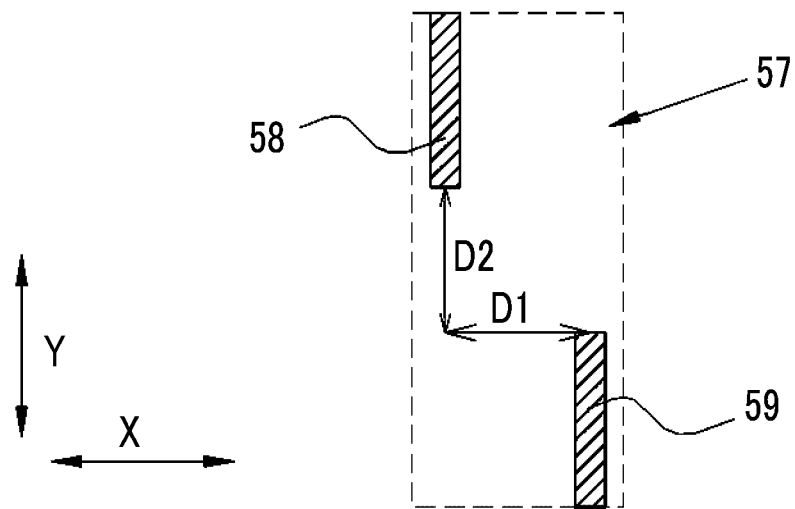
FIG. 20A is an explanatory diagram illustrating a defocus image of a fourth embodiment in an out-of-focus state.
Figure 20B:
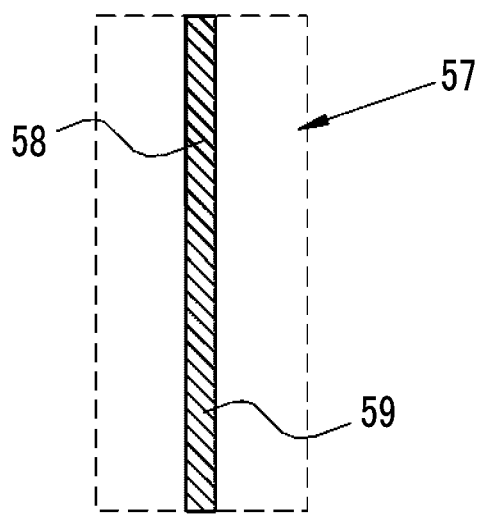
FIG. 20B is an explanatory diagram illustrating the defocus image of the fourth embodiment in an in-focus state.

In the first to third embodiments, in a case where the imaging optical system 16 is brought into focus, the distance between the first and second indicators 58 and 59 becomes "0" and the indicators have a straight line shape. However, in the fourth embodiment, in a case of the in-focus state, the first and second indicators 58 and 59 have a straight line shape, and the boundary line indicating the boundary between both of those disappears, and the indicators are integrated. For example, as shown in FIG. 20A, the first and second indicators 58 and 59 are spaced in the horizontal direction X and the vertical direction Y in accordance with the amount of defocus. However, as shown in FIG. 20B, in a case where the amount of defocus is "0", that is, in a case where the imaging optical system 16 is brought into focus, the first and second indicators 58 and 59 are integrated.

In the first to fourth embodiments, the state in which the amount of defocus is "0" is set as the in-focus state. However, the present invention is not limited to this, and a state where the amount of defocus is within the focal depth (that is, a state where the subject is within the field depth) may be set as the in-focus state. The state in which the amount of defocus is within the focal depth corresponds to a state in which the diameter of the circle of confusion is within the range of the allowable diameter of the circle of confusion or less. The state in which the amount of defocus is "0" corresponds to a state in which the diameter of the circle of confusion is the smallest.

In such a manner, in a case where the state in which the amount of defocus is within the focal depth is set as the in-focus state, it is preferable that the display of the defocus image 57 changes through the first stage in which the amount of defocus is within the focal depth and the first stage in which the amount of defocus becomes "0". For example, in the first stage, the first and second indicators 58 and 59 are aligned in a straight line. In this first stage, a boundary line indicating the boundary between the first and second indicators 58 and 59 is displayed between the first and second indicators 58 and 59. In the second stage, the boundary line is erased, and the first and second indicators 58 and 59 are integrated.

Further, the present invention is not limited to the two stages of the first stage and the second stage, and it is also preferable to change the defocus image 57 stepwise or continuously between the first stage and the second stage. For example, in a case where the amount of defocus is within the focal depth, in the first stage, the first and second indicators 58 and 59 are aligned in a straight line. Then, as the amount of defocus decreases, the boundary line between the first and second indicators 58 and 59 is erased stepwise or continuously. For example, as the amount of defocus decreases, the density of the boundary line decreases. Then, in a case where the amount of defocus becomes "0", in the second stage, the boundary line is completely erased and the first and second indicators 58 and 59 are integrated.

[Fifth Embodiment]

In the fifth embodiment, it is determined whether or not the amount of defocus is within the focal depth of the imaging optical system 16 (that is, whether or not the subject is within the depth of field). In a case where it is determined that the amount of defocus is outside the focal depth, the distance in the second direction is set to be constant regardless of the amount of defocus. In the present embodiment, for example, the digital signal processing section 45 functions as a determination section that determines whether or not the amount of defocus is within the focal depth, and creates the defocus image 57 in accordance with the determination result and the amount of defocus.

Figure 21A:
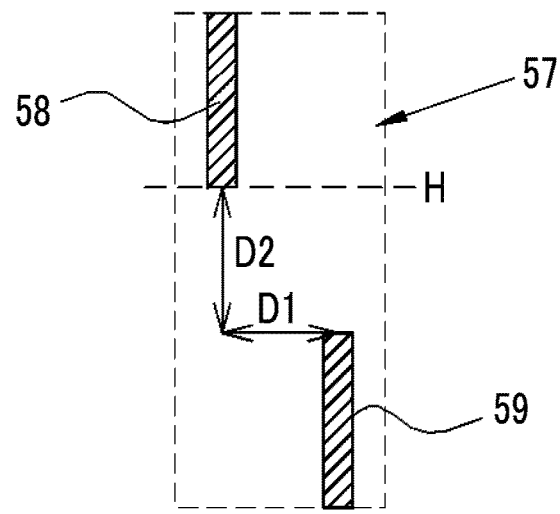
FIG. 21A is an explanatory diagram illustrating a defocus image of a fifth embodiment in an out-of-focus state.
Figure 21B:
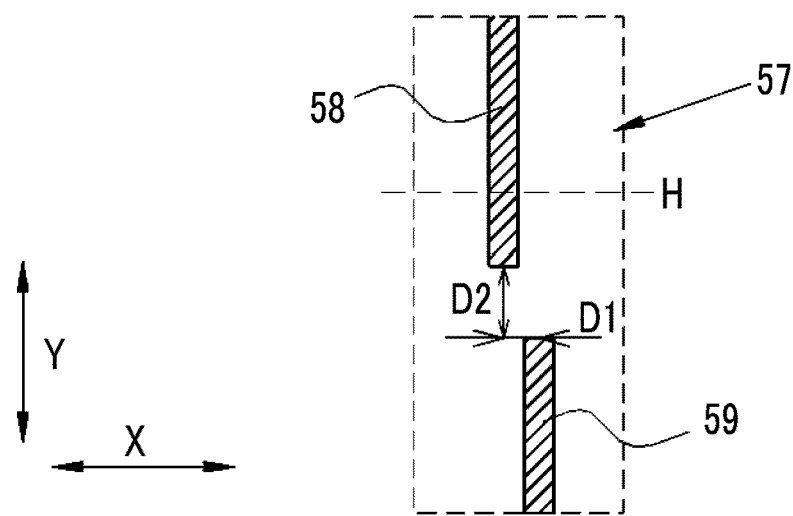
FIG. 21B is an explanatory diagram illustrating the defocus image of the fifth embodiment in an in-focus state.

In a case where the determination section determines that the amount of defocus is outside the focal depth, as shown in FIG. 21A, the second distance D2 is set to a constant value H, regardless of the amount of defocus. On the other hand, in a case where the determination section determines that the amount of defocus is within the focal depth, as shown in FIG. 21B, the second distance D2 is changed in accordance with the amount of defocus. As a result, in a case where the amount of defocus is within the focal depth, the second distance D2 is smaller than the constant value H, and decreases as the amount of defocus decreases.

[Sixth Embodiment]

Figure 22:
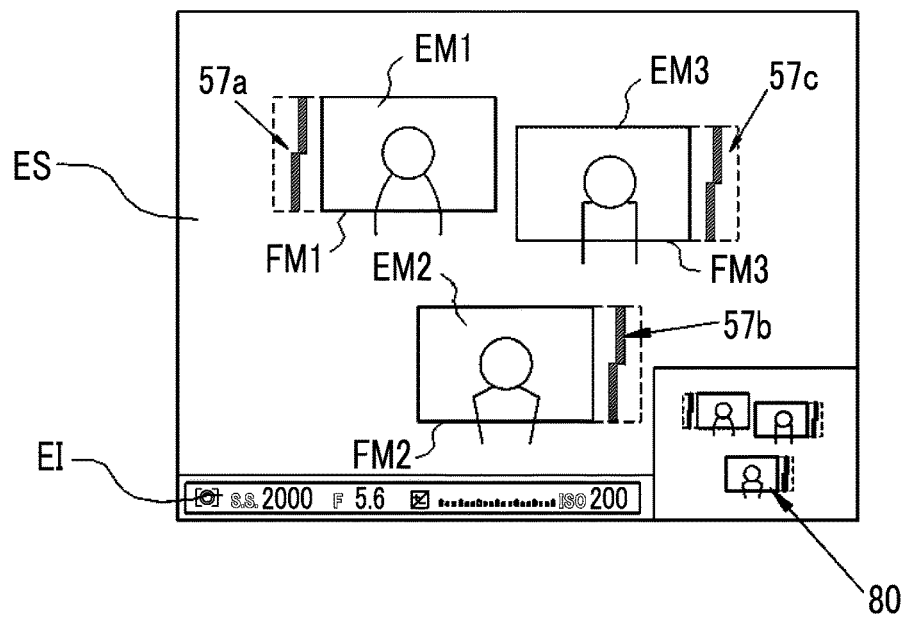
FIG. 22 is a diagram explaining a superimposed display mode of the sixth embodiment.

In the above-mentioned embodiments, the OVF mode and the EVF mode are exemplified as the display modes of the finder section 15, but it is also possible to execute a superimposed display mode in which an electronic image is displayed to be superimposed on an optical image. In this superimposed display mode, as shown in FIG. 22, a normal image 80, which is an electronic image, is displayed near the corner of the observation area E. The normal image 80 corresponds to the subject image in the subject display area ES. In the superimposed display mode, the main control section 32 controls the OVF shutter 63 such that the shutter blocks light from the area corresponding to the normal image 80. Thereby, a photographer is able to recognize the focus state of the imaging optical system 16 not only by the defocus image 57 but also by the normal image 80.

[Seventh Embodiment]

Figure 23:
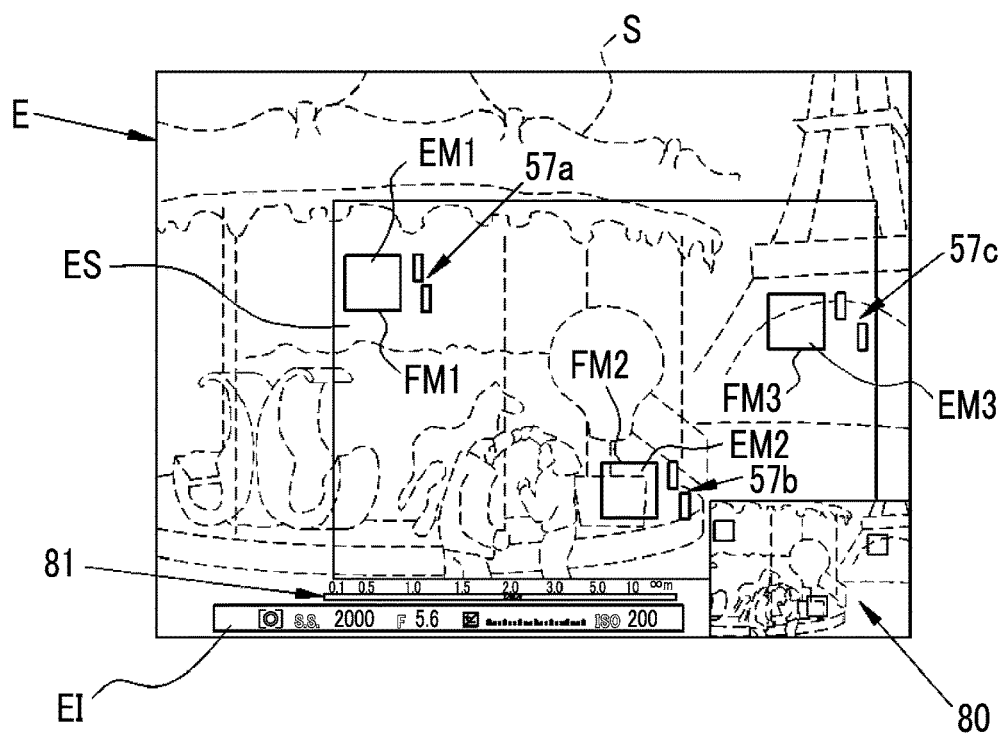
FIG. 23 is a view illustrating an inside of an observation area of a finder section of a seventh embodiment.
Figure 24:
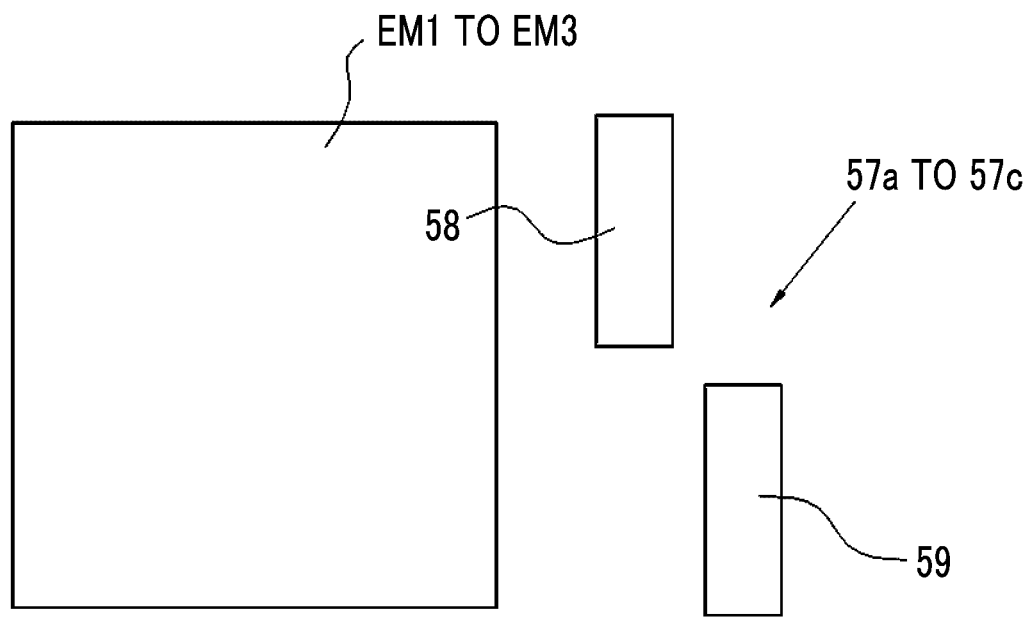
FIG. 24 is a partially enlarged view illustrating a main subject area and a defocus image of the seventh embodiment.

In the seventh embodiment, in addition to the configurations of the first to sixth embodiments, the depth-of-field information image showing the depth of field is displayed in the observation area E. As shown in FIG. 23, the subject display area ES and the information display area EI are set in the observation area E in the finder section 15 in a manner similar to those of the first to sixth embodiments. In the subject display area ES, the first to third main subject areas EM1 to EM3 (areas indicated by the rectangular frames FM1 to FM3) are set. As shown in FIG. 24, the first to third defocus images 57a to 57c are displayed on the right side or the left side of the main subject areas EM1 to EM3 at positions close to the main subject areas EM1 to EM3. In a manner similar to those of the first to sixth embodiments, the first to third defocus images 57a to 57c each are composed of the first and second indicators 58 and 59. As the amount of defocus of the imaging optical system 16 is smaller, the distance between the first and second indicators 58 and 59 is smaller. In a manner similar to those of the first to sixth embodiments, the subject display area ES is an area in which the optical image of the subject or the normal image 56 can be observed, and the subject image S indicated by the dashed line in FIG. 23 is an optical image in the OVF mode, and is the normal image 56 in the EVF mode.

Figure 25:
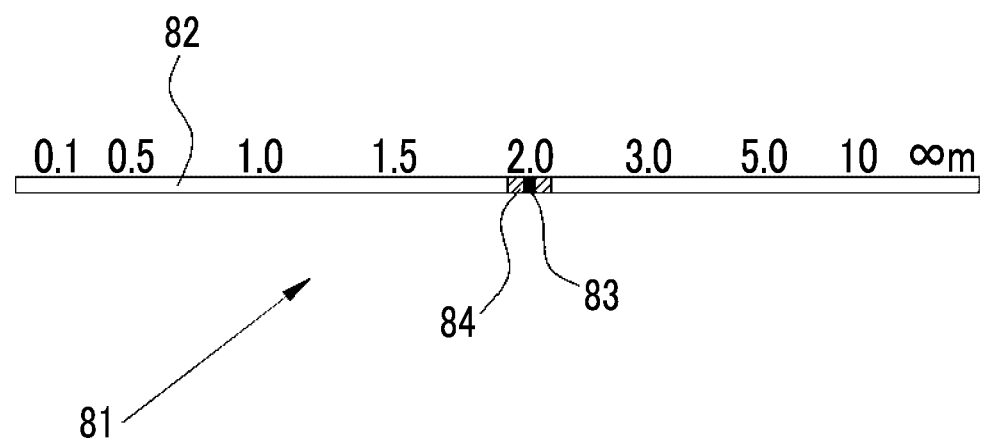
FIG. 25 is a partially enlarged view illustrating a depth-of-field display image of the seventh embodiment.

In the present embodiment, the depth-of-field information image 81 is displayed between the subject display area ES and the information display area EI. As shown in FIG. 25, the depth-of-field information image 81 is composed of a horizontally long belt-like distance indicator 82 with graduations, a vertical line 83 indicating the in-focus position, and a rectangular area 84 (area indicated by hatching) indicating the depth of field. In the manual focus mode, the focus state is adjusted by the rotation operation of the focus ring 17, and in conjunction therewith, the vertical line 83 indicating the in-focus position moves left and right on the distance indicator 82. In addition, the aperture value is adjusted by the rotation operation of the stop ring 18, and in conjunction therewith, the rectangular area 84 relating to the aperture value is displayed to be expanded and contracted on the distance indicator 82 centered on the vertical line 83 indicating the in-focus position.

The rectangular area 84 indicating the depth of field indicates, for example, the depth of field corresponding to one main subject area EM1 to EM3 which has the smallest amount of defocus, that is, which is substantially in the in-focus state, among the main subject areas EM1 to EM3. In a manner similar to that of the sixth embodiment, in the superimposed display mode, the normal image 80, which is an electronic image, is displayed near the corner of the observation area E. The normal image 80 corresponds to the subject image S in the subject display area ES.

[Eighth Embodiment]

Figure 26:
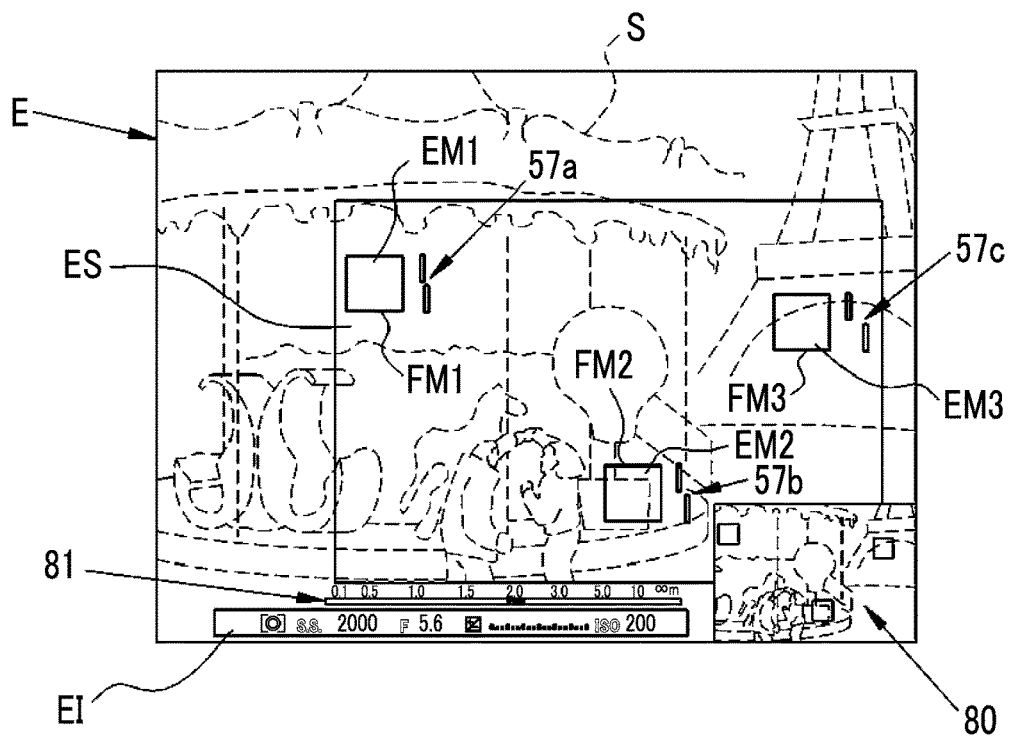
FIG. 26 is a view illustrating an inside of an observation area of a finder section of an eighth embodiment.
Figure 27:
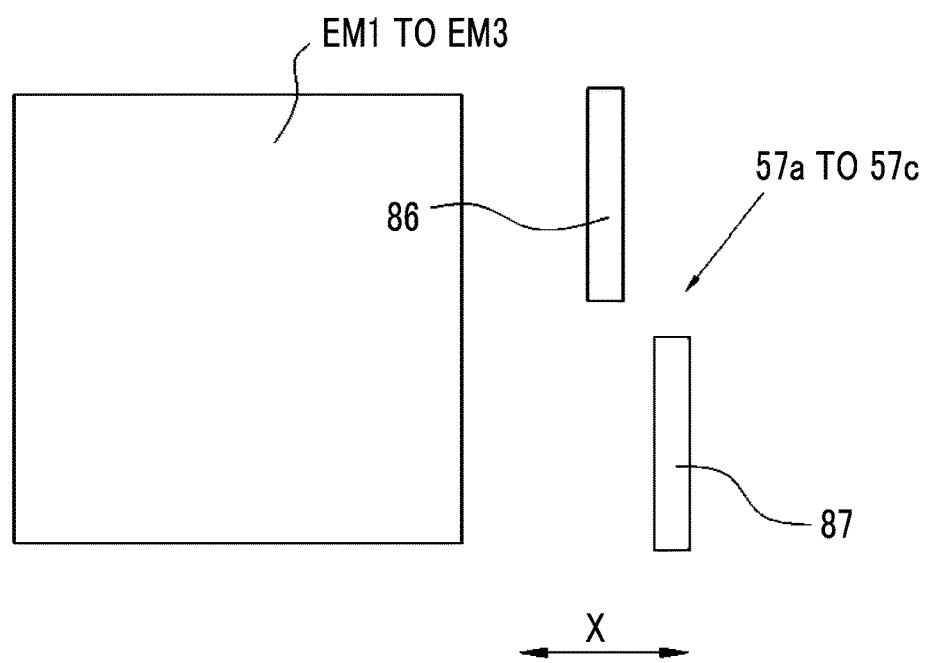
FIG. 27 is a partially enlarged view illustrating a main subject area and a defocus image of the eighth embodiment.

In the eighth embodiment, the first to third defocus images 57a to 57c each are composed of first and second indicators 86 and 87 of which the widths are narrower than those of the first and second indicators 58 and 59 of the seventh embodiment. As shown in FIGS. 26 and 27, the widths of the first and second indicators 86 and 87 in the horizontal direction X are narrower than those of the first and second indicators 58 and 59 of the seventh embodiment. In a manner similar to that of the first and second indicators 58 and 59, as the amount of defocus of the imaging optical system 16 is smaller, the distance between the first and second indicators 86 and 87 is smaller. The configuration other than the first and second indicators 86 and 87 are the same as those of the seventh embodiment.

[Ninth Embodiment]

Figure 28:
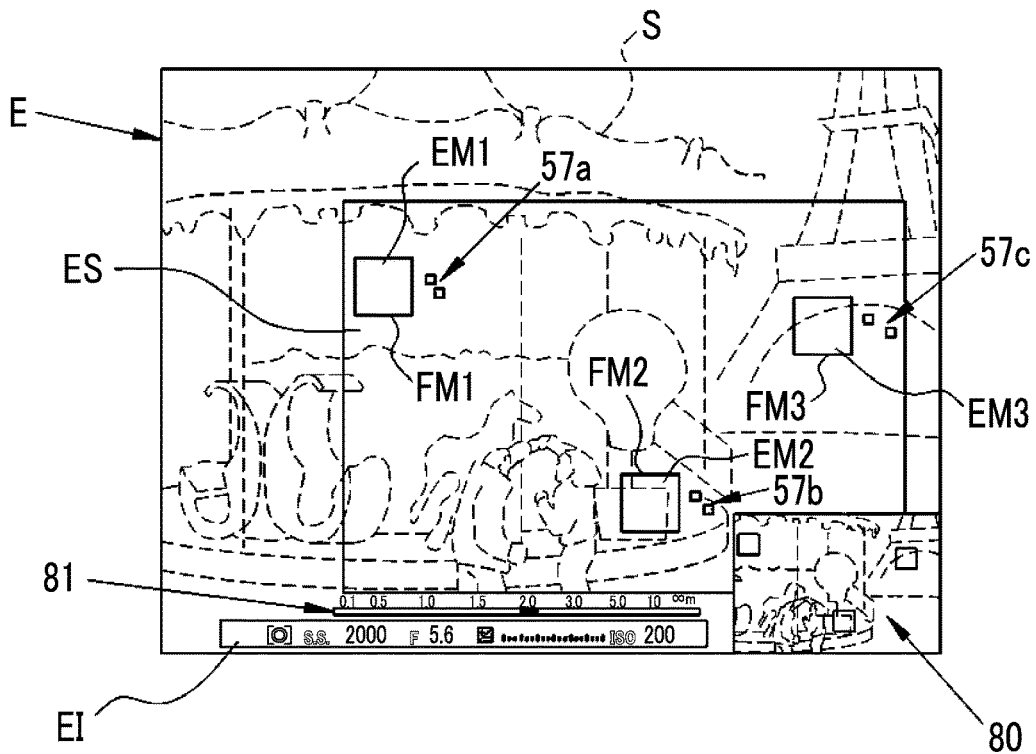
FIG. 28 is a view illustrating an inside of an observation area of a finder section of a ninth embodiment.
Figure 29:
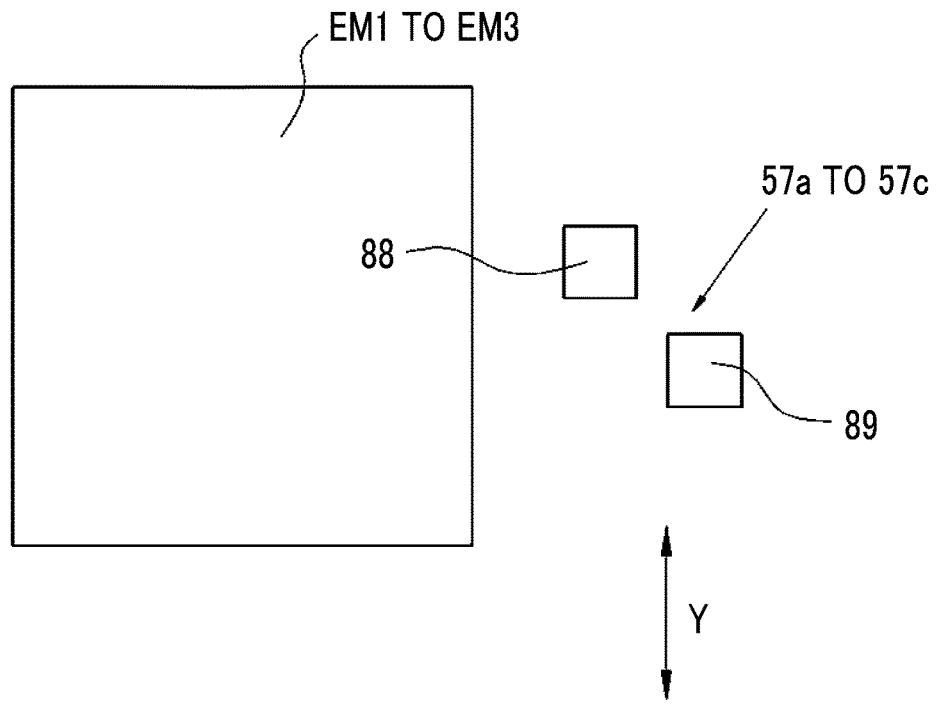
FIG. 29 is a partially enlarged view illustrating a main subject area and a defocus image of the ninth embodiment.

In the ninth embodiment, the first to third defocus images 57a to 57c each are composed of first and second indicators 88 and 89 of which the lengths are shorter than those of the first and second indicators 58 and 59 of the seventh embodiment. As shown in FIGS. 28 and 29, the lengths of the first and second indicators 88 and 89 in the vertical direction Y are shorter than those of the first and second indicators 58 and 59 of the seventh embodiment. In a manner similar to that of the first and second indicators 58 and 59, as the amount of defocus of the imaging optical system 16 is smaller, the distance between the first and second indicators

88 and 89 is smaller. The configuration other than the first and second indicators 88 and 89 are the same as those of the seventh embodiment.

[Tenth Embodiment]

Figure 30:
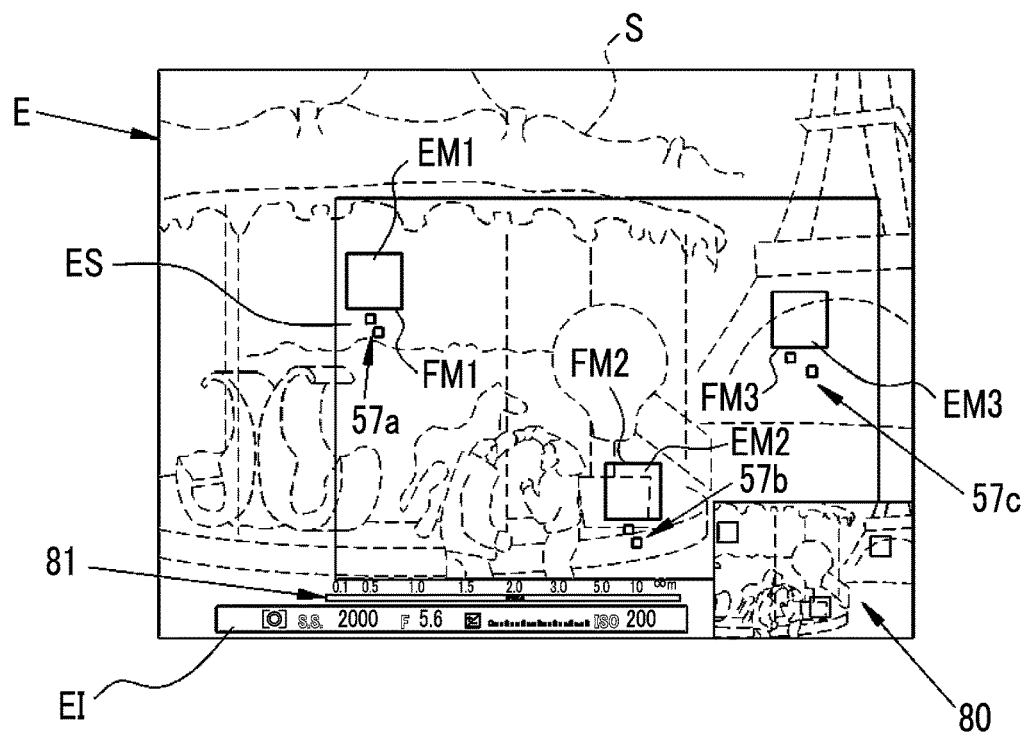
FIG. 30 is a diagram illustrating an inside of an observation area of a finder section of a tenth embodiment.
Figure 31:
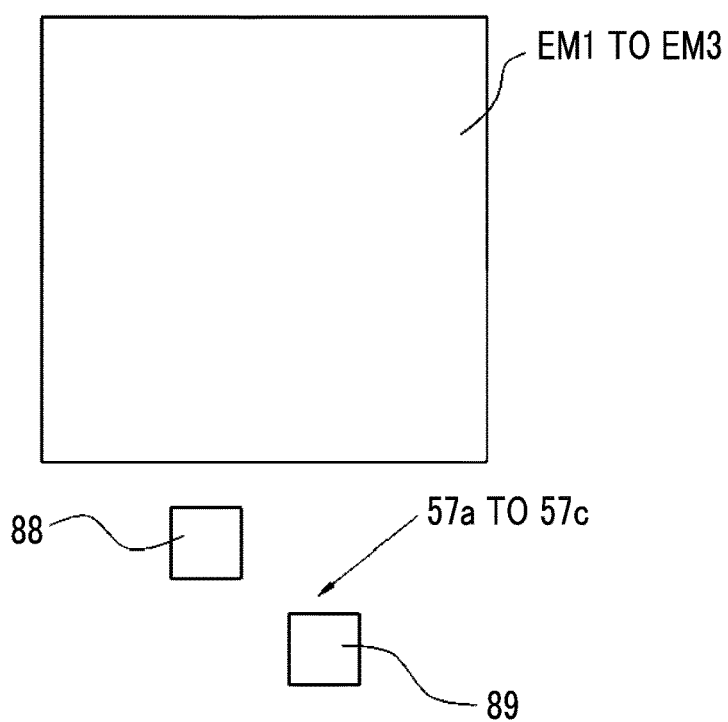
FIG. 31 is a partially enlarged view illustrating a main subject area and a defocus image of the tenth embodiment.

In the tenth embodiment, the first to third defocus images 57a to 57c are displayed below the main subject areas EM1 to EM3. As shown in FIGS. 30 and 31, the first to third defocus images 57a to 57c are arranged close to the corresponding main subject areas EM1 to EM3 and below the main subject areas EM1 to EM3. The configuration other than the arrangement of the first to third defocus images 57a to 57c below the main subject areas EM1 to EM3 is the same as that of the ninth embodiment.

[Eleventh Embodiment]

Figure 32:
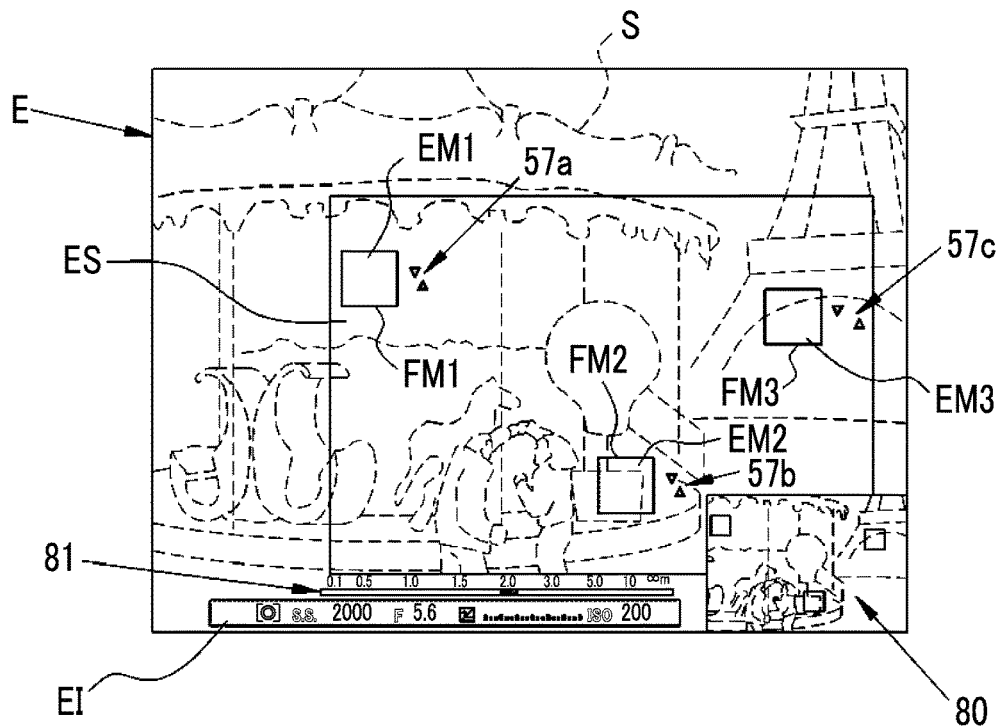
FIG. 32 is a view illustrating an inside of an observation area of a finder section of an eleventh embodiment.
Figure 33A:
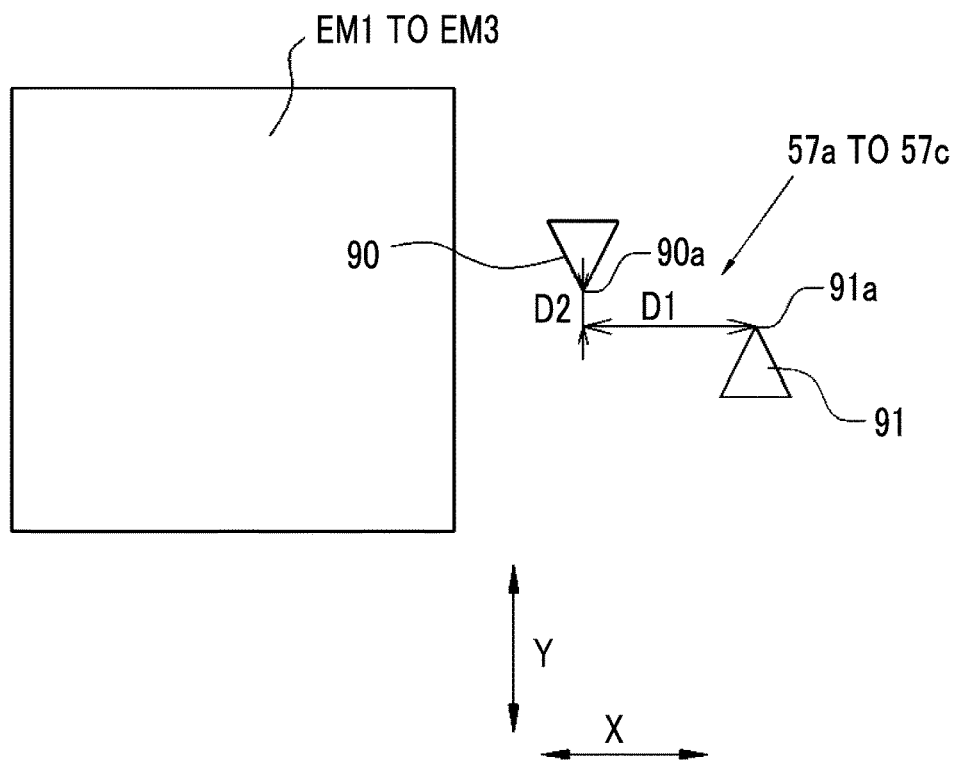
FIG. 33A is a partially enlarged view illustrating a main subject area and a defocus image of the eleventh embodiment in an out-of-focus state.
Figure 33B:
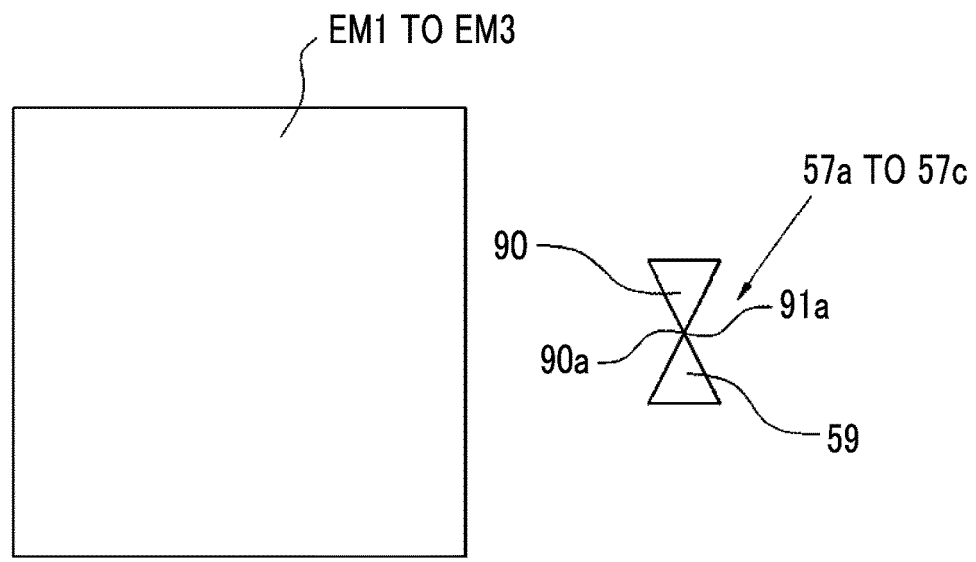
FIG. 33B is a partially enlarged view illustrating the main subject area and the defocus image of the eleventh embodiment in an in-focus state.

In the eleventh embodiment, the first to third defocus images 57a to 57c each are composed of first and second indicators 90 and 91 having triangular shapes. As shown in FIGS. 32, 33A, and 33B, the first to third defocus images 57a to 57c each are composed of the first indicator 90 having a downward equilateral triangular shape and the second indicator 91 having an upward equilateral triangular shape. The first to third defocus images 57a to 57c are displayed on the right side or the left side of the main subject areas EM1 to EM3 at positions close to the main subject areas EM1 to EM3. The configuration other than the first and second indicators 90 and 91 are the same as those of the seventh embodiment.

As shown in FIG. 33A, in a case where the first to third main subject areas EM1 to EM3 are out of focus, the first and second indicators 90 and 91 are arranged such that vertices 90a and 91a which face each other are spaced from each other in the horizontal direction X and the vertical direction Y. The first and second distances D1 and D2 in the horizontal direction X and the vertical direction Y of the vertices 90a and 91a indicate the amount of defocus of the imaging optical system 16. As the amount of defocus is smaller, the first and second distances D1 and D2 are smaller.

In a case where the amount of defocus is "0", that is, in a case where any one of the first to third main subject areas EM1 to EM3 is brought into focus by the rotation operation of the focus ring 17, as shown in FIG. 33B, the first and second distances D1 and D2 are "0", and the vertices 90a and 91a of the first and second indicators 90 and 91 are aligned at positions where the vertices match with each other.

[Twelfth Embodiment]

Figure 34:
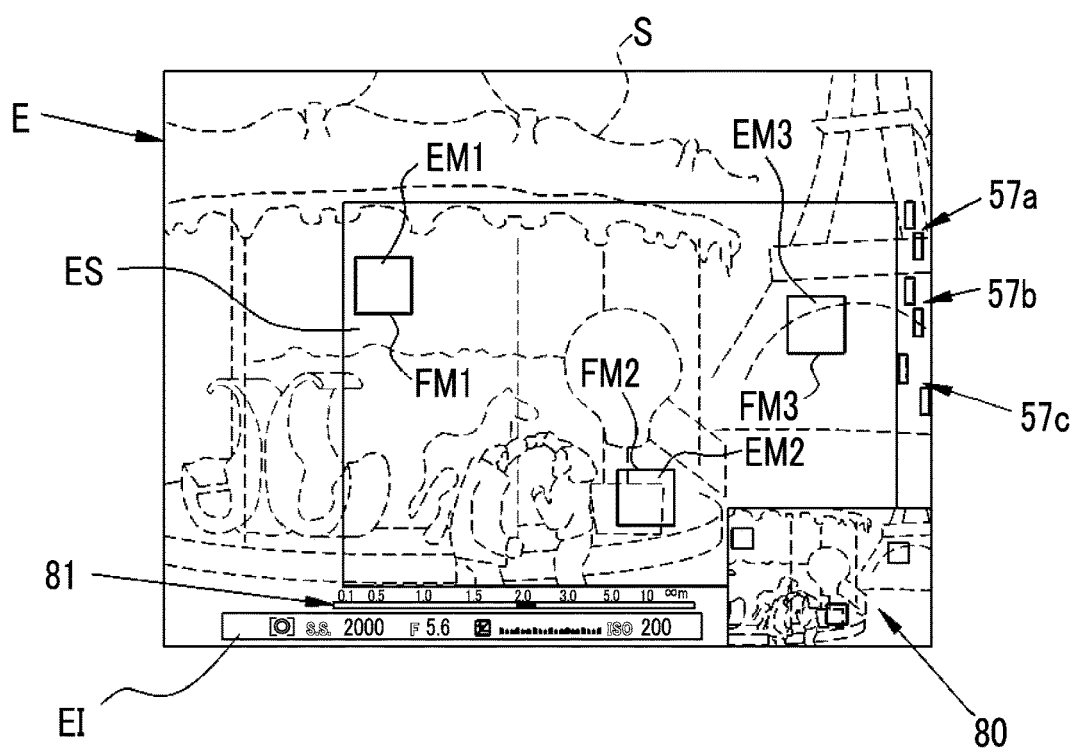
FIG. 34 is a view illustrating an inside of an observation area of a finder section of a twelfth embodiment.
Figure 35:
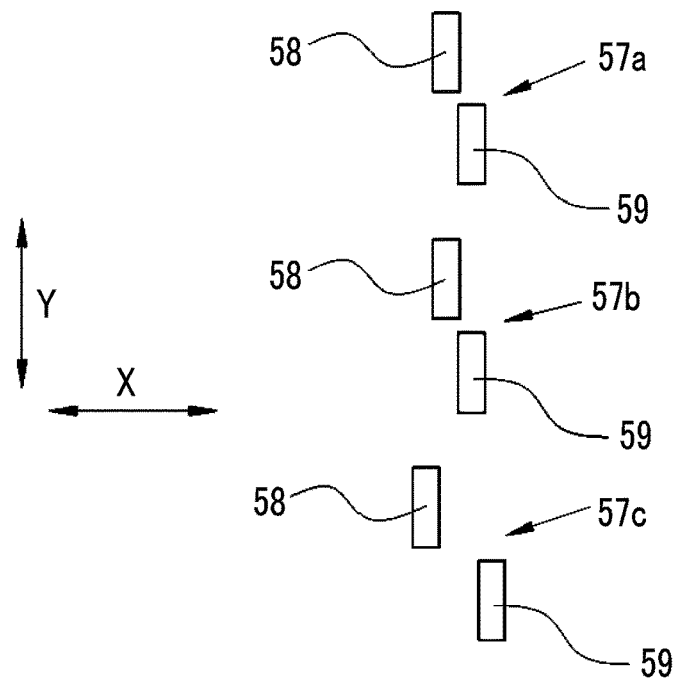
FIG. 35 is a partially enlarged view illustrating defocus images arranged on the right side of the subject display area of the twelfth embodiment.

In the twelfth embodiment, the first to third defocus images 57a to 57c are displayed on the right side of the subject display area ES. As shown in FIGS. 34 and 35, the first to third defocus images 57a to 57c corresponding to the main subject areas EM1 to EM3 are arranged on the right side of the subject display area ES at positions close to the subject display area ES. The first to third defocus images 57a to 57c are arranged in order from the top so as to correspond to the main subject areas EM1 to EM3. The configuration other than the arrangement of the first to third defocus images 57a to 57c on the right side of the subject display area ES is the same as that of the seventh embodiment.

[Thirteenth Embodiment]

Figure 36:
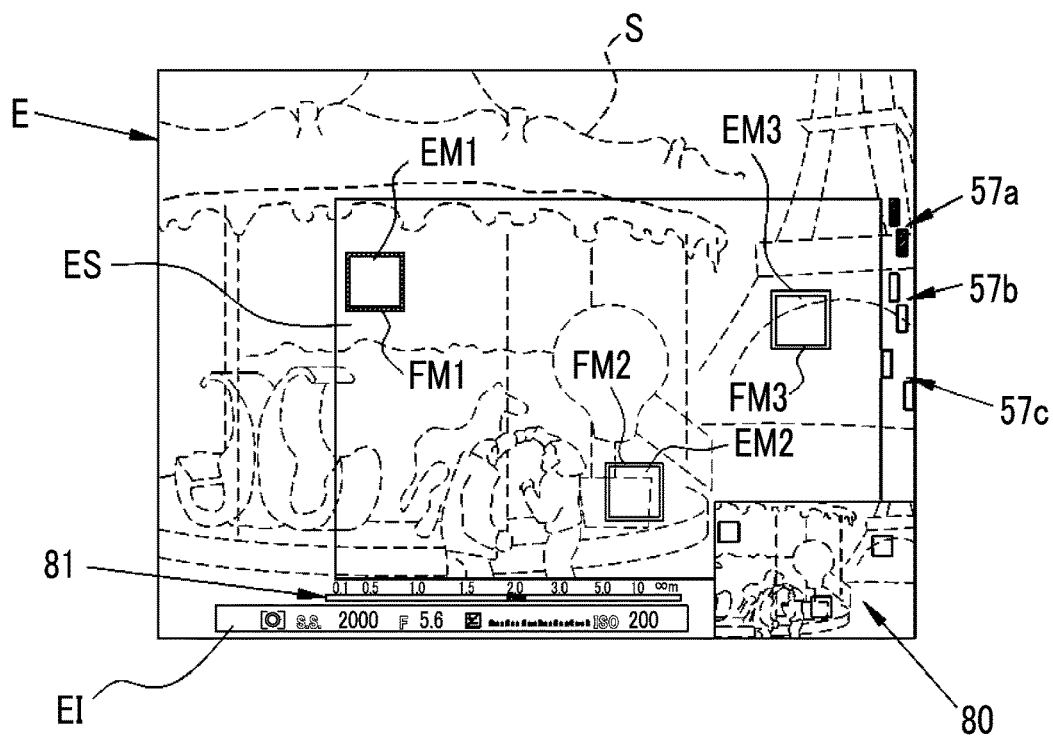
FIG. 36 is a view illustrating an inside of an observation area of a finder section of a thirteenth embodiment.

In the thirteenth embodiment, in addition to the configuration of the twelfth embodiment, in a case where any one of the first to third main subject areas EM1 to EM3 is brought into focus, the colors of the corresponding rectangular frames FM1 to FM3 and the first to third defocus images 57a to 57c are changed. As shown in FIG. 36, in a manner similar to that of the above-mentioned twelfth embodiment, the first to third defocus images 57a to 57c corresponding to the main subject areas EM1 to EM3 are arranged on the right side of the subject display area ES at positions close to the subject display area ES.

Figure 37A:
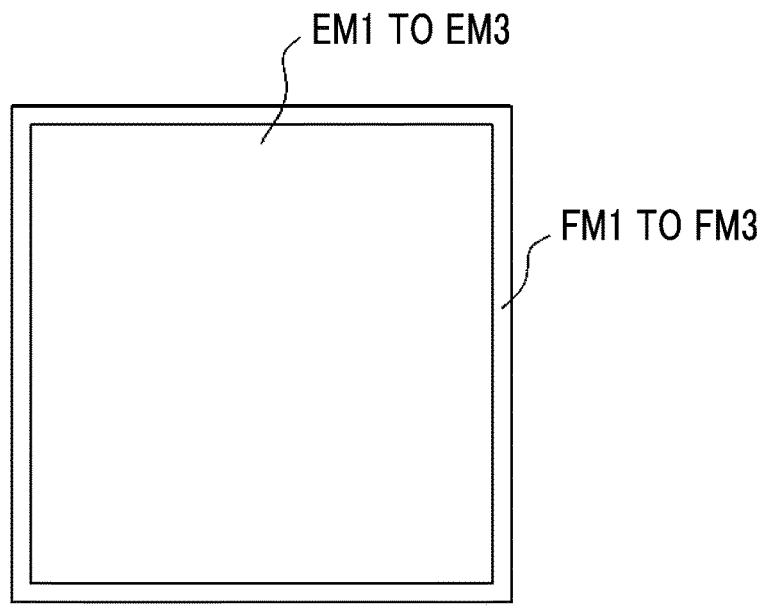
FIG. 37A is a partially enlarged view illustrating a rectangular frame corresponding to one of the main subject areas in the thirteenth embodiment in an out-of-focus state.
Figure 37B:
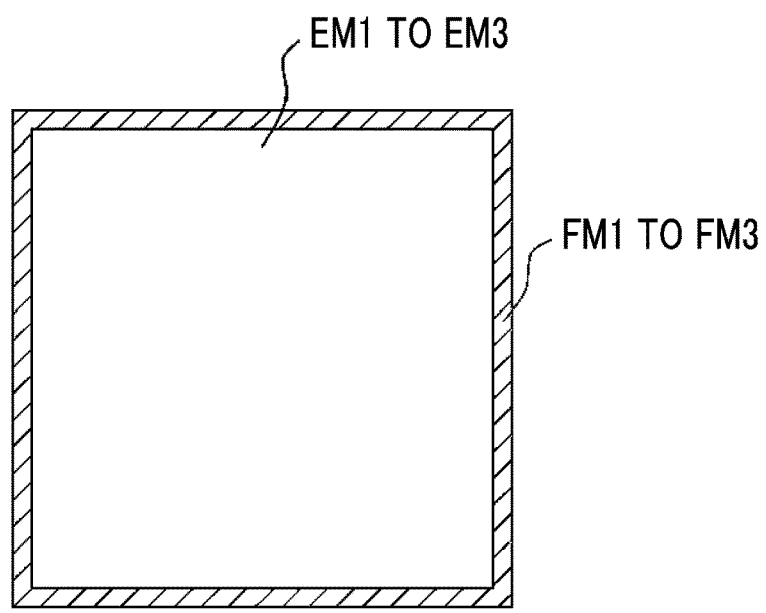
FIG. 37B is a partially enlarged view illustrating a rectangular frame corresponding to one of the main subject areas in the thirteenth embodiment in an in-focus state.

As shown in FIGS. 37A and 37B, in a case where the state of any one of the main subject areas EM1 to EM3 changes from the out-of-focus state (FIG. 37A) to the in-focus state (FIG. 37B), the colors of the corresponding rectangular frames FM1 to FM3 are changed. In FIG. 36, the hatched rectangular frame FM1 indicates that the color thereof is changed with respect to the rectangular frames FM2 and FM3.

Figure 38:
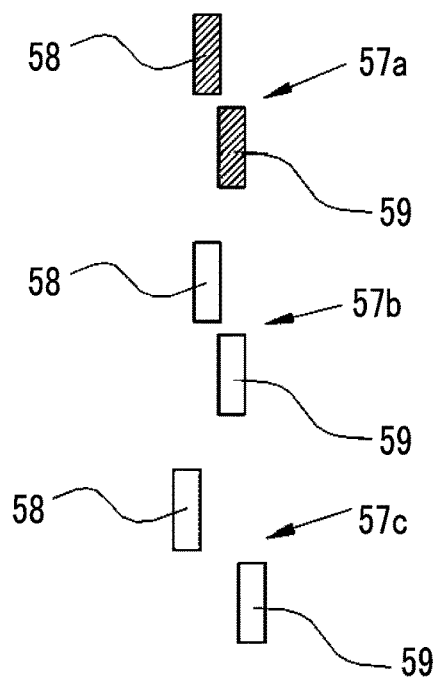
FIG. 38 is a partially enlarged view illustrating defocus images arranged on the right side of the subject display area of the thirteenth embodiment.

On the other hand, as shown in FIG. 38, the color of one defocus image 57a among the first to third defocus images 57a to 57c is changed with respect to the other defocus images 57b and 57c. This indicates that, in a case where the main subject area EM1 among the main subject areas EM1 to EM3 is brought into focus, the color of the corresponding defocus image 57a is changed. In FIG. 38, the hatched defocus image 57a indicates that the color thereof is changed with respect to the defocus images 57b and 57c.

As shown in FIGS. 36 and 38, in a case where the main subject area EM1 is brought into focus, both the rectangular frame FM1 and the defocus image 57a corresponding to the main subject area EM1 are changed from the same color, for example, from white to green. In a case where any one of the first to third main subject areas EM1 to EM3 is brought into focus, not only changing the colors of the corresponding rectangular frames FM1 to FM3 but also changing the thickness of the lines thereof may be performed.

[Fourteenth Embodiment]

Figure 39:
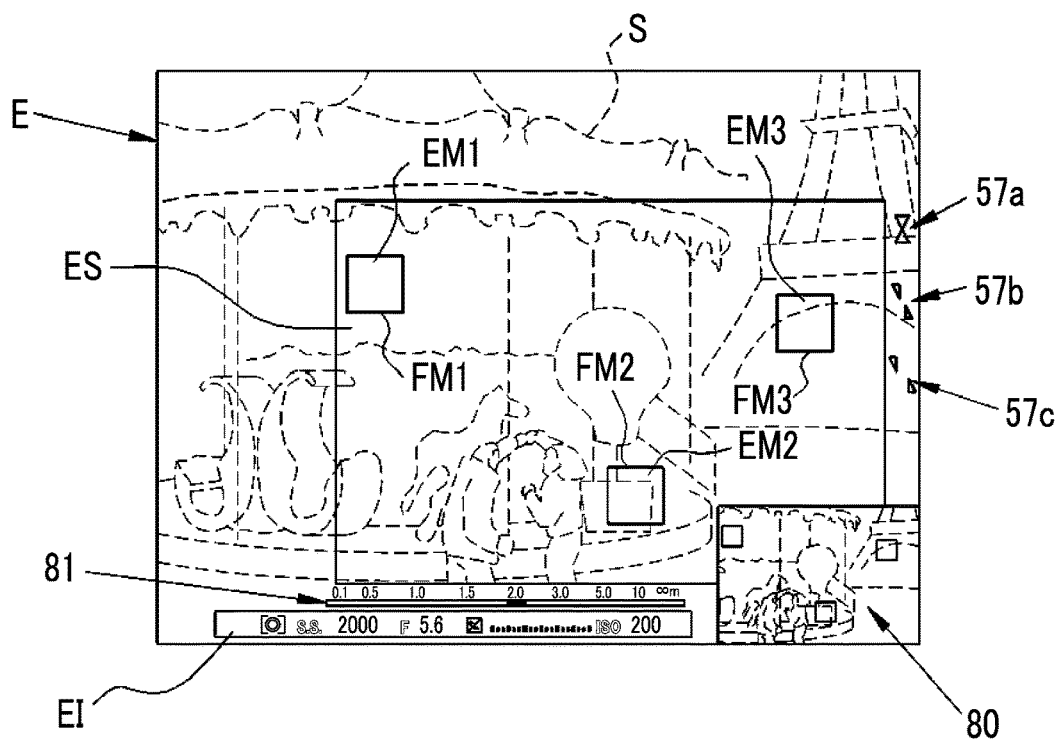
FIG. 39 is a view illustrating an inside of an observation area of a finder section of a fourteenth embodiment.

In the fourteenth embodiment, the first to third defocus images 57a to 57c composed of first and second indicators 92 and 93 having triangular shapes are displayed on the right side of the subject display area ES. As shown in FIG. 39, in a manner similar to that of the above-mentioned twelfth embodiment, the first to third defocus images 57a to 57c corresponding to the main subject areas EM1 to EM3 are arranged on the right side of the subject display area ES at positions close to the subject display area ES. The configuration other than the first and second indicators 90 and 91 are the same as those of the twelfth embodiment. The first to third defocus images 57a to 57c are indicated by a first indicator 92 having a downward triangular shape and a second indicator 93 having an upward triangular shape.

Figure 40A:
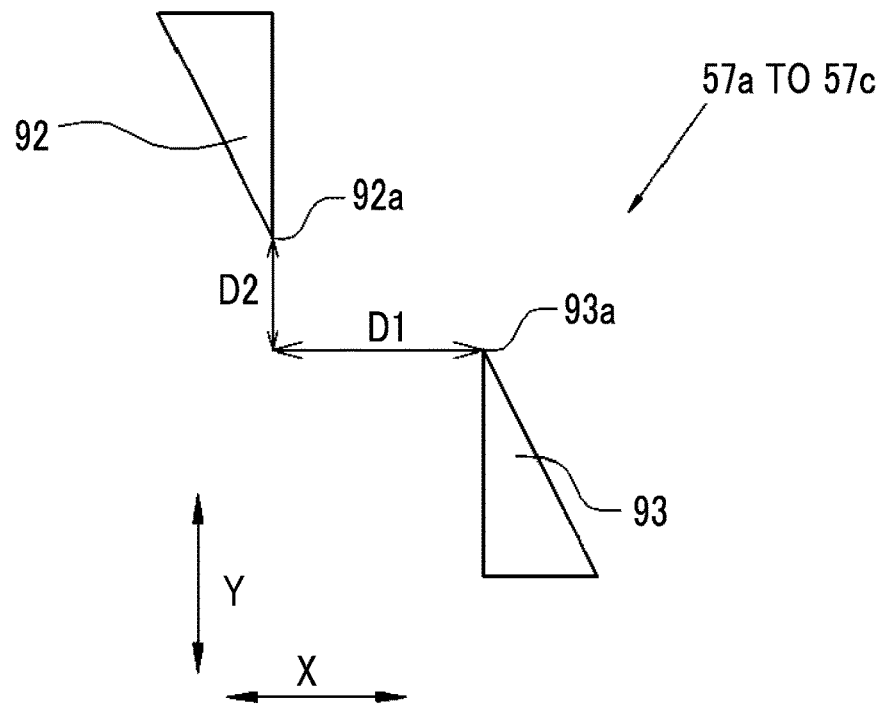
FIG. 40A is a partially enlarged view illustrating a defocus image of the fourteenth embodiment in an out-of-focus state and in a front focus state.
Figure 40B:
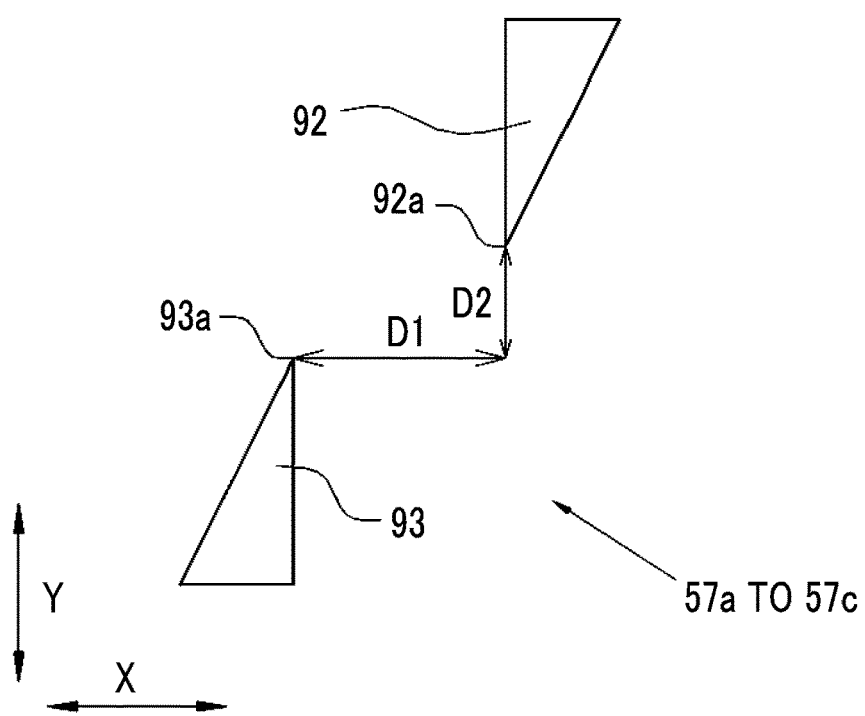
FIG. 40B is a partially enlarged view illustrating the defocus image of the fourteenth embodiment in an out-of-focus state and a back focus state.

As shown in FIGS. 40A and 40B, in a case where the first to third main subject areas EM1 to EM3 are out of focus, the first and second indicators 92 and 93 are arranged such that vertices 92a and 93a which face each other are spaced from each other in the horizontal direction X and the vertical direction Y. The first and second distances D1 and D2 in the horizontal direction X and the vertical direction Y of the vertices 92a and 93a indicate the amount of defocus of the imaging optical system 16. As the amount of defocus is smaller, the first and second distances D1 and D2 are smaller. In this case, the first and second indicators 92 and 93 are different from the first and second indicators 90 and 91 of the eleventh embodiment in that each indicator has a scalene triangle shape of which the dimension in the horizontal direction X is smaller than the dimension in the vertical direction Y. This is for narrowing the dimensions of the first and second indicators 92 and 93 in the horizontal direction X. As shown in FIG. 39, even in a case where the space on the right side of the subject display area ES is narrow, the first and second indicators 92 and 93 can be displayed.

As shown in FIG. 40A, in a case where the first to third main subject areas EM1 to EM3 are in the out-of-focus state and in the front focus state, that is, in a case of the focus state where a focal position is set in front of a subject in the first to third main subject areas EM1 to EM3, the second indicator 93 is positioned on the right side of the first indicator 92. This indicates that the first to third main subject areas EM1 to EM3 corresponding to the first to third defocus images 57a to 57c are in the front focus state. It is determined whether the first to third main subject areas EM1 to EM3 are in the front focus state or the back focus state, on the basis of the amounts of defocus in the first to third main subject areas EM1 to EM3.

As shown in FIG. 40B, in a case where the first to third main subject areas EM1 to EM3 are in the out-of-focus state and in the back focus state, that is, in a case of the focus state where the focal position is set in the rear of a subject in the first to third main subject areas EM1 to EM3, the second indicator 93 is positioned on the left side of the first indicator 92. This indicates that the first to third main subject areas EM1 to EM3 corresponding to the first to third defocus images 57a to 57c are in the back focus state.

Figure 40C:
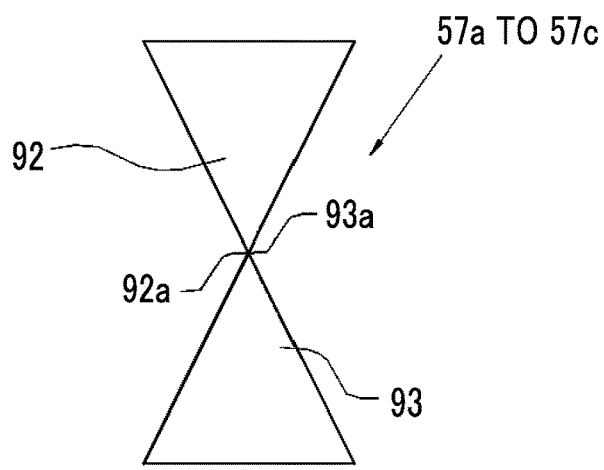
FIG. 40C is a partially enlarged view illustrating the defocus image of the fourteenth embodiment in the in-focus state.

In a case where the amount of defocus is "0", that is, in a case where any one of the first to third main subject areas EM1 to EM3 is brought into focus by the rotation operation of the focus ring 17, as shown in FIG. 40C, the first and second distances D1 and D2 are "0", and the vertices 92a and 93a of the first and second indicators 92 and 93 are aligned at positions where the vertices match with each other. In this case, the shapes of the first and second indicators 92 and 93 change to an equilateral triangle shapes like the first and second indicators 90 and 91 of the eleventh embodiment.

As described above, depending on the shapes and positions of the first and second indicators 92 and 93, it is easily recognized whether the first to third main subject areas EM1 to EM3 are in the front focus state, the back focus state, or the in-focus state.

[Fifteenth Embodiment]

Figure 41:
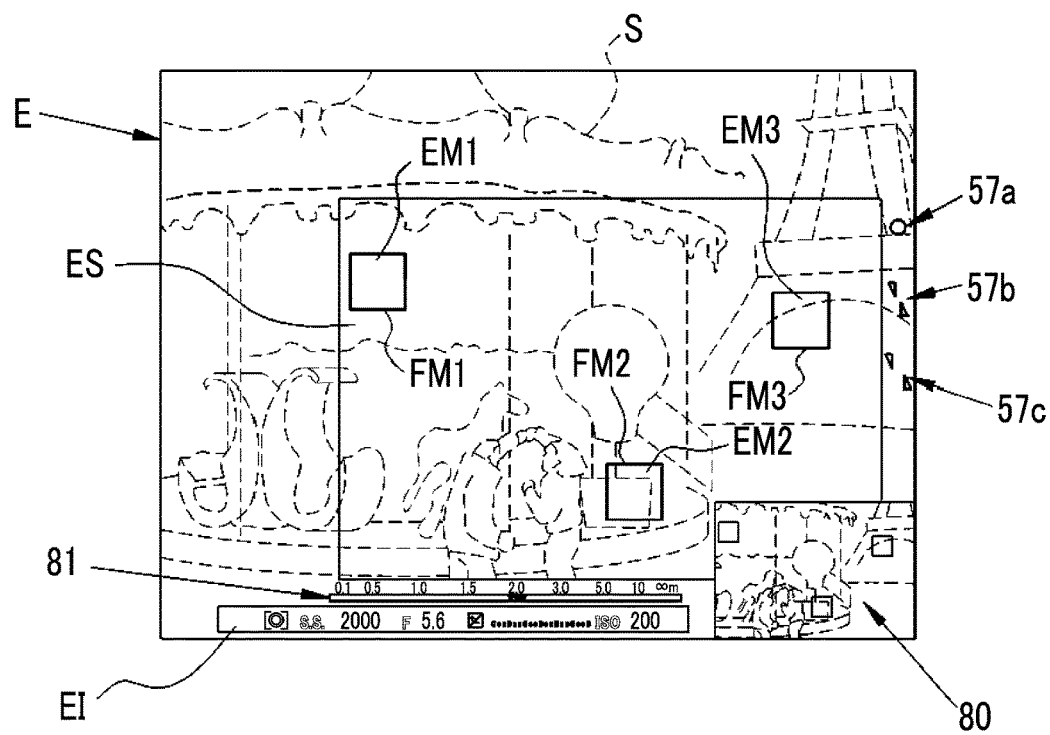
FIG. 41 is a view illustrating an inside of an observation area of a finder section of a fifteenth embodiment.

In the fifteenth embodiment, in addition to the configuration of the fourteenth embodiment, in a case where any one of the first to third main subject areas EM1 to EM3 is brought into focus, corresponding one of the first to third defocus images 57a to 57c is changed to an indicator having another shape indicating the in-focus state. As shown in FIG. 41, in a manner similar to that of the above-mentioned twelfth embodiment, the first to third defocus images 57a to 57c corresponding to the main subject areas EM1 to EM3 are arranged on the right side of the subject display area ES at positions close to the subject display area ES.

Figure 42A:
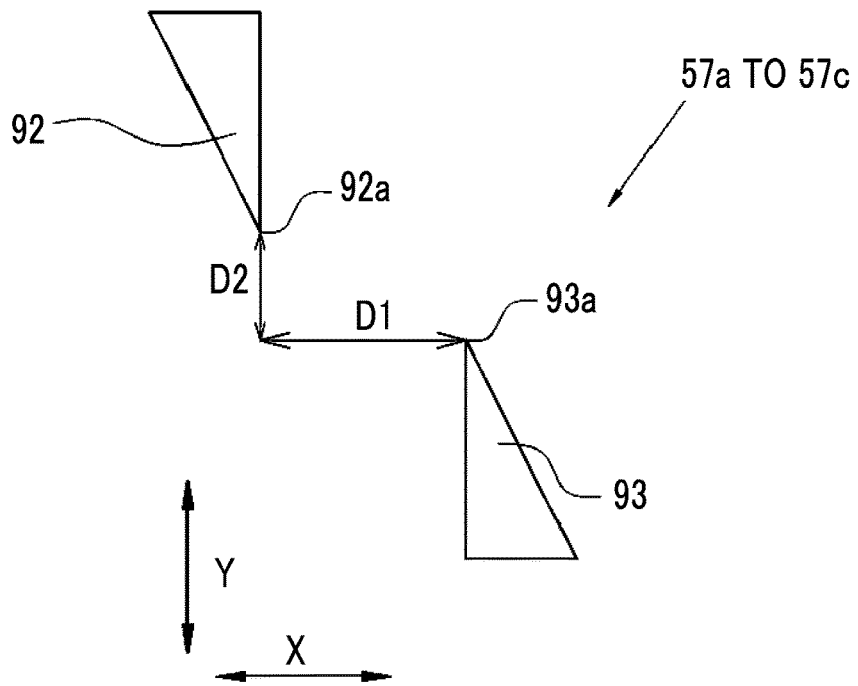
FIG. 42A is a partially enlarged view illustrating a defocus image of the fifteenth embodiment in an out-of-focus state and in a front focus state.
Figure 42B:
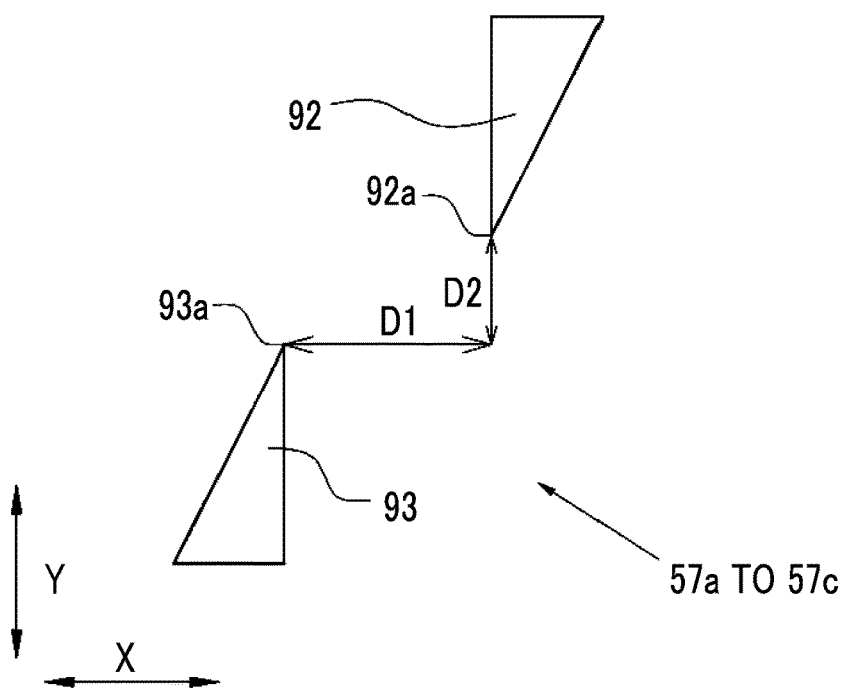
FIG. 42B is a partially enlarged view illustrating the defocus image of the fifteenth embodiment in an out-of-focus state and in a back focus state.
Figure 42C:
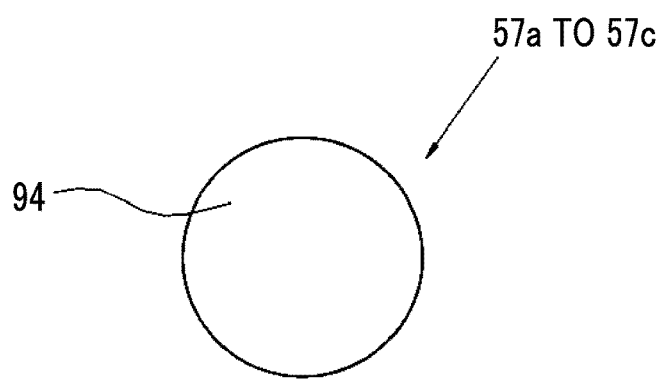
FIG. 42C is a partially enlarged view illustrating the defocus image of the fifteenth embodiment in an in-focus state.

As shown in FIGS. 42A and 42B, in a case where the first to third main subject areas EM1 to EM3 are out of focus, in a manner similar to that of the fourteenth embodiment, the first to third defocus images 57a to 57c each are indicated by the first indicator 92 having a downward triangle shape and the second indicator 93 having an upward triangular shape. In the first and second indicators 92 and 93, vertices 92a and 93a facing each other are spaced from each other in the horizontal direction X and the vertical direction Y. The first and second distances D1 and D2 in the horizontal direction X and the vertical direction Y of the vertices 92a and 93a indicate the amount of defocus of the imaging optical system 16. As the amount of defocus is smaller, the first and second distances D1 and D2 are smaller.

As shown in FIG. 42A, in a case where the first to third main subject areas EM1 to EM3 are in the out-of-focus state and in the front focus state, that is, in a case where the focal position is set in front of the subject in the first to third main subject areas EM1 to EM3, the second indicator 93 is positioned on the right side of the first indicator 92 in a manner similar to that of the fourteenth embodiment. This indicates that the first to third main subject areas EM1 to EM3 corresponding to the first to third defocus images 57a to 57c are in the front focus state.

As shown in FIG. 42B, in a case where the first to third main subject areas EM1 to EM3 are in the out-of-focus state and in the back focus state, that is, in a case where the focal position is set in the rear of the subject in the first to third main subject areas EM1 to EM3, the second indicator 93 is positioned on the left side of the first indicator 92 in a manner similar to that of the fourteenth embodiment. This indicates that the first to third main subject areas EM1 to EM3 corresponding to the first to third defocus images 57a to 57c are in the back focus state.

In a case where the amount of defocus is "0", that is, in a case where any one of the first to third main subject areas EM1 to EM3 is brought into focus by the rotation operation of the focus ring 17, as shown in FIG. 42B, the corresponding one of the first to third defocus images 57a to 57c change to a circular indicator 94 indicating the in-focus state.

As described above, by changing the shapes and positions of the first and second indicators 92 and 93 and changing the shape of the indicator 94 from a triangular shape to a circular shape, it can be easily recognized that the first to third main subject areas EM1 to EM3 are in the front focus state, the back focus state, or the in-focus state.

[Sixteenth Embodiment]

Figure 43:
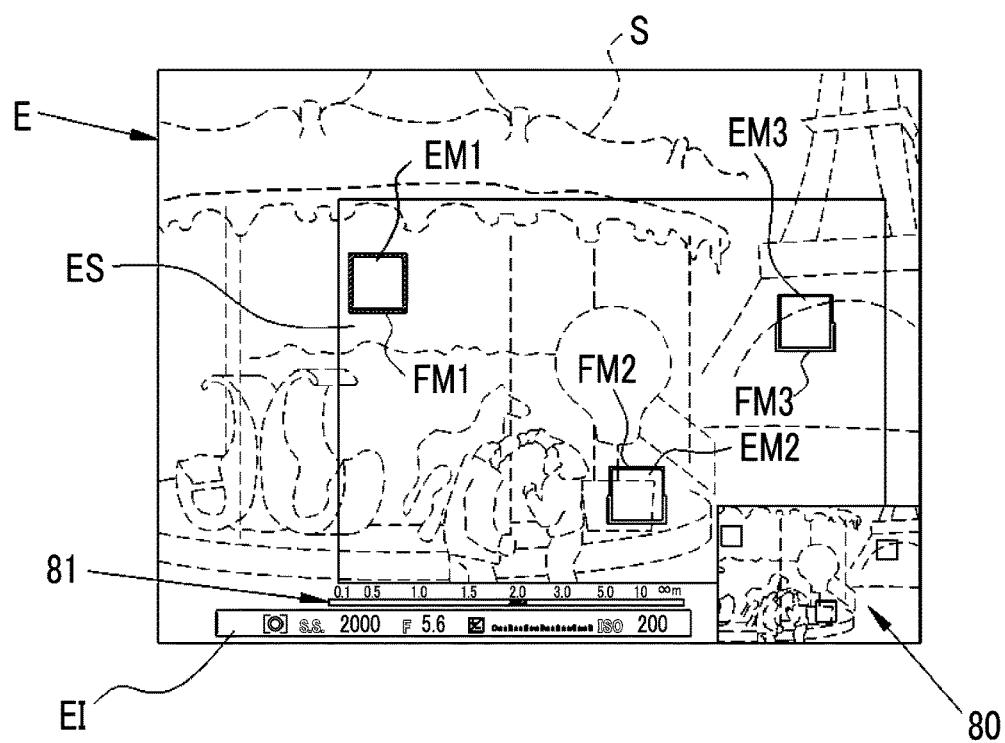
FIG. 43 is a view illustrating an inside of an observation area of a finder section of a sixteenth embodiment.

In the sixteenth embodiment, instead of the first to third defocus images 57a to 57c in a manner similar to those of the first to fifteenth embodiments, the thicknesses and the colors of the rectangular frames FM1 to FM3 corresponding to the first to third main subject areas EM1 to EM3 are changed. As shown in FIG. 43, the thicknesses of the upper portions of the corresponding rectangular frames FM1 to FM3 are changed in accordance with the amounts of defocus in the first to third main subject areas EM1 to EM3.

Figure 44A:
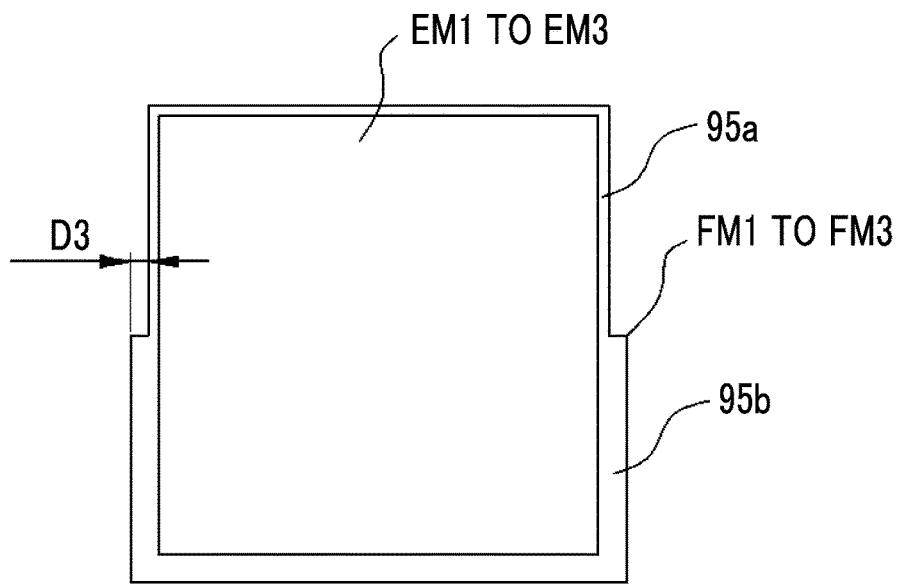
FIG. 44A is a partially enlarged view illustrating a rectangular frame of a main subject area of the sixteenth embodiment in an out-of-focus state.
Figure 44B:
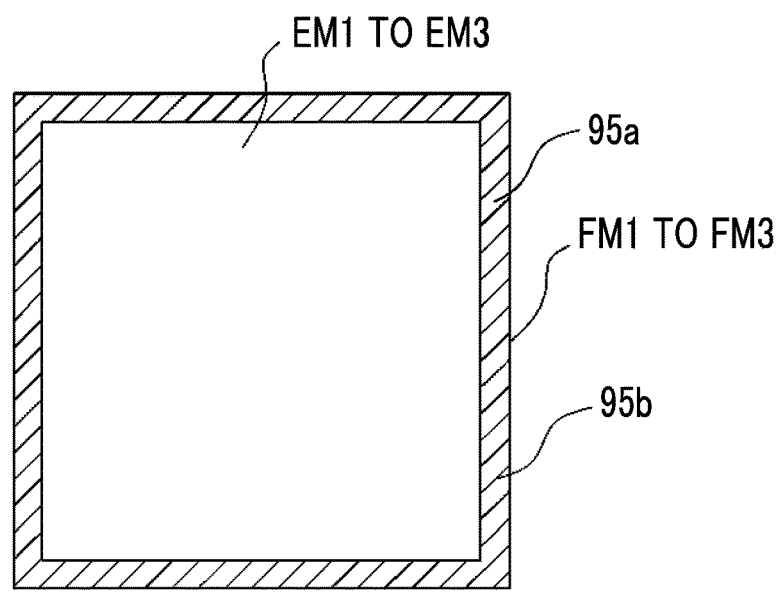
FIG. 44B is a partially enlarged view illustrating the rectangular frame of the main subject area of the sixteenth embodiment in an in-focus state.

As shown in FIGS. 44A and 44B, in the present embodiment, on the basis of the amount of defocus of the first to third main subject areas EM1 to EM3, the thickness of the upper portion 95a of each of the corresponding rectangular frames FM1 to FM3 is changed. On the other hand, the thickness of the lower portion 95b of each of the rectangular frames FM1 to FM3 is constant regardless of the amounts of defocus of the first to third main subject areas EM1 to EM3. As shown in FIG. 44A, the difference D3 between the thickness of the upper portion 95a and the thickness of the lower portion 95b of each of the rectangular frames FM1 to FM3 indicates the amount of defocus in each of the first to third main subject areas EM1 to EM3.

In a case where the amount of defocus is "0", that is, in a case where any one of the first to third main subject areas EM1 to EM3 is brought into focus by the rotation operation of the focus ring 17, as shown in FIG. 44B, the difference between the thickness of the upper portion 95a and the thickness of the lower portion 95b of each of the rectangular frames FM1 to FM3 becomes "0", and the thickness of the upper portion 95a and the thickness of the lower portion 95b coincide. Further, in this case, the colors of the rectangular frames FM1 to FM3 are changed. In FIG. 43, the hatched rectangular frame FM1 indicates that the color thereof is changed with respect to the rectangular frames FM2 and FM3. In this case, the rectangular frame FM1 is changed from white to green, for example.

[Seventeenth Embodiment]

Figure 45:
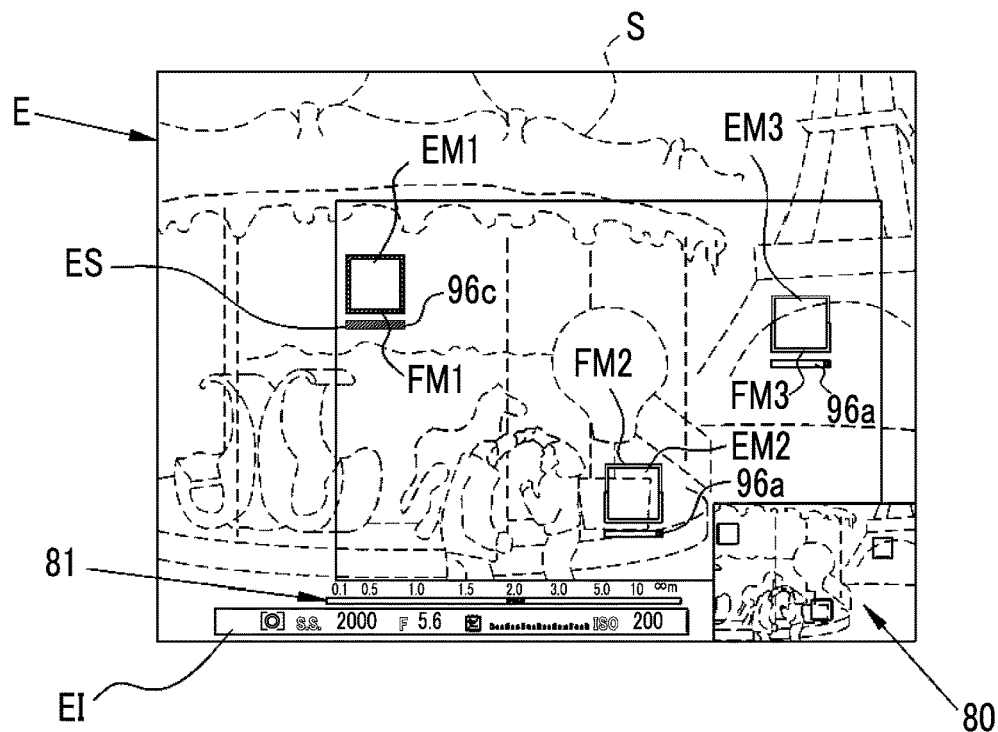
FIG. 45 is a diagram illustrating the inside of an observation area of a finder section of a seventeenth embodiment.

In the seventeenth embodiment, in addition to the configuration of the sixteenth embodiment, the out-of-focus state information image 96a, 96b, or the in-focus state information image 96c is displayed. As shown in FIG. 45, the out-of-focus state information image 96a, 96b, or the in-focus state information image 96c is disposed below the main subject areas EM1 to EM3 at a position close to the corresponding main subject areas EM1 to EM3. The configuration other than a configuration, in which the out-of-focus state information image 96a, 96b, or the in-focus state information image 96c is disposed below the main subject areas EM1 to EM3, is the same as the above-mentioned sixteenth embodiment.

Figure 46A:
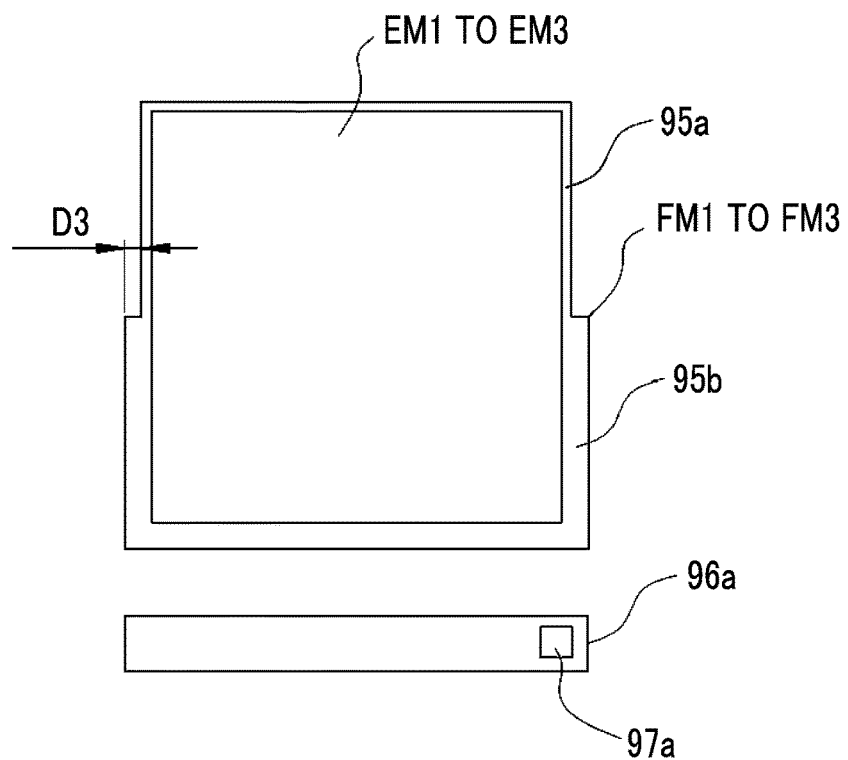
FIG. 46A is a partially enlarged view illustrating an out-of-focus state information image and a rectangular frame of the main subject area of the seventeenth embodiment in an out-of-focus state and in a front focus state.

As shown in FIG. 46A, in a case where the first to third main subject areas EM1 to EM3 are in the out-of-focus state and in the front focus state, that is, in a case of the focus state where the focal position is set in front of the subject in the first to third main subject areas EM1 to EM3, the out-of-focus state information image 96a is displayed. In the out-of-focus state information image 96a, an indicator 97a indicating the front focus state is disposed in the vicinity of the right end portion in a horizontally long strip-like rectangular frame. It is determined whether the first to third main subject areas EM1 to EM3 are in the front focus state or the back focus state, on the basis of the amounts of defocus in the first to third main subject areas EM1 to EM3.

Figure 46B:
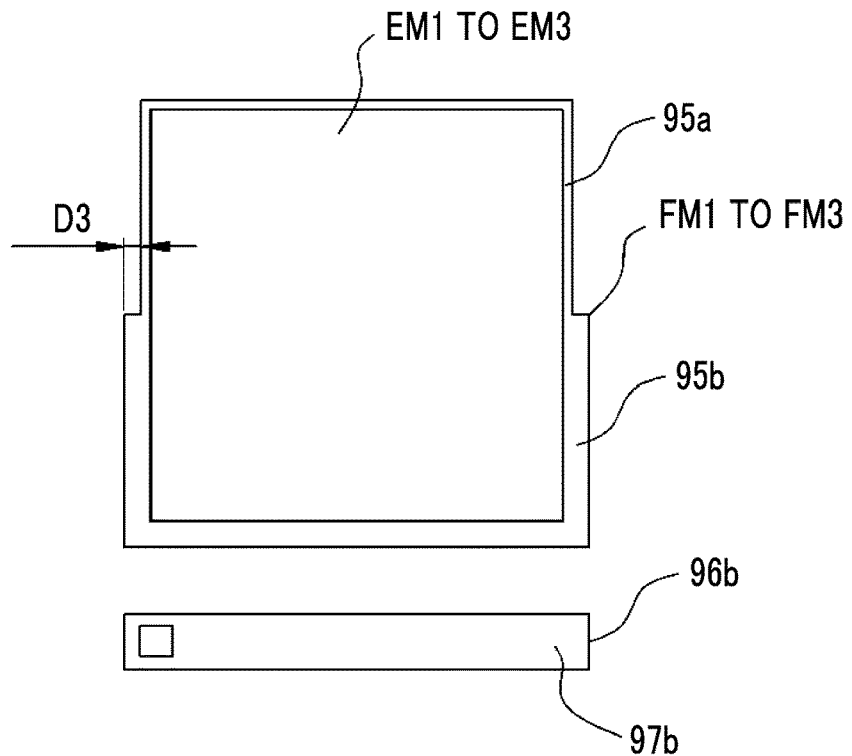
FIG. 46B is a partially enlarged view illustrating an out-of-focus state information image and the rectangular frame of the main subject area of the seventeenth embodiment in an out-of-focus state and in a back focus state.

As shown in FIG. 46B, in a case where the first to third main subject areas EM1 to EM3 are in the out-of-focus state and in the back focus state, that is, in a case of a focus state where the focal position is set in the rear of the subject in the first to third main subject areas EM1 to EM3, the out-of-focus state information image 96b is displayed. In the out-of-focus state information image 96b, an indicator 97b indicating the back focus state is disposed in the vicinity of the left end portion in a horizontally long strip-like rectangular frame.

Figure 46C:
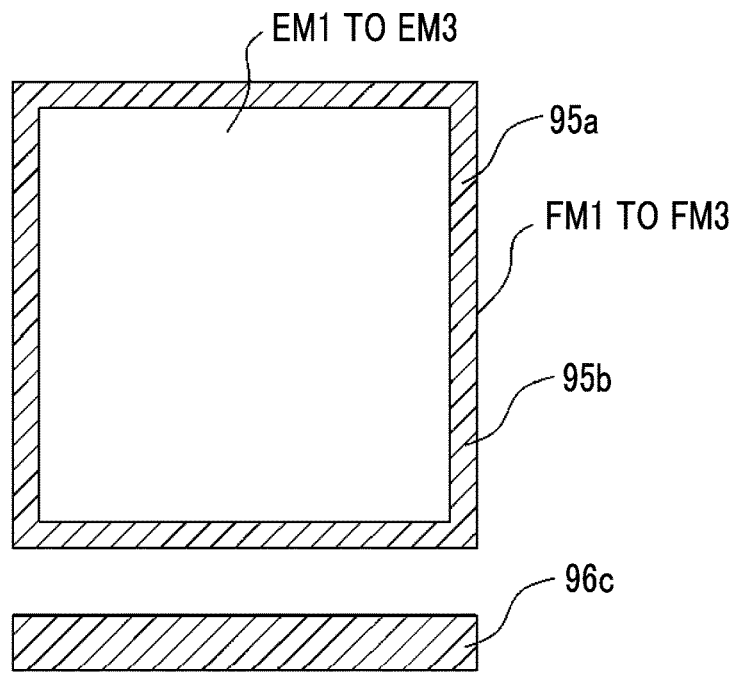
FIG. 46C is a partially enlarged view illustrating an in-focus state information image and the rectangular frame of the main subject area of the seventeenth embodiment in an in-focus state.

In a case where the amount of defocus is "0", that is, in a case where any one of the first to third main subject areas EM1 to EM3 is brought into focus by the rotation operation of the focus ring 17, as shown in FIG. 46C, the in-focus state information image 96c is displayed. The in-focus state information image 96c is a horizontally long belt-like image, and the indicators 97a and 97b indicating the front focus and back focus states are not displayed, and are indicated by a single color. In this case, the in-focus state information image 96c is displayed with the same color as the rectangular frames FM1 to FM3.

[Eighteenth Embodiment]

Figure 47:
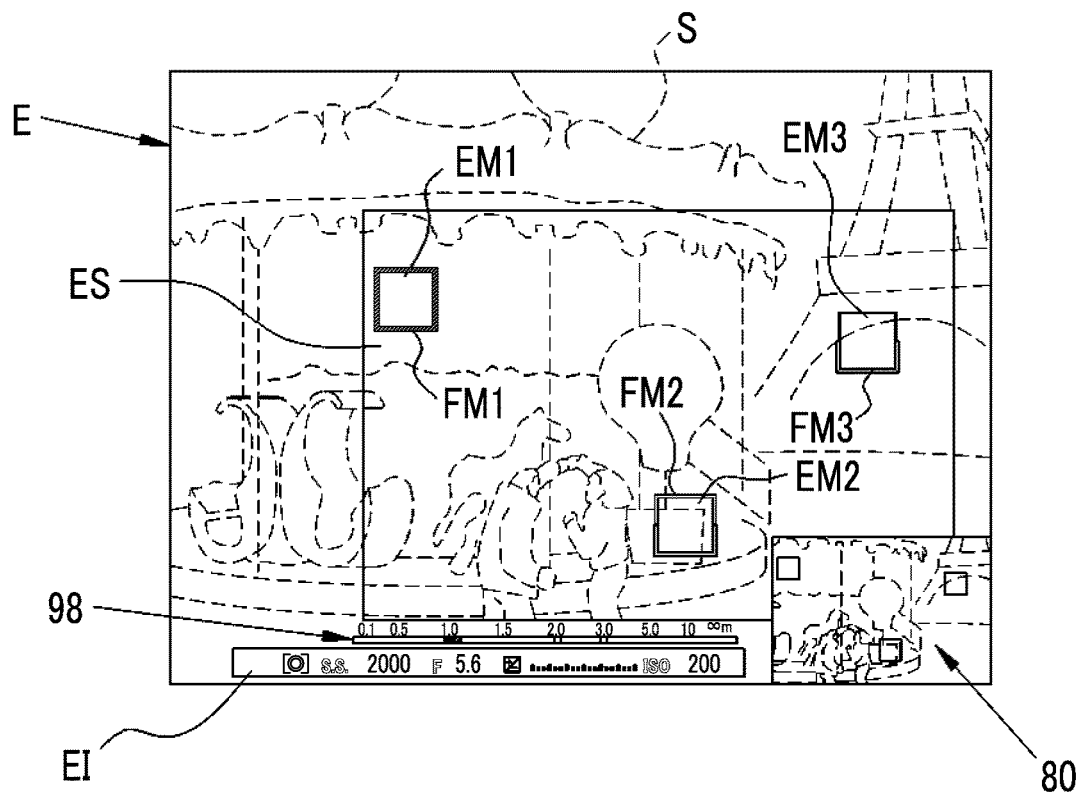
FIG. 47 is a diagram illustrating the inside of an observation area of a finder section of an eighteenth embodiment.

In the eighteenth embodiment, the depth-of-field information image including three rectangular areas indicating the depths of field corresponding to the first to third main subject areas EM1 to EM3 is displayed. As shown in FIG. 47, the depth-of-field information image 98 is displayed instead of the depth-of-field information image 81 of the seventh to seventeenth embodiments. The configuration other than the depth-of-field information image 98 is the same as those of the above-mentioned sixteenth embodiment.

Figure 48:
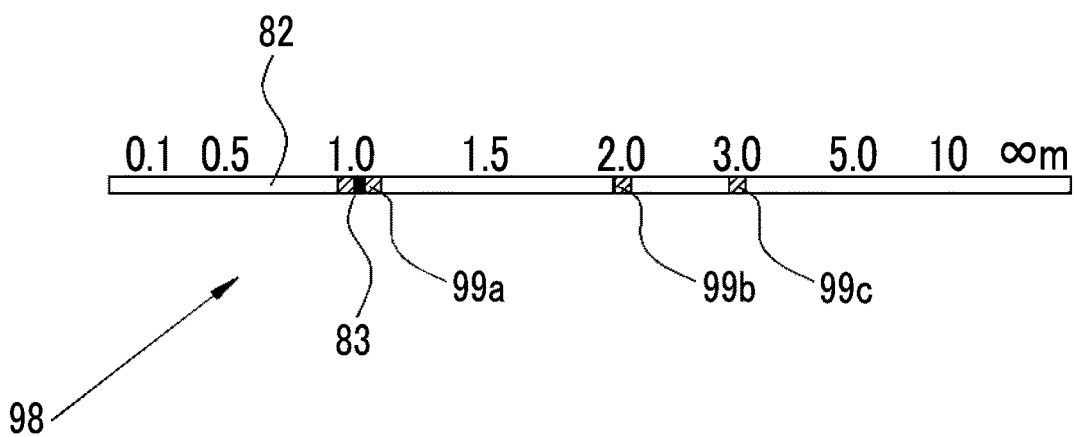
FIG. 48 is a partially enlarged view illustrating a depth-of-field display image of the eighteenth embodiment.

As shown in FIG. 48, the depth-of-field information image 98 is composed of a horizontally long belt-like distance indicator 82 with graduations, a vertical line 83 indicating the in-focus position, and rectangular areas 99a to 99c (areas indicated by hatching) indicating the depths of field. The rectangular areas 99a to 99c indicate the depths of field corresponding to the first to third main subject areas EM1 to EM3, respectively.

In the manual focus mode, the focus state is adjusted by the rotation operation of the focus ring 17. In conjunction therewith, the vertical line 83 indicating the in-focus position moves left and right on the distance indicator 82, and the aperture value is adjusted by the rotation operation of the stop ring 18. In conjunction therewith, the rectangular areas 99a to 99c relating to the aperture value is displayed on the distance indicator 82 so as to be expanded and contracted.

[Nineteenth Embodiment]

Figure 49:
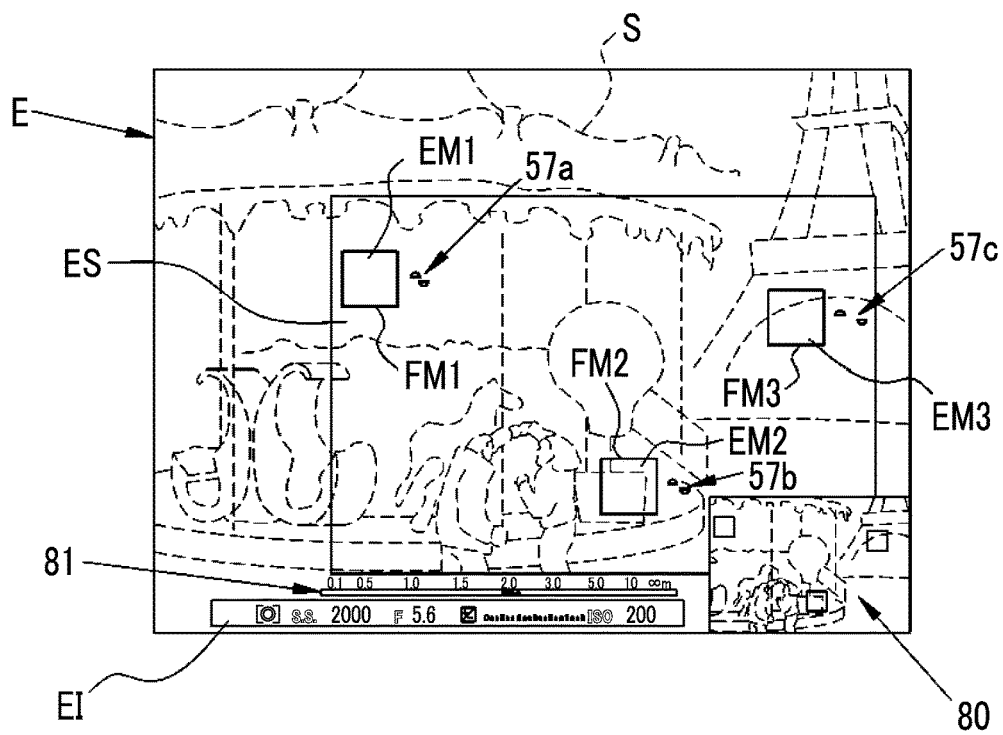
FIG. 49 is a diagram illustrating the inside of an observation area of a finder section of a nineteenth embodiment.

In the nineteenth embodiment, the first to third defocus images 57a to 57c each are composed of the first and second indicators having semicircular shapes. As shown in FIG. 49, the first to third defocus images 57a to 57c are indicated by the first indicator 100 having a lower semicircular shape and the second indicator 101 having an upper semicircular shape. The first to third defocus images 57a to 57c are displayed on the right side or the left side of the main subject areas EM1 to EM3 at positions close to the main subject areas EM1 to EM3. The configuration other than the first and second indicators 100 and 101 are the same as those of the seventh embodiment.

Figure 50A:
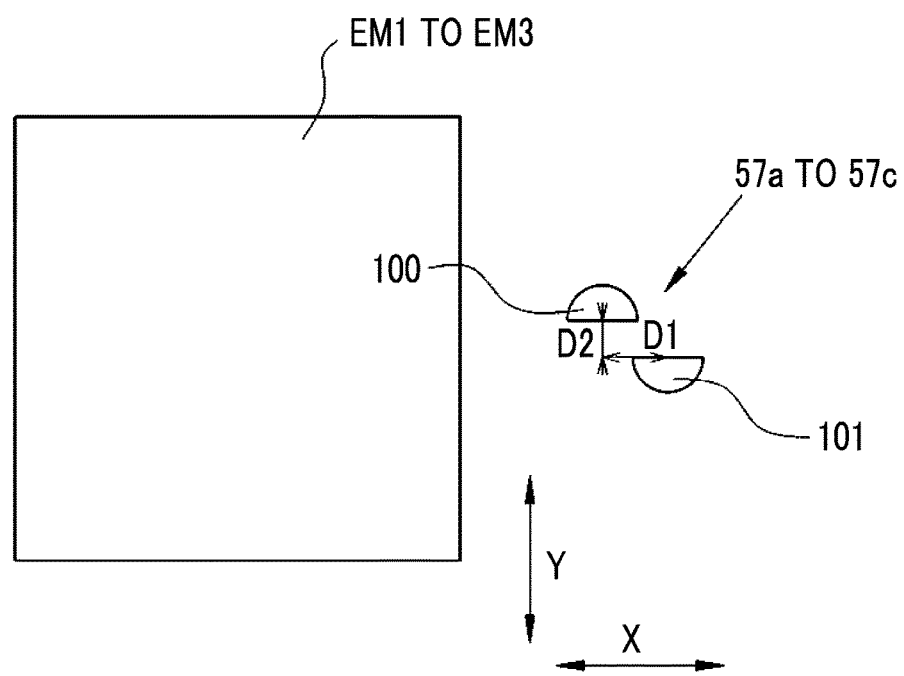
FIG. 50A is a partially enlarged view illustrating a main subject area and a defocus image of the nineteenth embodiment in an out-of-focus state.

As shown in FIG. 50A, in a case where the first to third main subject areas EM1 to EM3 are out of focus, the first and second indicators 100 and 101 are arranged such that the center positions of the circular arcs thereof are spaced from each other in the horizontal direction X and the vertical direction Y. The first and second distances D1 and D2 in the horizontal direction X and the vertical direction Y indicate the amount of defocus of the imaging optical system 16. The first and second distances D1 and D2 are smaller as the amount of defocus is smaller.

Figure 50B:
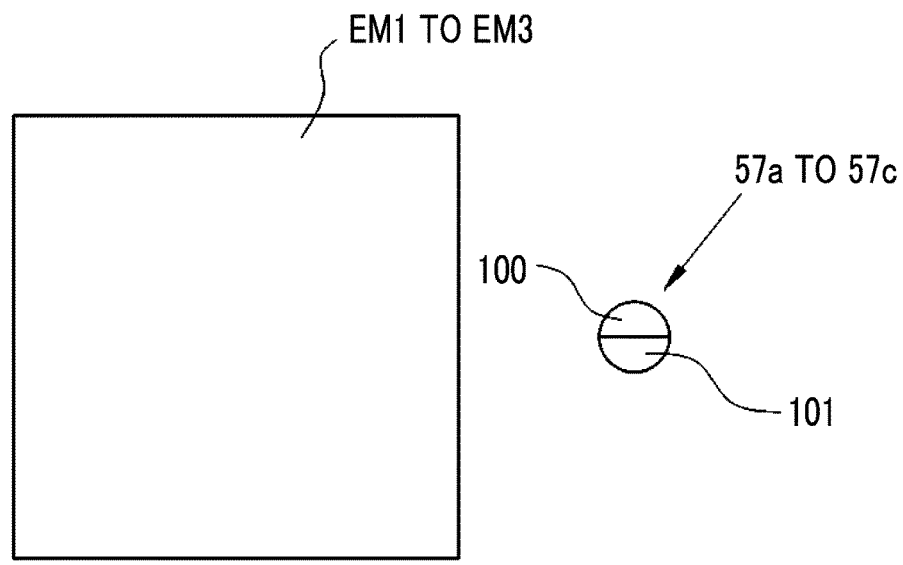
FIG. 50B is a partially enlarged view illustrating the main subject area and the defocus image of the nineteenth embodiment in an in-focus state.

In a case where the amount of defocus is "0", that is, in a case where any one of the first to third main subject areas EM1 to EM3 is brought into focus by the rotation operation of the focus ring 17, as shown in FIG. 50B, the first and second indicators 100 and 101 have the first and second distances D1 and D2 of "0", and become one circle formed of the centers thereof which coincide.

[Twentieth Embodiment]

Figure 51:
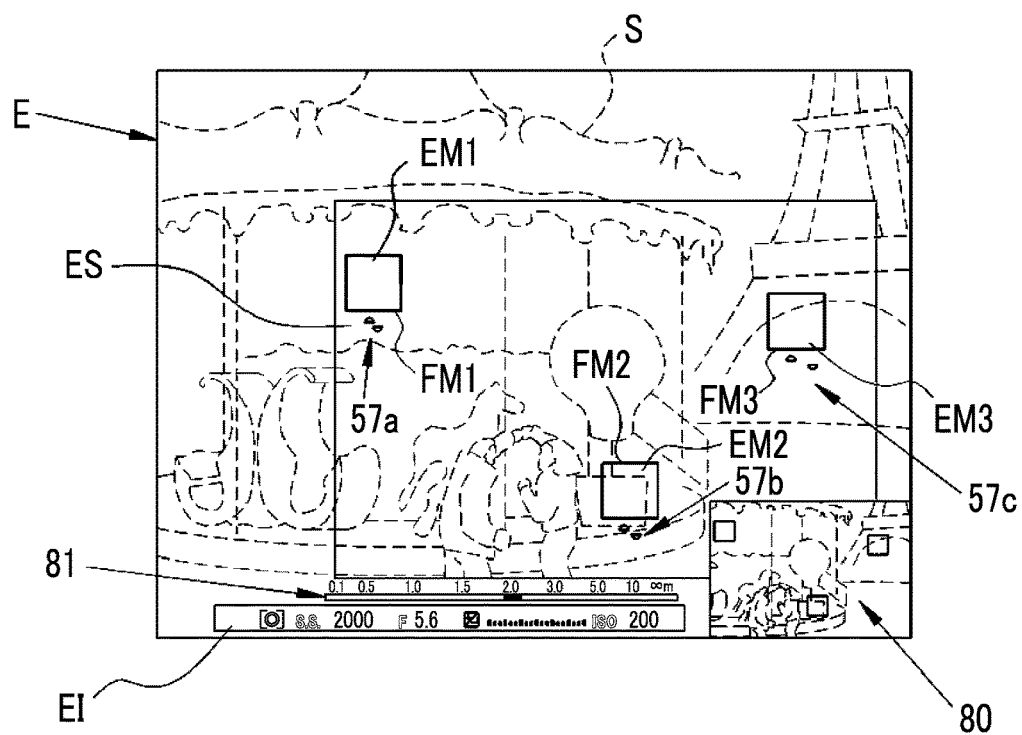
FIG. 51 is a diagram illustrating the inside of an observation area of a finder section of a twentieth embodiment.

In the twentieth embodiment, the first to third defocus images 57a to 57c each composed of the first and second indicators 100 and 101 having semicircular shapes are displayed below the main subject areas EM1 to EM3. As shown in FIG. 51, the first to third defocus images 57a to 57c are arranged close to the corresponding main subject areas EM1 to EM3 and below the main subject areas EM1 to EM3. The configuration other than the arrangement of the first to third defocus images 57a to 57c below the main subject areas EM1 to EM3 is the same as that of the nineteenth embodiment.

Figure 52:
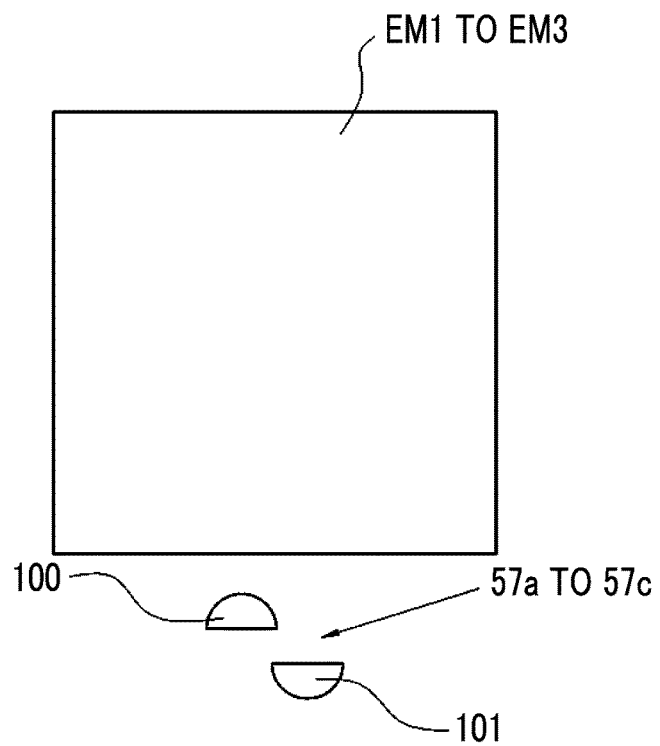
FIG. 52 is a partially enlarged view illustrating a main subject area and a defocus image of the twentieth embodiment.

As shown in FIG. 52, in a case where the first to third main subject areas EM1 to EM3 are out of focus, the first and second indicators 100 and 101 are spaced from each other in the horizontal direction X and the vertical direction Y. In a case where any one of the first to third main subject areas EM1 to EM3 is brought into focus, in a manner similar to that of the nineteenth embodiment, the first and second indicators 100 and 101 becomes one circle formed of the centers thereof which coincide.

[Twenty-First Embodiment]

Figure 53:
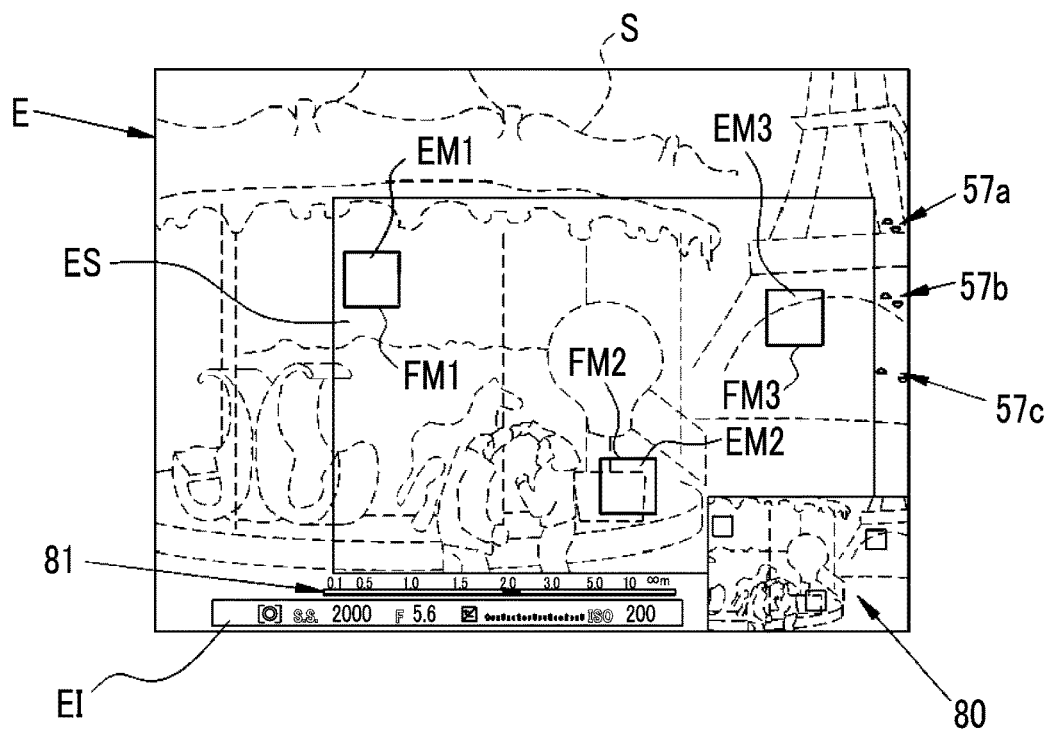
FIG. 53 is a diagram illustrating the inside of an observation area of a finder section of a twenty-first embodiment.

In the twenty-first embodiment, the first to third defocus images 57a to 57c composed of the first and second indicators 100 and 101 having semicircular shapes are displayed on the right side of the subject display area ES. As shown in FIG. 53, in a manner similar to that of the above-mentioned twelfth embodiment, the first to third defocus images 57a to 57c corresponding to the main subject areas EM1 to EM3 are arranged on the right side of the subject display area ES at positions close to the subject display area ES. The configuration other than the first and second indicators 100 and 101 are the same as those of the twelfth embodiment.

Figure 54:
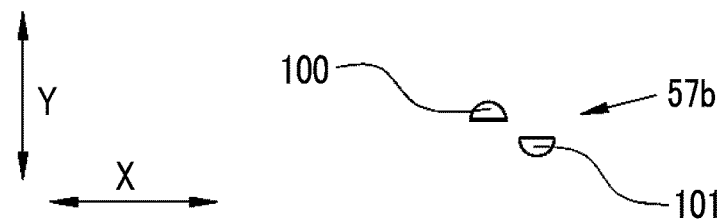
FIG. 54 is a partially enlarged view illustrating defocus images arranged on the right side of the subject display area of the twenty-first embodiment.

As shown in FIG. 54, in a case where the first to third main subject areas EM1 to EM3 are out of focus, the first and second indicators 100 and 101 are spaced from each other in the horizontal direction X and the vertical direction Y. In a case where any one of the first to third main subject areas EM1 to EM3 is brought into focus, in a manner similar to that of the nineteenth embodiment, the first and second indicators 100 and 101 becomes one circle formed of the centers thereof which coincide.

[Twenty-Second Embodiment]

Figure 55:
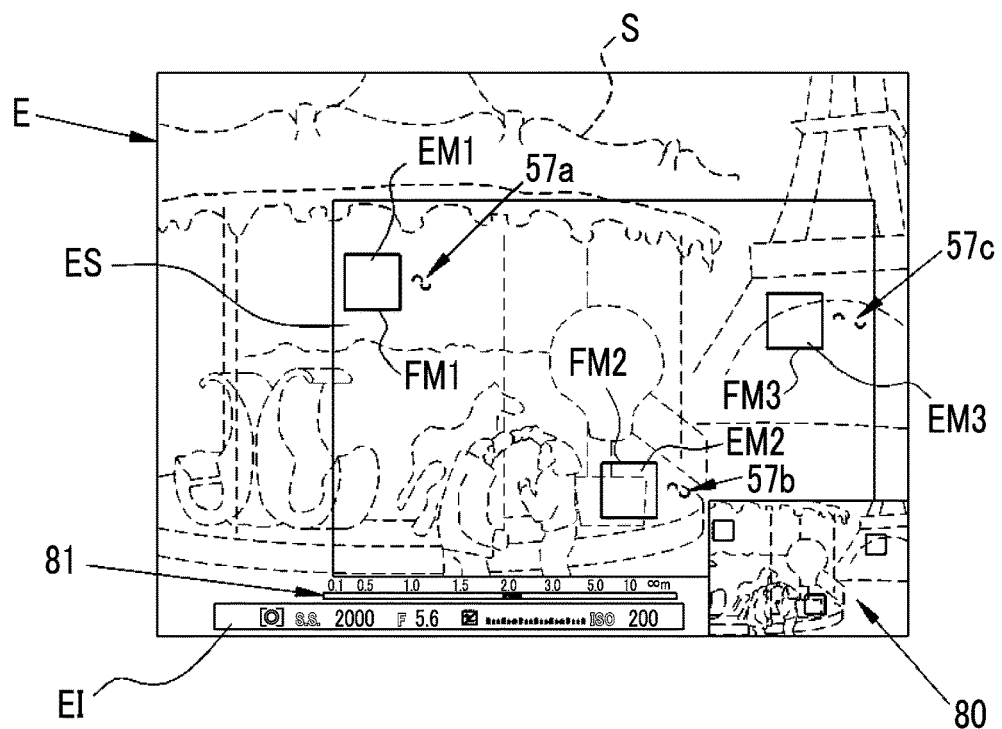
FIG. 55 is a diagram illustrating the inside of an observation area of a finder section of a twenty-second embodiment.

In the twenty-second embodiment, the first to third defocus images 57a to 57c each are composed of first and second indicators having arcuate shapes. As shown in FIG. 55, the first to third defocus images 57a to 57c are indicated by first and second indicators 102 and 103 having arcuate shapes obtained by equally dividing a circle into upper and lower halves. The first indicator 102 has an arcuate shape that is convex upward, and the second indicator 103 has an arcuate shape that is convex downward. The first to third defocus images 57a to 57c are displayed on the right side or the left side of the main subject areas EM1 to EM3 at positions close to the main subject areas EM1 to EM3. The configuration other than the first and second indicators 102 and 103 are the same as those of the nineteenth embodiment.

Figure 56A:
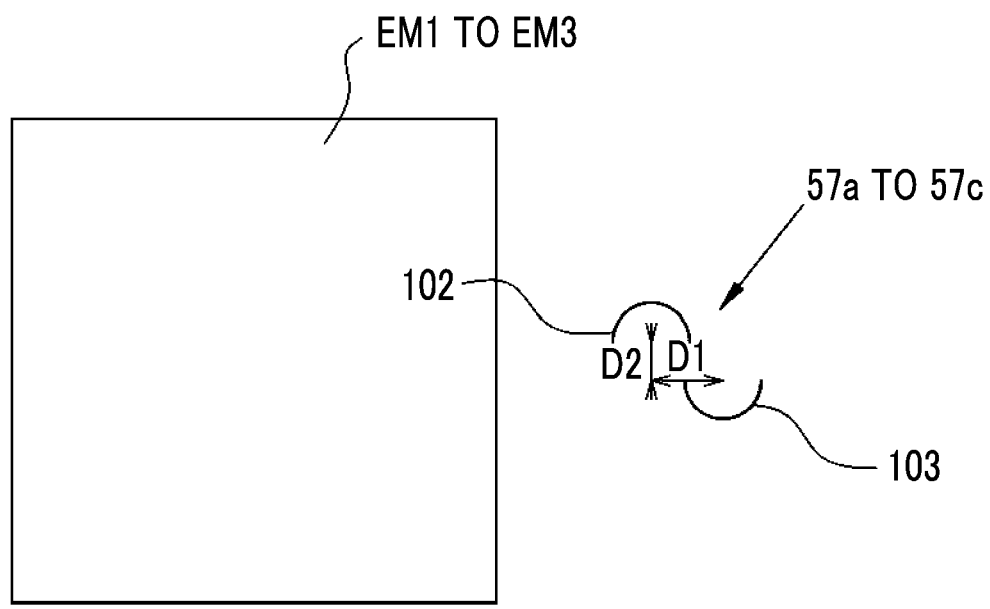
FIG. 56A is a partially enlarged view illustrating a main subject area and a defocus image of the twenty-second embodiment in an out-of-focus state.

As shown in FIG. 56A, in a case where the first to third main subject areas EM1 to EM3 are out of focus, the first and second indicators 102 and 103 are arranged such that the center positions of the circular arcs thereof are spaced from each other in the horizontal direction X and the vertical direction Y. The first and second distances D1 and D2 in the horizontal direction X and the vertical direction Y indicate the amount of defocus of the imaging optical system 16. As the amount of defocus is smaller, the first and second distances D1 and D2 are smaller.

Figure 56B:
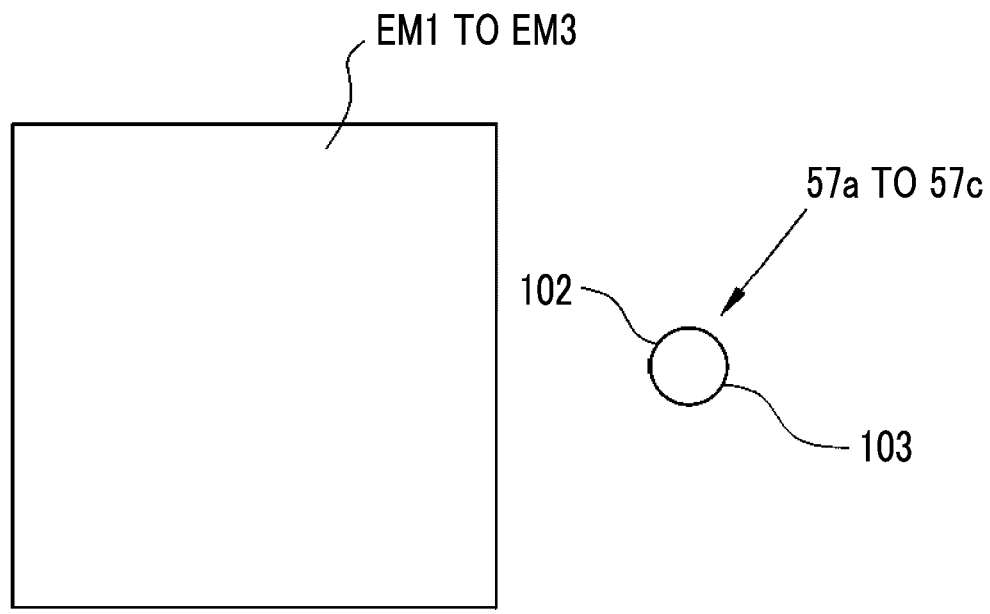
FIG. 56B is a partially enlarged view illustrating the main subject area and the defocus image of the twenty-second embodiment in an in-focus state.

In a case where the amount of defocus is "0", that is, in a case where any one of the first to third main subject areas EM1 to EM3 is brought into focus by the rotation operation of the focus ring 17, as shown in FIG. 56B, the first and second indicators 102 and 103 have the first and second distances D1 and D2 of "0", and become one circle formed of the centers thereof which coincide.

[Twenty-third Embodiment]

Figure 57:
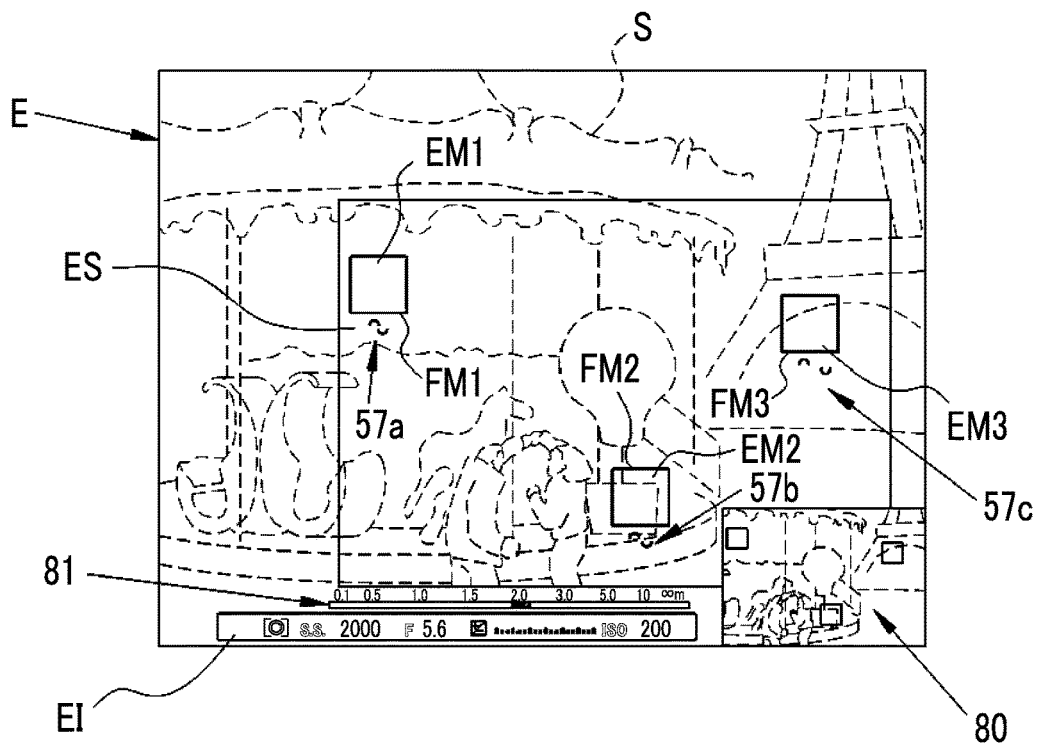
FIG. 57 is a diagram illustrating the inside of an observation area of a finder section of a twenty-third embodiment.

In the twenty-third embodiment, the first to third defocus images 57a to 57c each composed of the first and second indicators 102 and 103 having arcuate shapes are displayed below the main subject areas EM1 to EM3. As shown in FIG. 57, the first to third defocus images 57a to 57c are arranged close to the corresponding main subject areas EM1 to EM3 and below the main subject areas EM1 to EM3. The configuration other than the arrangement of the first to third defocus images 57a to 57c below the main subject areas EM1 to EM3 is the same as that of the twenty-second embodiment.

Figure 58:
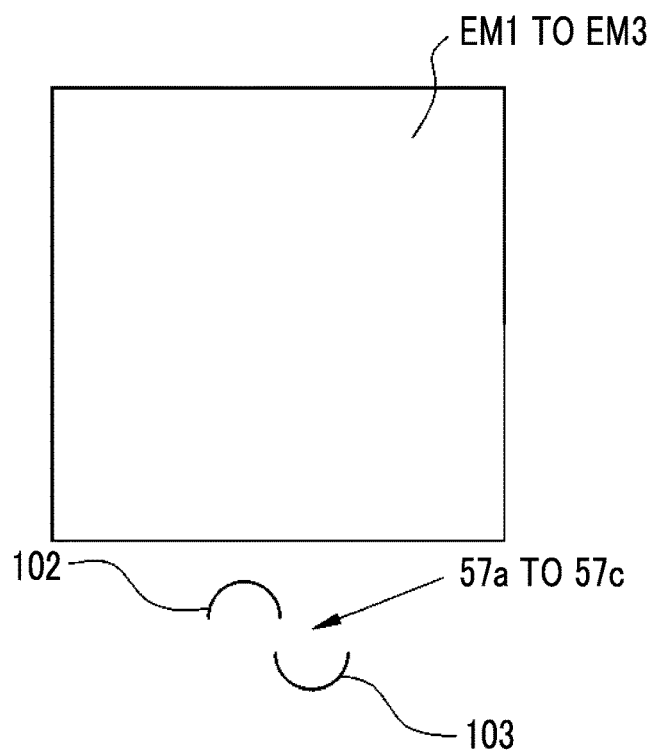
FIG. 58 is a partially enlarged view illustrating a main subject area and a defocus image of the twenty-third embodiment.

As shown in FIG. 58, in a case where the first to third main subject areas EM1 to EM3 are out of focus, the first and second indicators 102 and 103 are spaced from each other in the horizontal direction X and the vertical direction Y. In a case where any one of the first to third main subject areas EM1 to EM3 is brought into focus, in a manner similar to that of the twenty-second embodiment, the first and second indicators 102 and 103 becomes one circle formed of the centers thereof which coincide.

[Twenty-Fourth Embodiment]

In the twenty-fourth embodiment, the first to third defocus images 57a to 57c composed of the first and second indicators 102 and 103 having arcuate shapes are displayed on the right side of the subject display area ES. As shown in FIG. 59, in a manner similar to that of the above-mentioned twelfth embodiment, the first to third defocus images 57a to 57c corresponding to the main subject areas EM1 to EM3 are arranged on the right side of the subject display area ES at positions close to the subject display area ES. The configuration other than the first and second indicators 102 and 103 are the same as those of the twelfth embodiment.

As shown in FIG. 60, in a case where the first to third main subject areas EM1 to EM3 are out of focus, the first and second indicators 102 and 103 are spaced from each other in the horizontal direction X and the vertical direction Y. In a case where any one of the first to third main subject areas EM1 to EM3 is brought into focus, in a manner similar to that of the twenty-second embodiment, the first and second indicators 102 and 103 becomes one circle formed of the centers thereof which coincide.

[Twenty-fifth Embodiment]

Figure 61:
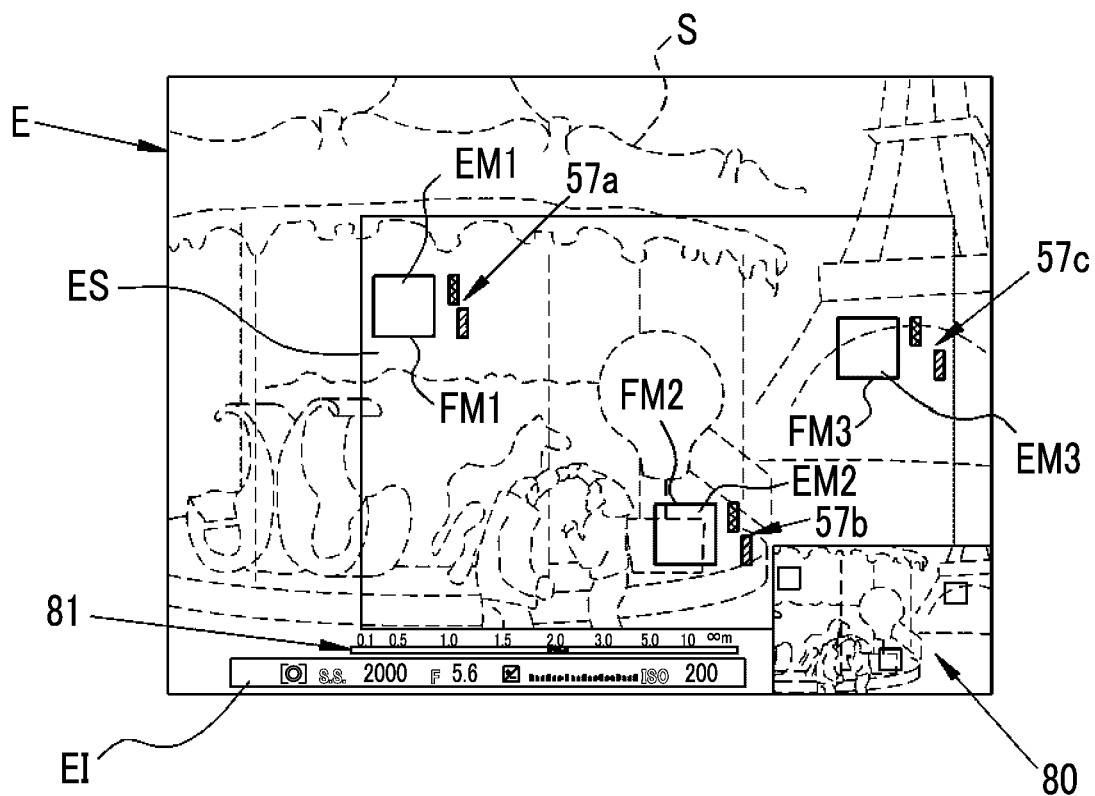
FIG. 61 is a view illustrating an inside of an observation area of a finder section of a twenty-fifth embodiment.
Figure 62A:
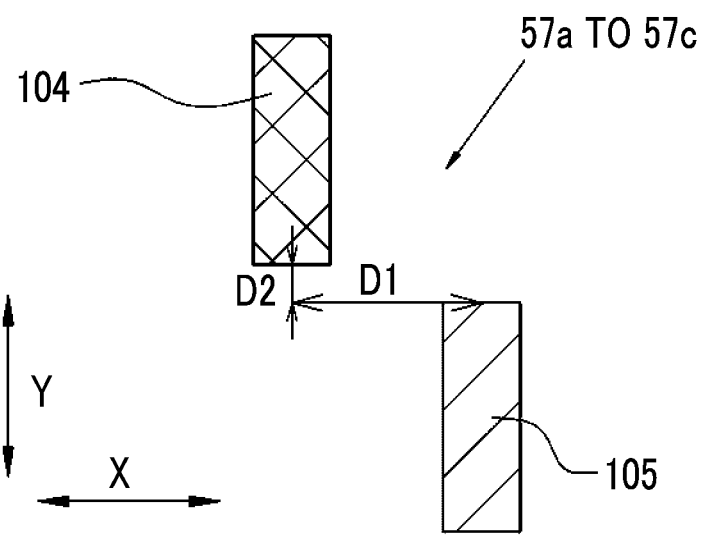
FIG. 62A is a partially enlarged view illustrating a main subject area and a defocus image of the twenty-fifth embodiment in an out-of-focus state.

In the twenty-fifth embodiment, the first and second indicators 104 and 105 in the out-of-focus state are indicated by different colors, and the colors of the first and second indicators 104 and 105 in the in-focus state are changed to the same color. As shown in FIGS. 61 and 62A, the first to third defocus images 57a to 57c are indicated by first and second indicators 104 and 105 having different colors in the case of the out-of-focus state. FIGS. 61 and 62A show that different types of hatched first and second indicators 104 and 105 are displayed in mutually different colors. The first to third defocus images 57a to 57c are displayed on the right side or the left side of the main subject areas EM1 to EM3 at positions close to the main subject areas EM1 to EM3 in a manner similar to that of the seventh embodiment.

In a manner similar to that of the first and second indicators 58 and 59, in a case where the first to third main subject areas EM1 to EM3 are out of focus, the first and second indicators 104 and 105 are spaced from each other in the horizontal direction X and the vertical direction Y. The first and second distances D1 and D2 in the horizontal direction X and the vertical direction Y of the first and second indicators 104 and 105 indicate the amount of defocus of the imaging optical system 16. As the amount of defocus is smaller, the first and second distances D1 and D2 are smaller.

Figure 62B:
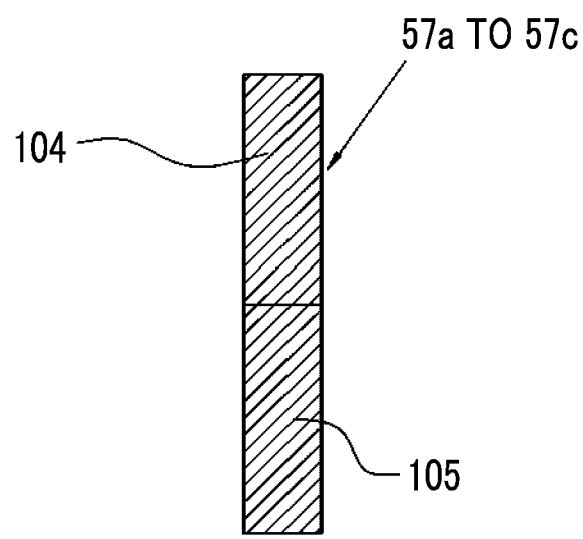
FIG. 62B is a partially enlarged view illustrating the main subject area and the defocus image of the twenty-fifth embodiment in an in-focus state.

In a case where the amount of defocus is "0", that is, in a case where any one of the first to third main subject areas EM1 to EM3 is brought into focus by the rotation operation of the focus ring 17, as shown in FIG. 62B, the first and second distances D1 and D2 are "0", the first and second indicators 104 and 105 are aligned in a straight line, and the colors thereof are changed. In this case, the first and second indicators 104 and 105 are changed to the same color. The hatching applied to the first and second indicators 104 and 105 in FIG. 62B has a color different from the color in the out-of-focus state, and indicates that the colors thereof are changed to the same color.

In the above-mentioned embodiments, the first direction, in which the first and second indicators are spaced, is set as the horizontal direction, and the second direction is set as the vertical direction. However, the first direction may be set as the vertical direction, and the second direction may be set as the horizontal direction.

In each of the above-mentioned embodiments, the finder display control section 48 displays the defocus image 57 of one main subject area EM determined to be in the close range state at a position where the image does not overlap with another main subject area EM. However, the present invention is not limited to this, and in a case where one main subject area EM is close to the other two main subject areas, the defocus image 57 of one main subject area EM determined to be in the close range state may be displayed at a position where the image does not overlap with the two main subject areas EM. For example, in a case where it is determined that the other two main subject areas EM are close to each other on the right side and the left side of one main subject area EM, the defocus image 57 of the main subject area EM determined to be in the close range state may be displayed below the corresponding main subject area EM.

In each of the above-mentioned embodiments, the main subject area detection section detects the main subject area with the input by the touch panel 27, but the detection of the main subject area is not limited thereto. A main subject recognition section (face recognition unit) for recognizing an image indicating the main subject area (for example, a face of a person in a subject image) from the captured image may be provided, and the main subject area detection section may be configured to automatically detect an area including the main subject, which is recognized by the main subject recognition section, as a main subject area.

In each of the above-mentioned embodiments, the imaging element 31 is a CMOS type image sensor, but may be a CCD type image sensor. In each of the above-mentioned embodiments, the finder section is a hybrid viewfinder, but it may be an electronic viewfinder.

In addition to the digital camera, the present invention is applicable to an imaging device such as a video camera having a finder section.

EXPLANATION OF REFERENCES

11: digital camera
15: finder section
16: imaging optical system
17: focus ring
31: imaging element
32: main control section
45: digital signal processing section
48: finder display control section
51: main subject area detection section
52: defocus amount detection section
53: defocus image generation section
54: close range state determination section
55: display position control section
56: normal image
57a to 57c: defocus image
58, 86, 88, 90, 92, 100, 102, 104: first indicator
59, 87, 89, 91, 93, 101, 103, 105: second indicator
D1: first distance
D2: second distance
E: observation area
EM1 to EM3: main subject area
ES: subject display area

What is claimed is:

1. An imaging device comprising:
an imaging optical system;
a focus adjustment operation section that is capable of performing a focus adjustment operation of the imaging optical system;
an imaging element that generates a normal image by performing photoelectric conversion on a subject image from the imaging optical system, and generates first and second imaging signals by performing photoelectric conversion on each of first and second rays which are formed by performing pupil division on the subject image;
a main subject area detection section that detects a main subject area in an image;
a defocus image generation section that generates a defocus image, which indicates an amount of defocus of the imaging optical system, for each main subject area, on the basis of the first and second imaging signals obtained in the main subject area;
a finder section that is configured to be capable of observing the subject image in an observation area;
a finder display control section that displays the defocus image outside the main subject area and at a position close to the main subject area in the observation area; and
a display position control section that, in a case where the main subject area detection section detects a plurality of the main subject areas, displays the defocus image of the single main subject area at a position where the defocus image does not overlap with another main subject area, by controlling the finder display control section,
wherein the defocus image includes at least two indicators, and
wherein a relative displayed position between the two indicators indicates the amount of defocus.

2. The imaging device according to claim 1,
wherein the finder display control section displays the defocus image, which corresponds to the single main subject area, on a right side or a left side of the main subject area, and
wherein the display position control section determines whether to display the defocus image on the right side or the left side of the corresponding main subject area, in accordance with whether the defocus image of the single the main subject area overlaps with another main subject area.

3. The imaging device according to claim 1,
wherein the defocus image is indicated by first and second indicators which are spaced from each other in a first direction, and
wherein the finder display control section decreases a first distance, which is a distance between the first and second indicators in the first direction, as the amount of defocus decreases.

4. The imaging device according to claim 3,
wherein the first and second indicators are spaced from each other in a second direction orthogonal to the first direction, and
wherein the finder display control section decreases a second distance, which is a distance between the first and second indicators in the second direction, as the amount of defocus decreases.

5. The imaging device according to claim 4, wherein the finder display control section sets the first and second distances to 0 in a case where the amount of defocus is 0.

6. The imaging device according to claim 5, wherein the finder display control section integrally displays the first and second indicators in a case where the amount of defocus is 0.

7. The imaging device according to claim 5,
wherein a part of the first indicator, which faces the second indicator in the second direction, has a convex portion, wherein a part of the second indicator, which faces the first indicator in the second direction, has a concave portion, and wherein in a case where the amount of defocus is 0, the convex portion and the concave portion are fitted.

8. The imaging device according to claim 4, further comprising a determination section that determines whether the amount of defocus is within a focal depth of the imaging optical system, wherein the finder display control section changes the second distance depending on the amount of defocus in a case where the determination section determines that the amount of defocus is within the focal depth, and keeps the second distance constant regardless of the amount of defocus in a case where the determination section determines that the amount of defocus is outside the focal depth.

9. The imaging device according to claim 1, further comprising a face recognition section that recognizes a face of a person in the subject image, wherein the main subject area detection section detects an area, which includes the face of the person recognized by the face recognition section, as the main subject area.

10. A control method of an imaging device including an imaging optical system, a focus adjustment operation section that is capable of performing a focus adjustment operation of the imaging optical system, an imaging element that generates a normal image by performing photoelectric conversion on a subject image from the imaging optical system, and generates first and second imaging signals by performing photoelectric conversion on each of first and second rays which are formed by performing pupil division on the subject image, a main subject area detection section that detects a main subject area in an image, a defocus image generation section that generates a defocus image, which indicates an amount of defocus of the imaging optical system, for each main subject area, on the basis of the first and second imaging signals obtained in the main subject area, a finder section that is configured to be capable of observing the subject image in an observation area, and a finder display control section that displays the defocus image outside the main subject area and at a position close to the main subject area in the observation area, the control method comprising displaying the defocus image of the single main subject area at a position where the defocus image does not overlap with another main subject area, by controlling the finder display control section in a case where the main subject area detection section detects a plurality of the main subject areas, wherein the defocus image includes at least two indicators, and wherein a relative displayed position between the two indicators indicates the amount of defocus.

* * * * *